US012694411B2

(12) United States Patent
Kasula et al.

(10) Patent No.: US 12,694,411 B2
(45) Date of Patent: Jul. 28, 2026

(54) UNIFIED PLATFORM FOR HOSTING MULTIPLE WORKSPACES

(71) Applicant: HUBSPOT, INC., Cambridge, MA (US)

(72) Inventors: Santosh Chethan Kasula, Westborough, MA (US); Benjamin Richard Lodge, Arlington, MA (US); Paul Franklin Weston, Littleton, MA (US); Collette Toben King, New York, NY (US); Bianca Francesca Gordon Recto, Denver, CO (US)

(73) Assignee: HUBSPOT, INC., Cambridge, MA (US)

( * ) Notice: Subject to any disclaimer, the term of this patent is extended or adjusted under 35 U.S.C. 154(b) by 91 days.

(21) Appl. No.: 18/924,245

(22) Filed: Oct. 23, 2024

(65) Prior Publication Data

US 2026/0111906 A1 Apr. 23, 2026

(51) Int. Cl.
*G06Q 30/015* (2023.01)

(52) U.S. Cl.
CPC .................................. *G06Q 30/015* (2023.01)

(58) Field of Classification Search
None
See application file for complete search history.

(56) References Cited

U.S. PATENT DOCUMENTS

| | | | | | |
|---|---|---|---|---|---|
| 8,407,205 | B2 * | 3/2013 | Doshi | ..................... | G06F 16/27 |
| | | | | | 707/781 |
| 8,548,982 | B2 * | 10/2013 | Weissman | ............. | G06F 16/289 |
| | | | | | 707/769 |
| 9,538,007 | B1 * | 1/2017 | Mariappan | .......... | H04M 3/5232 |
| 11,445,029 | B2 * | 9/2022 | Rodgers | ................ | H04L 67/306 |
| 12,380,406 | B1 * | 8/2025 | Pearson | ................ | G06Q 10/0633 |
| 12,511,256 | B2 * | 12/2025 | Layton | .................. | G06F 16/164 |
| 2011/0276896 | A1 * | 11/2011 | Zambetti | ............. | H04L 12/1813 |
| | | | | | 715/751 |
| 2013/0282417 | A1 * | 10/2013 | Gaedcke | ............... | G06Q 10/40 |
| | | | | | 705/304 |
| 2014/0314225 | A1 * | 10/2014 | Riahi | .................. | H04M 3/5183 |
| | | | | | 379/265.09 |
| 2016/0224990 | A1 * | 8/2016 | Shafique | ............ | G06Q 30/0201 |
| 2019/0361682 | A1 * | 11/2019 | Cavalcante | ......... | H04M 3/5166 |
| 2021/0004821 | A1 * | 1/2021 | Adibi | ................ | G06F 16/24575 |
| 2021/0201327 | A1 * | 7/2021 | Konig | .................. | G06Q 30/015 |
| 2023/0351421 | A1 * | 11/2023 | Bhatnagar | .......... | G06Q 30/0202 |
| 2025/0104087 | A1 * | 3/2025 | Subramanian | ........ | G06F 40/166 |
| 2025/0292271 | A1 * | 9/2025 | Nooe | ................ | G06Q 30/0202 |

\* cited by examiner

*Primary Examiner* — Jorge A Casanova

(74) *Attorney, Agent, or Firm* — Cooper Legal Group, LLC

(57) ABSTRACT

Systems and methods are provided for a unified platform hosting multiple workspaces. A customer success workspace is hosted through the unified platform. The customer success workspace stores data within a first object of a customer relationship management (CRM) database. A helpdesk workspace is hosted through the unified platform. The helpdesk workspace stores data within a second object of the CRM database. A user is provided with access to the customer success workspace and the helpdesk workspace of the unified platform through a workspace user interface. The helpdesk workspace is provided with access to the first object. The customer success workspace is provided with access to the second object.

20 Claims, 26 Drawing Sheets

200

HOST CUSTOMER SUCCESS WORKSPACE THROUGH UNIFIED PLATFORM — 202

HOST HELPDESK WORKSPACE THROUGH UNIFIED PLATFORM — 204

PROVIDE USER WITH ACCESS TO CUSTOMER SUCCESS WORKSPACE AND HELPDESK WORKSPACE THROUGH WORKSPACE USER INTERFACE — 206

PROVIDE HELPDESK WORKSPACE AND CUSTOMER SUCCESS WORKSPACE WITH ACCESS TO OBJECTS — 208

DATA LAYER

COMPUTER
INSTRUCTIONS

506

011011110110001101011011101101110111101101111011111011111110110111111000...

508

COMPUTER READABLE MEDIUM

UNIFIED PLATFORM FOR HOSTING MULTIPLE WORKSPACES

BACKGROUND

Many organizations store data within customer relationship management (CRM) systems. A client of the organization can access customer information that is stored as objects within a CRM system of a multi-client service system platform. The customer information may relate to customers of the organization, such as contact information, sales information, helpdesk tickets, and/or a variety of information related to the organization and/or customers of the organization. The CRM system can be used to store core objects natively provided by the CRM system and/or customized objects that are custom created and configured by the client.

CRM systems may generally provide the ability to manage and analyze interactions with customers. For example, these CRM systems may compile data from various communication channels (e.g., email, phone, chat, content materials, social media, etc.). Some CRM systems can be used to monitor and track CRM standard objects (core objects). These CRM standard objects can include typical business objects such as accounts (e.g., accounts of customers), contacts (e.g., persons associated with accounts), leads (e.g., prospective customers), and opportunities (e.g., sales or pending deals).

DESCRIPTION OF THE DRAWINGS

Embodiments of the present technology will be described and explained through the use of the accompanying drawings in which.

Figure 1:
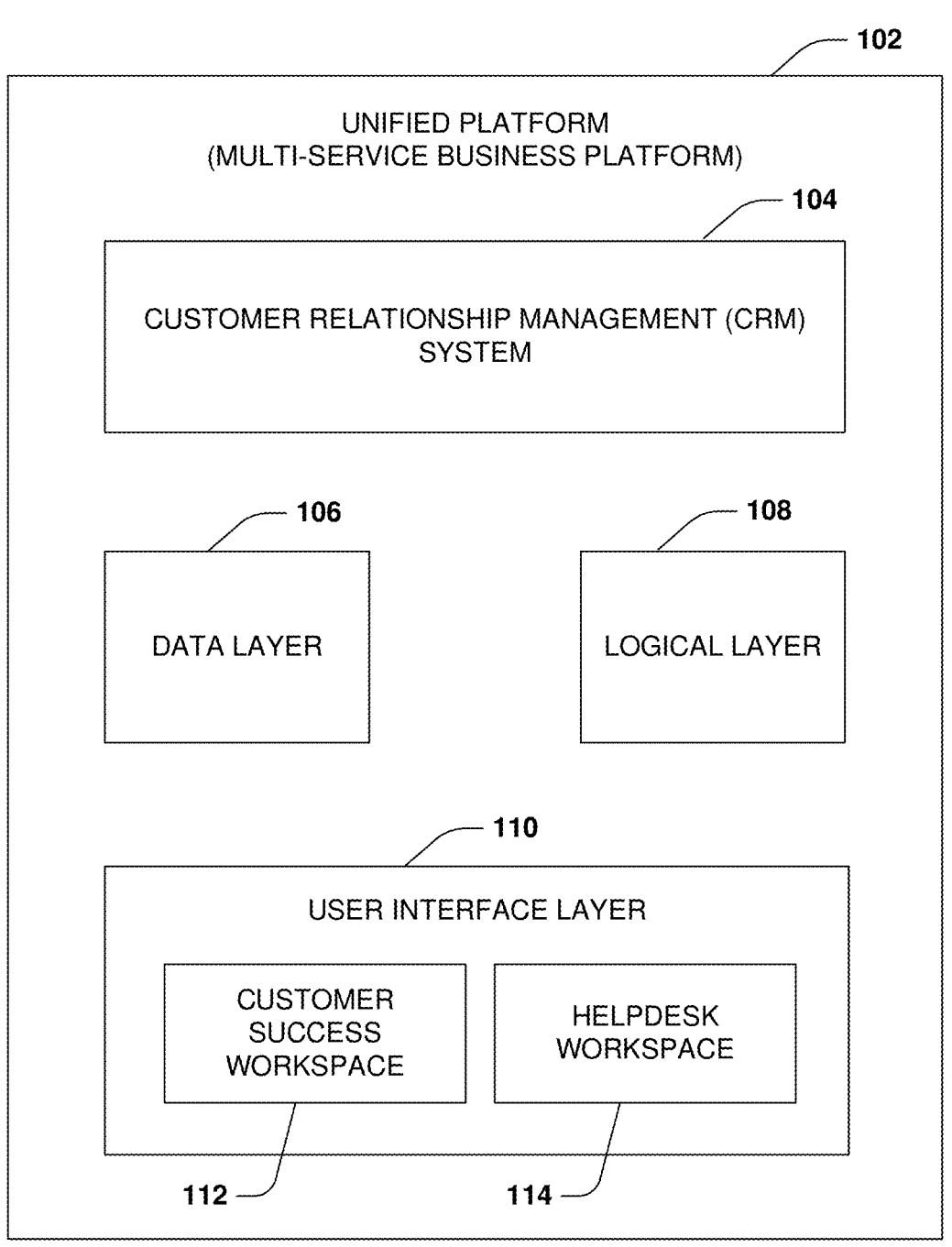
FIG. 1 is a block diagram illustrating an embodiment of a unified platform hosting multiple workspaces, in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

Systems and methods are provided for a unified platform hosting multiple workspaces. A customer success service may provide point solutions for proactively managing accounts with customers. A user may access the customer success service in order to view customer accounts that are managed by the user, track tasks related to the customer accounts (e.g., schedule a customer call, send a follow-up email, etc.), generate reports, and/or perform other functions supported by the customer success service. The customer success service may be hosted by a customer success platform that maintains data within a database of the customer success platform.

A helpdesk service, separate from the customer success service, may provide point solutions for reactively resolving issues experienced by customers (e.g., a customer having an order problem, a technical problem with a product, a billing issue, etc.). A user may access the helpdesk service in order to create tickets such as customer support tickets (helpdesk tickets), view tickets, perform tasks related to tickets, and/or perform other helpdesk and customer service related tasks through the helpdesk service. The helpdesk service may be hosted by a helpdesk platform, separate from the customer success platform, which maintains data within a database of the helpdesk platform.

Because the customer success service and the helpdesk service are hosted by different platforms, data, workflows, tasks, objects, client information, tickets, predictive health scores, and/or other information is not shared and integrated amongst the customer success service and the helpdesk service. Thus, the helpdesk service cannot leverage customer success data and the customer success service cannot leverage helpdesk data because the customer success data and the helpdesk data are siloed into separate data siloes (e.g., helpdesk data siloed into the database of the helpdesk platform and customer success data siloed into the database of the customer success platform).

The disclosed unified platform provides a technical solution that improves upon conventional helpdesk services and customer success services by integrating a customer success workspace and helpdesk workspace into a shared workspace environment (a unified workspace) hosted by the unified platform. The unified platform empowers both customer success users and customer service users (helpdesk users)

with shared tools, services, information, functionality, and artificial intelligence (AI) machine learning (ML) powered services. In particular, the same unified platform provides a customer success workspace and a helpdesk workspace through a workspace user interface (the shared workspace environment). The unified platform stores customer success workspace data and the helpdesk workspace data within objects of a customer relationship management (CRM) database. Data stored by the customer success workspace within objects (e.g., predictive health scores) are accessible to the helpdesk workspace, and data stored by the helpdesk workspace within objects (e.g., tickets such as customer service/help desk tickets) are accessible to the customer success workspace.

FIG. 1 is a block diagram illustrating an embodiment of a unified platform 102 hosting multiple workspaces. The unified platform 102 (e.g., a multi-service business platform 700 of FIG. 7) may store data as objects within a CRM system 104 such as a CRM database. The objects my represent customers, deals, tickets, products, services, emails, conversations, calls, and/or other core objects natively supported by the CRM system 104 and customized objects defined by users. The unified platform 102 may include a data layer 106, a logical layer 108, and/or a user interface layer 110. The data layer 106 provides access to structured data such as objects within the CRM system 104 (CRM objects within the CRM database). The CRM database may store objects that are used by a customer success workspace 112 and a helpdesk workspace 114 provided by a user interface layer 110. In some embodiments, company objects and/or customized objects of the customer success workspace 112 and ticket objects and/or service objects of the helpdesk workspace 114 are core objects used by the unified platform 102 to power (host) both the customer success workspace 112 and the helpdesk workspace 114. In particular, the core objects are shared amongst both the customer success workspace 112 and the helpdesk workspace 114. Associations (links) between objects may be created, such as where the core objects may be associated with other objects such as email objects, call objects, conversation objects, deal objects, and/or other objects in the CRM database that are used to enable the operation of the customer success workspace 112 and the helpdesk workspace 114. The unified platform 102 is capable of evaluating the CRM system 104 to identify objects storing data overlapping the customer success workspace 112 and the helpdesk workspace 114, and thus the unified platform 102 can make such objects available to both the customer success workspace 112 and the helpdesk workspace 114. For example, the user interface layer 110 may detect a current context of the workspace user interface (e.g., a customer success context, a helpdesk or support context, etc.), and retrieves data from objects relevant to the current context for populating user interfaces within the workspace user interface (e.g., populating a pipeline interface of the customer success workspace 112 with ticket data extracted from ticket objects created by the helpdesk workspace 114).

The data layer 106 provides access to unstructured data, which may be generated by user engagement (e.g., information indicating that a user sent or received an email, a user clicking a link of a website, a user visiting a blog, a user viewing content, a user submitting a helpdesk request/ticket, etc.). The unstructured data may be used to perform sentiment analysis, predictive scoring, and/or generate additional insights based upon the current context of the workspace user interface such as whether a user is accessing the customer success workspace 112 or the helpdesk workspace, or a particular interface therein (e.g., a summary interface, a portfolio interface, a pipeline interface, a feed interface, a ticket creation interface, a health scoring interface, an email or messaging interface, a helpdesk interface, a workflows interface, etc.). The unified platform 102 may evaluate the CRM system 104 or other data sources to identify the unstructured data that is used to automatically populate object properties of objects, extract insight based upon the current context, generate predictive health scores or other predictive scoring, etc. Various external data sources, external to the unified platform 102, may be used by the data layer 106 for populating the interfaces of the workspace user interface, perform automation, execute tasks using AI and ML models, etc.

The logical layer 108 is configured to apply AI to automate tasks. In some embodiments, the logical layer 108 may implement an agent (e.g., a customer service agent, an AI driven agent, an omnichannel agent capable of interfacing with various channels such as email, blogs, social media, websites, and/or other communication channels, etc.). The agent may leverage multimodal large language models (LLMs), retrieval augment generation techniques, and/or knowledge base related documents to automatically process support requests submitted to the agent, such as through a self-service model. The self-service model may be used to recommend an action for a user to take to resolve an issue, such as to read an article, watch a video, instructions to perform a user attempted solution, etc. The agent may utilize prior ticket history and/or up-to-date knowledge base information to gather debugging information and to suggest possible next steps for a customer service representative (e.g., a user of the helpdesk workspace 114) to take for achieving a quicker resolution of an issue (e.g., a network connectivity issue, a purchase order issue, a product setup issue or other product usage issue, a billing issue, etc.). In some embodiments, the knowledge base is kept up-to-date utilizing knowledge base or ticket responses provided by the agent or customer service representative in response to user submitted support requests and tickets. In some embodiments, the agent may be implemented as a knowledge base agent (e.g., an AI agent) that utilizes the knowledge base to automatically process support cases.

In some embodiments, the logical layer 108 provides predictive alerts. The customer success user may rely on numerous data sources (e.g., information from 130 data sources) for performing customer success tasks. Predictive alerts can keep the customer success user informed about accounts to watch, customers to engage with for onboarding, to perform check-ins with customers, information about churn risks or chances for upsells. This information provided through the customer success workspace 112 provides a clear focus for customer success users to prioritize their time for customer engagement. The predictive alerts may utilize churn prediction as signals based on health score data (e.g., a metric used by SaaS or other companies to determine how at risk a customer is of churning such as leaving), product usage data (e.g., how many users are utilize a product), acquisitions (e.g., company A acquiring company B), and/or other signals. In some embodiments, the logical layer 108 provides predictive health scores that are automatically generated based upon customers in a similar segment and industry (e.g., health scores of customers in an automotive industry and segment may be leveraged to generate predictive health scores for an automotive business utilizing the unified platform 102). In some embodiments, the logical layer 108 implements an AI meeting manager (e.g., functionality for creating and tracking meetings), electronic batch record (EBR) creation, and playbook recommendations that may be automatically performed to automate manual tasks (e.g., a playbook recommendation of actions to perform or suggest to a customer to perform for resolving an issue).

Figure 2:
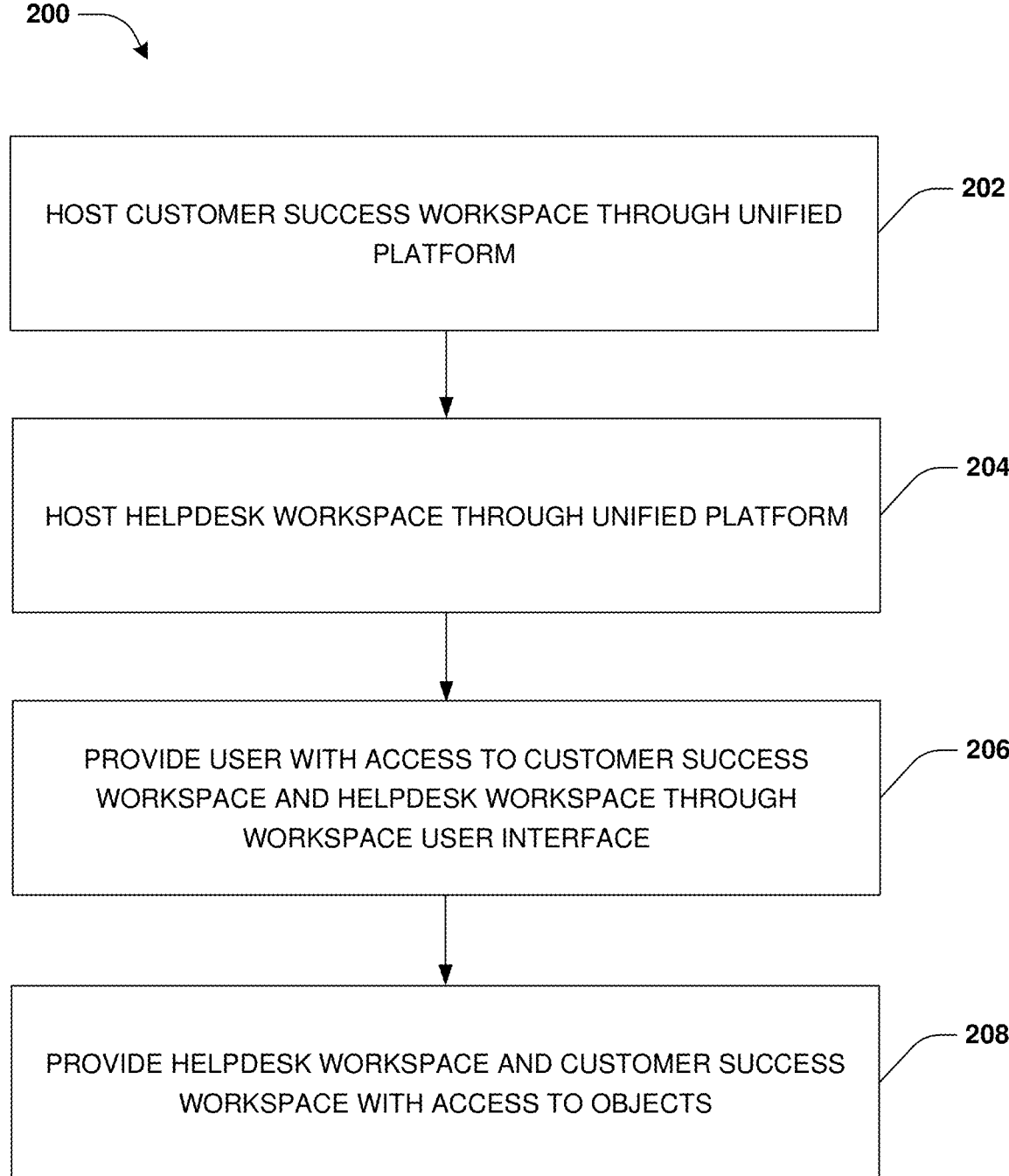
FIG. 2 is a flow chart illustrating an embodiment of a method for hosting multiple workspaces through a unified platform, in accordance with an embodiment of the present technology.

FIG. 2 is a flow chart illustrating an embodiment of a method 200 for hosting multiple workspaces through a unified platform 302, which is described in conjunction with FIGS. 3A-3F. In some embodiments, the unified platform 302 may be part of the multi-service business platform 700. During operation 202 of method 200, a customer success workspace 308 is hosted by the unified platform 302. The customer success workspace 308 may store data within objects of a CRM database, such as a deal object storing information related to a deal to upgrade a service provided to a customer. It may be appreciated that the customer success workspace 308 may utilize data within any type of object, such as default/core objects and/or custom defined objects (e.g., contact objects, ticket objects, customer objects, a deal object, etc.

Contact objects may be considered as people who may communicate with a client (e.g., anyone who may interact with a business) such as customers or prospective customers of the business (e.g., people who may convert on a form, people who contact a chat team of the business, and/or people who met business team members at an event). Each contact object may be defined with properties (e.g., a name of the contact, a phone number of the contact, an email address of the contact, a physical address of the contact, a title of the contact, etc.). Contacts may work at companies such that company objects may also be important to represent in data. Company objects may be defined as organizations or businesses that may communicate with a user's organization. Each company object may include properties such as a company name, an address of the company (e.g., main location, headquarters, or the like), and other suitable properties.

A deal object may be considered opportunities that may be available from interactions with contacts (e.g., contact objects) and/or companies (e.g., company objects). Deal objects may be defined as and represent transactions that may be typically between two businesses. Each deal object may include properties such as a sale made by a customer to a company via a contact. Some examples of deal objects may include the amount of a deal (e.g., deal_amount), an estimated close date for a deal (e.g., estimated_close_date), and a likelihood to close a deal (e.g., likelihood_to_close). Likelihood to close may be determined from machine learning. For example, machine learning may be used to take previously closed deals and may create a model around what types of properties (e.g., attributes) and objects may create a highly likely result to close and then may output values based on this predictive machine learning.

In some embodiments, ticket objects may be considered as customer deals, requests for support or help (e.g., service ticket that may relate to a service request that may be issued by a company to a user via a contact), etc. Some examples of properties for ticket objects may include date ticket was opened (e.g., date_opened), priority of ticket, last date custom replied to ticket (e.g., last_date_customer_replied), last date rep replied to ticket (e.g., last_date_rep_replied), etc.

In some embodiments, the ticket object stores data associated with the types of ticket attributes that may be used to identify, track, and/or manage a ticket issued to an end user contact on behalf of the client. The ticket ID is a unique value (e.g., string or number) that uniquely identifies each ticket from other tickets that may be associated with contacts of the client. In a ticket object, the client ID is a value that indicates the client with respect to which the ticket was issued. The client ID may point to the client database record and/or the contact record for a particular client. The contact ID uniquely identifies the contact that initiated the ticket for the particular client. The contact ID may point to the client database record of the contact that initiated the ticket.

The ticket attributes may include or reference any data tied to the ticket. As discussed, the ticket attributes may include default ticket attributes and/or custom ticket attributes. Examples of default ticket attributes may include a ticket priority attribute (e.g., high, low, or medium), a ticket subject attribute (e.g., what is the ticket concerning), a ticket description attribute, a pipeline ID attribute, a creation date attribute, a last update attribute, etc. The custom ticket attributes may depend on the customizations of the customer contact for a particular client.

In an example, the ticket attributes may be customized to include a ticket type attribute indicating a type of the ticket (e.g., service request, upgrade request, refund request, lost items, etc.), a contact sentiment attribute indicating whether a sentiment score of a contact (e.g., whether the contact is happy, neutral, frustrated, angry, etc.), etc. In some embodiments, the ticket status attribute may include a sentiment or tone of the contact throughout the timeline, feedback from the contact, a contact score of the client, etc. In some embodiments, the product ID attribute indicates a product to which the ticket corresponds, a contact frequency attribute indicating a number of times a contact has been contacted, a media asset attribute indicating media assets (e.g., articles or videos) that have been sent to the contact during the ticket's lifetime, etc.

In some embodiments, the ticket attributes may further include the ticket status attribute. The ticket status attribute can indicate a status of the ticket, whereby the status may be defined with respect to the ticket pipeline for the client. For example, example statuses may include: ticket is opened but not acted upon, waiting for customer response, at a chatbot stage, at service specialist, at visit stage, at refund state, issue resolved, etc.

In some embodiments, the ticket object may include additional ticket data in accordance with the CRM system of the present platform. In embodiments, the additional ticket data may include or reference the specialist or specialists that have helped service the ticket (e.g., employee IDs), any notes entered by specialists, a number of notes entered by the specialists, a list of materials that have been sent to the contact during attempts to resolve the issue, etc. In some embodiments, the additional ticket data may include references to transcripts of conversations with the contact over different mediums or knowledge base articles referred to during the handling of a ticket. For example, the additional ticket data may include or reference conversations had with a chatbot, over email, telephone call, in a WhatsApp message, SMS text message, social media posts, and/or other communications with the client's customer service specialist. The additional ticket data may additionally or alternatively include analytics data.

In some embodiments, the additional ticket data may include or reference a ticket timeline (not shown) in accordance with the CRM system. In some embodiments, a ticket timeline may indicate all actions taken with respect to the ticket and when those actions were taken by the client. In some embodiments, the ticket timeline may be defined with respect to a client's ticket pipeline and/or workflows managed by the client. The ticket timeline may identify when the ticket was initiated, when different actions defined in the workflow occurred (e.g., chatbot conversation, sent link to FAQ, sent knowledge base article, transferred to customer service specialist, made house call, resolved issue, closed ticket, etc.).

The ticket timeline of a ticket record may be updated each time a contact user interacts with the unified platform 302 for a particular ticket. In this way, many different types of information can be extracted from the ticket timeline (or the ticket record in general). For example, the following information may be extracted: How long a ticket took to come through the pipeline (e.g., how much time was needed to close the ticket); how many interactions with the system did the contact have; how much time passed until the first response was provided; how long did each stage in the pipeline take; how many responses were sent to the contact; how many communications were received from the contact; how many notes were entered into the record; and/or how many documents were shared with the contact.

A CRM system may be configured to include associations between core and customized objects. For example, each association may be a directed association, such that a respective association may define a type of relationship from a first object to a second object. For example, an association between a contact object and a company object may be "works for" such that the contact object "works for" (association) the company object. When an instance of the contact object (e.g., the contact object instance identifies Bob as a contact) may be associated with an instance of the company object (e.g., the company object instance may identify "Acme Corp." as the company) with a "works for" association, then the individual indicated by the company object instance may be defined in the customer databases as working for the company indicated in the company object instance (e.g., Bob works for Acme Corp.).

In example embodiments, two objects may be associated using one or more different types of associations and the associations may be directed in both directions (e.g., association and inverse association). An inverse association of the association may be created automatically for every association. For example, the association in one direction may be "works for" and the inverse association may be "employs" which may be created for the same association automatically. This same association may be viewed from the contact object and viewed from the company object such that the association may be defined as the contact object "works for" (association) the company object or the company object "employs" (inverse association) the contact object. The associations may be between the same types of objects and/or between different types of objects. For example, in continuing the example of the company object and the contact object, a contact object instance may indicate that the company defined by the company object instance may employ the individual defined by the contact object instance vis-à-vis the "employs" association (e.g., Acme Corp employs Bob) and that the individual works for the company vis-à-vis the "works for" association (e.g., Bob works for Acme Corp).

In some example embodiments, two objects may have multiple associations in the same direction. Continuing the example of the contact object and the company object, a contact object may be associated with a company object by a "works for" association, a "previously worked for" association, a "sells to" association, and/or other suitable types of associations. Similarly, the company object may be associated with a contact object with an "employs" association, a "previously employed" association, a "buys from"

association, and/or other suitable types of associations. In this way, different types of relationships between instances of objects may be defined within the customer's databases.

In example embodiments, objects may also have the same object type directed associations. For example, a contact object may be associated to itself with one or more directed associations, such as a "is supervised by" association, a "supervises" association, or the like. For example, if Bob and Alice may work for the same company and Alice may supervise Bob, then an instance of a contact object that may define Bob may be associated with a contact object instance that may identify Alice with a "is supervised by" association (e.g., Bob "is supervised by" Alice) and/or Alice's contact object instance may be associated with Bob's contact object instance with a "supervises" association (e.g., Alice "supervises" Bob).

In some embodiments, the customer success workspace 308 may be populated with a summary interface 312, a portfolio interface 314, a pipeline interface 316, a feed interface 318, and/or other interfaces. The summary interface 312 may be populated with task progress information. The summary interface 312 may be a dynamic interface based upon account prioritization (e.g., certain customer accounts may be prioritized higher than other customer accounts such as based upon an amount of business with the customer, a relationship length with the customer, a size or likelihood of a deal with the customer, an urgency with which a follow-up should be performed with the customer, a risk of the customer churning, etc.), which may be determined by signals from health scores, structured data, and/or unstructured data. The portfolio interface 314 may be populated with customers (e.g., customer information extracted from objects within the CRM database) that are managed by a current user of the customer success workspace 308. The pipeline interface 316 may be populated with ticket data from ticket objects. The feed interface 318 may be populated with activities related to the customers managed by the current user (e.g., a customer submitting a service ticket, a customer purchasing a service, a customer sending an email, a customer launching a new product line, a customer creating a social media post, etc.).

During operation 204 of method 200, a helpdesk workspace 310 is hosted by the unified platform 302. The helpdesk workspace 310 may store data within objects of the CRM database, such as ticket objects and/or other objects. The current user may interact with the helpdesk workspace 310 through an interface such as a helpdesk interface 320. The helpdesk interface 320 may be populated with channel information (e.g., information about various communication channels such as email, phone calls, etc.), ticket names (e.g., "user A service request to troubleshoot product ABC"), ticket priorities (e.g., low, medium, high, or any other type of priority that may be assigned based upon a severity or how important/quickly an issue should be resolved), ticket tags, ticket status information (e.g., onboarding not yet started, welcome email, setup call, onboarding complete, etc.), ticket assignment information, and/or other information that may be stored in ticket objects or other types of objects accessible to the helpdesk workspace 310 and/or services (e.g., a workflow automation service) and workspaces such as the customer success workspace 308. Account specific tickets may be surfaced/provided through the customer success workspace (e.g., tickets of customers assigned to the current user) to help resolve issues more quickly, which provides insight into what customer/account relationships can be nurtured (e.g., a customer success user may evaluate tickets of a customer in order to determine how best to contact the customer to improve the situation and the customer's disposition in light of the issue(s) associated with the tickets).

Figure 4A:
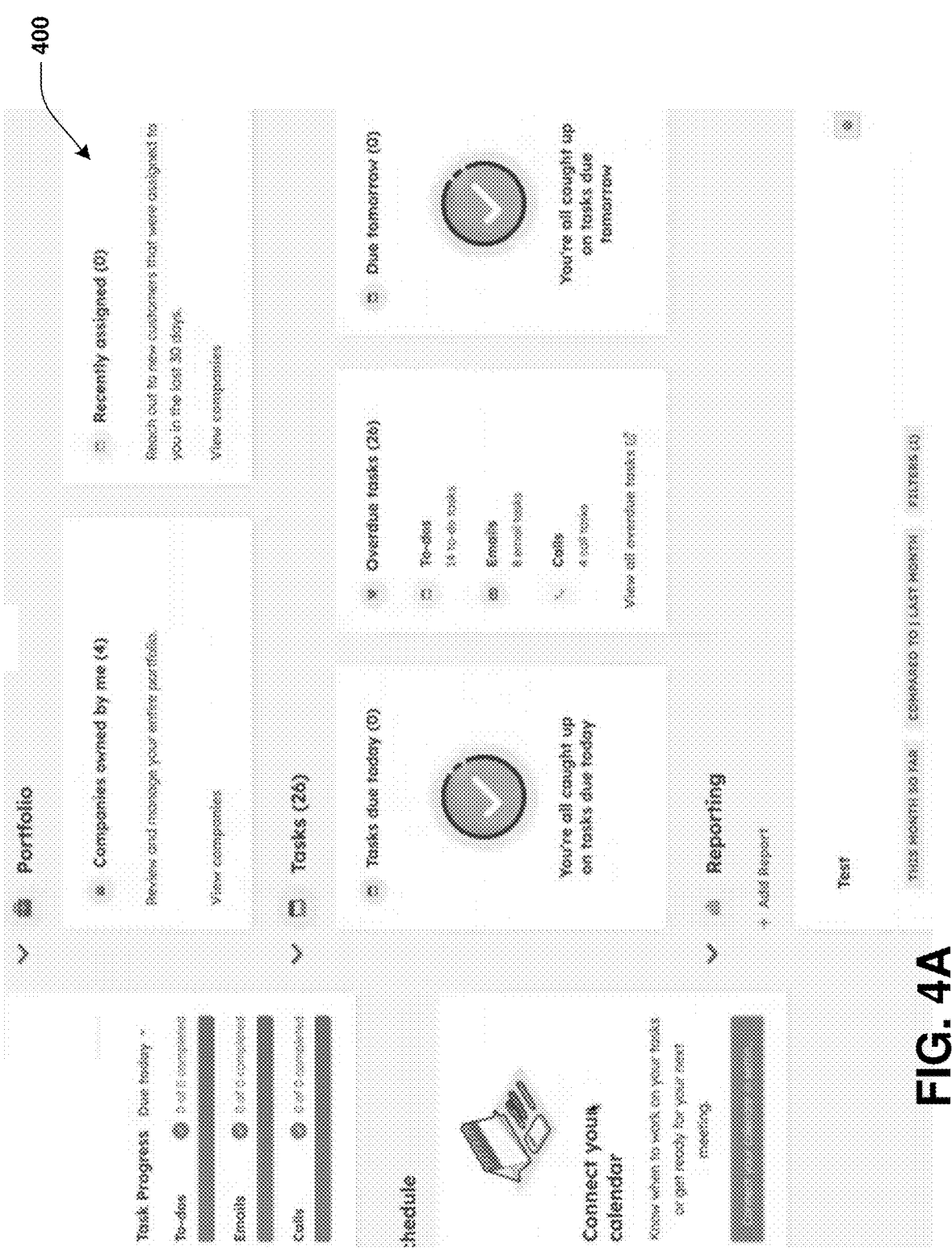
FIGS. 4A-4O are block diagrams illustrating embodiments of user interfaces of a unified platform, in accordance with an embodiment of the present technology.
Figure 4B:
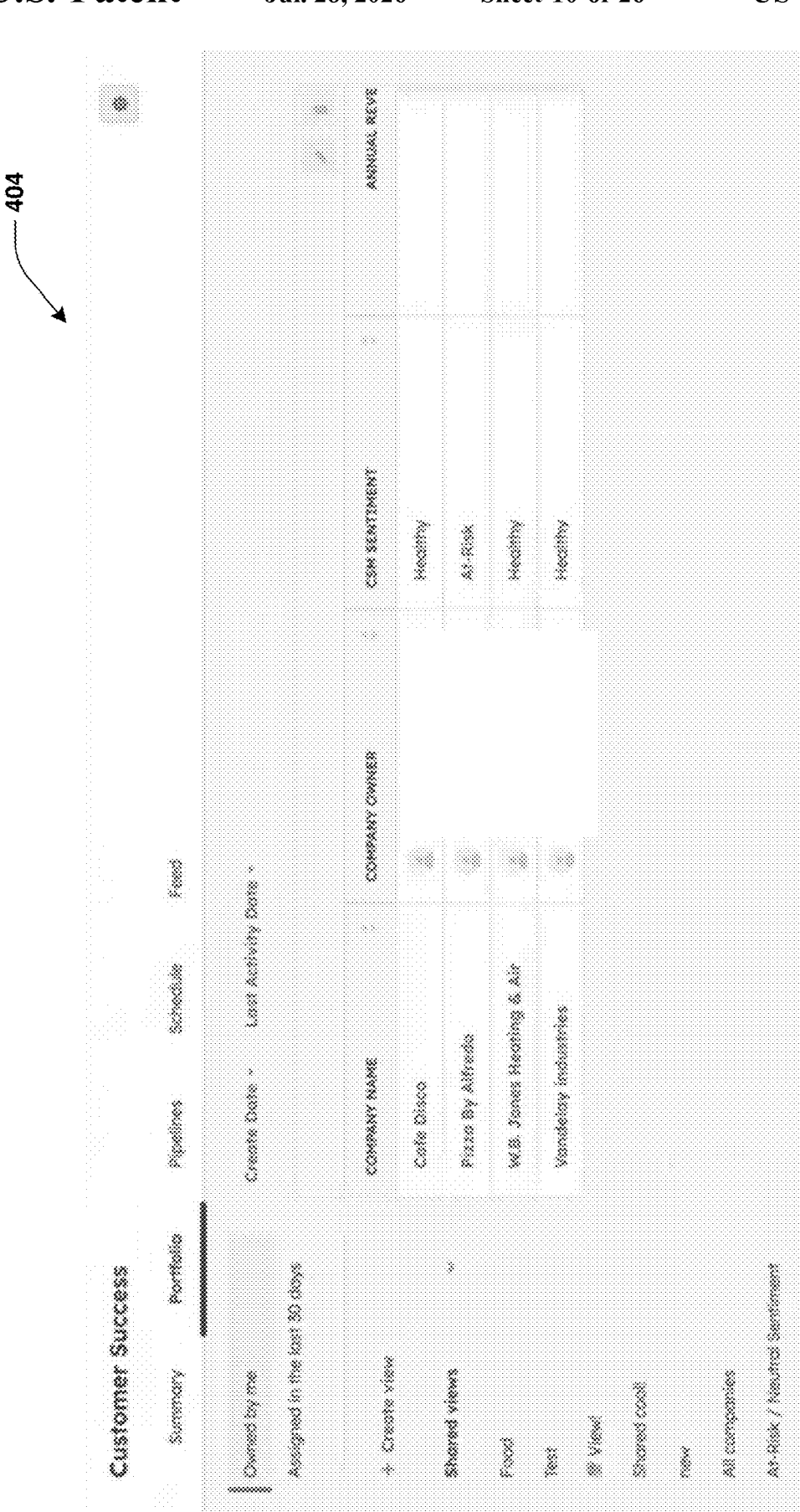
Figure 4C:
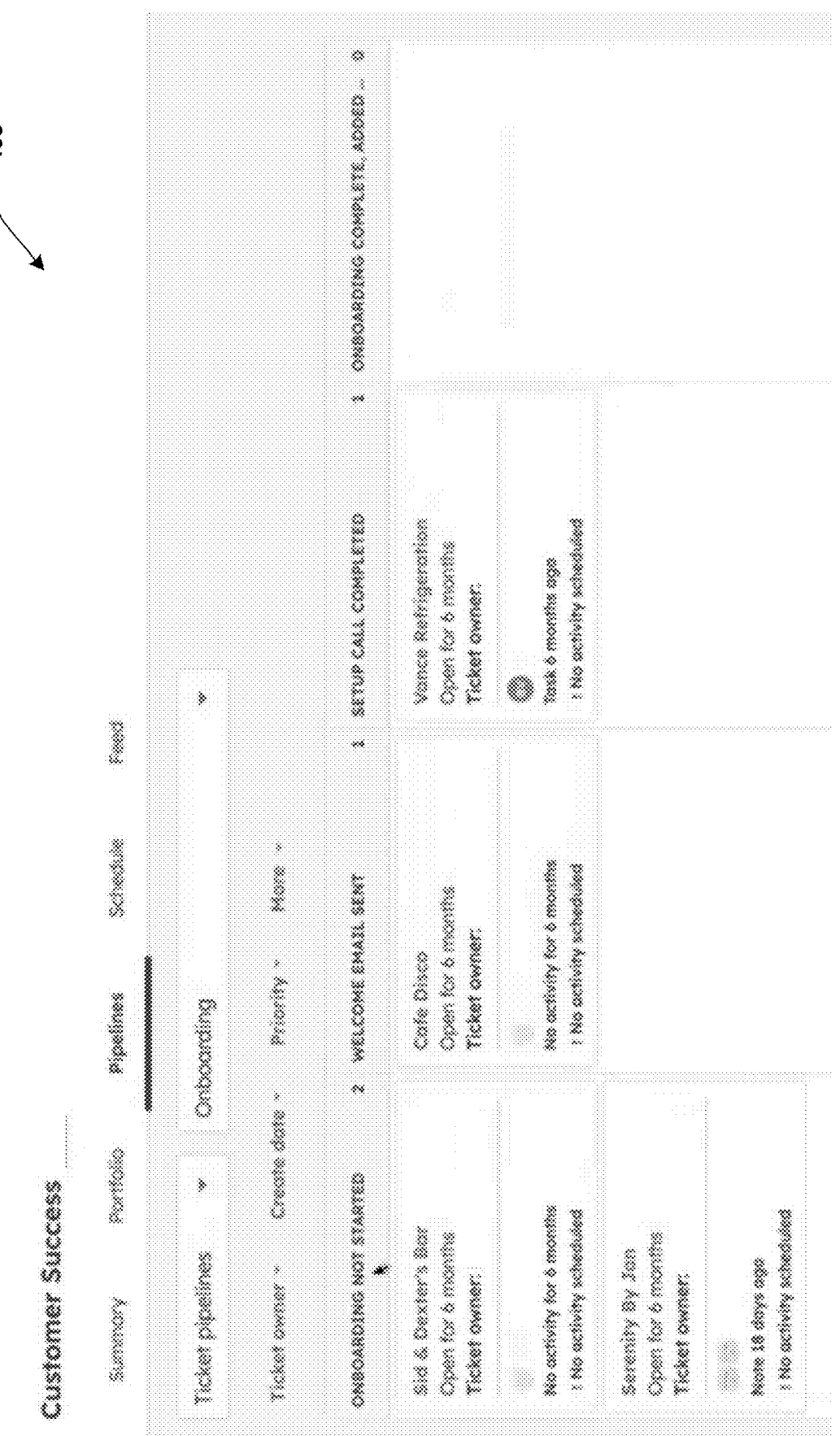
Figure 4D:
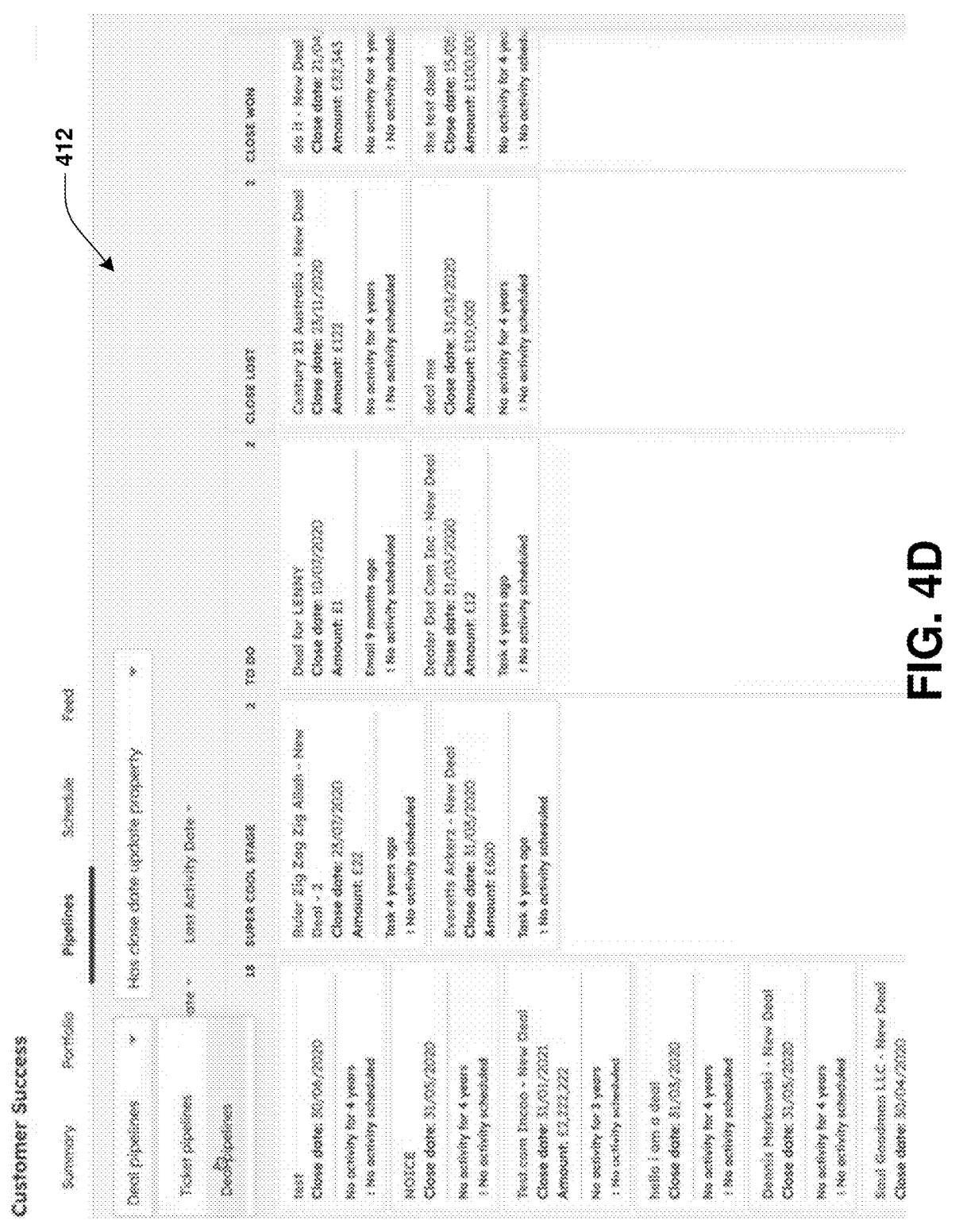
Figure 4E:
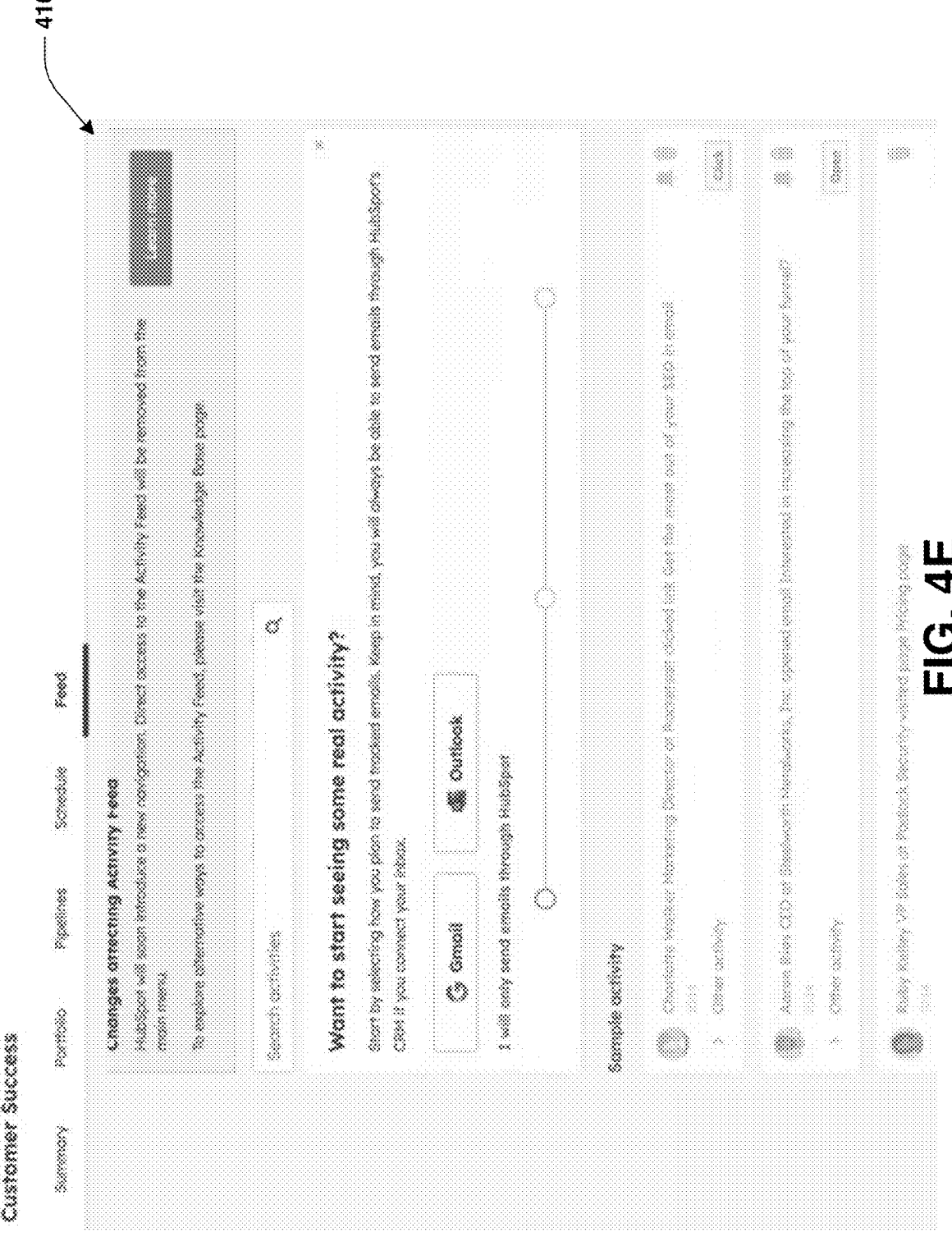
Figure 4F:
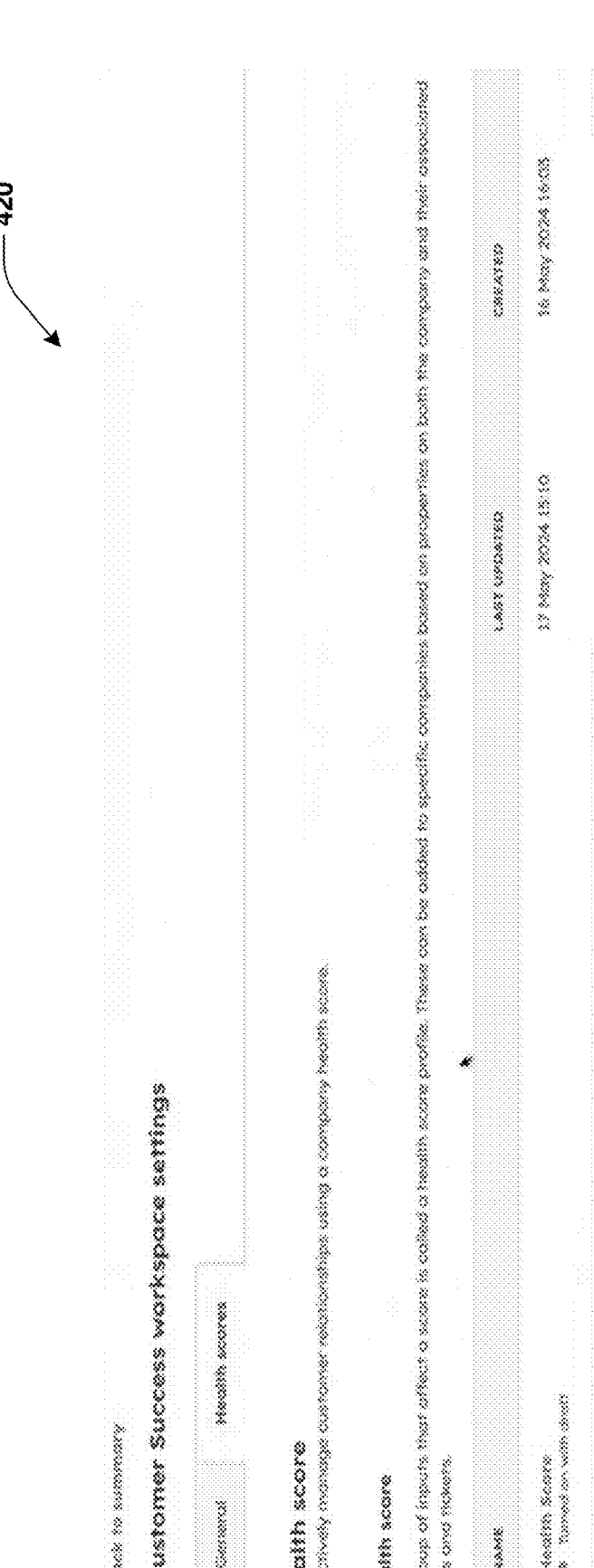
Figure 4G:
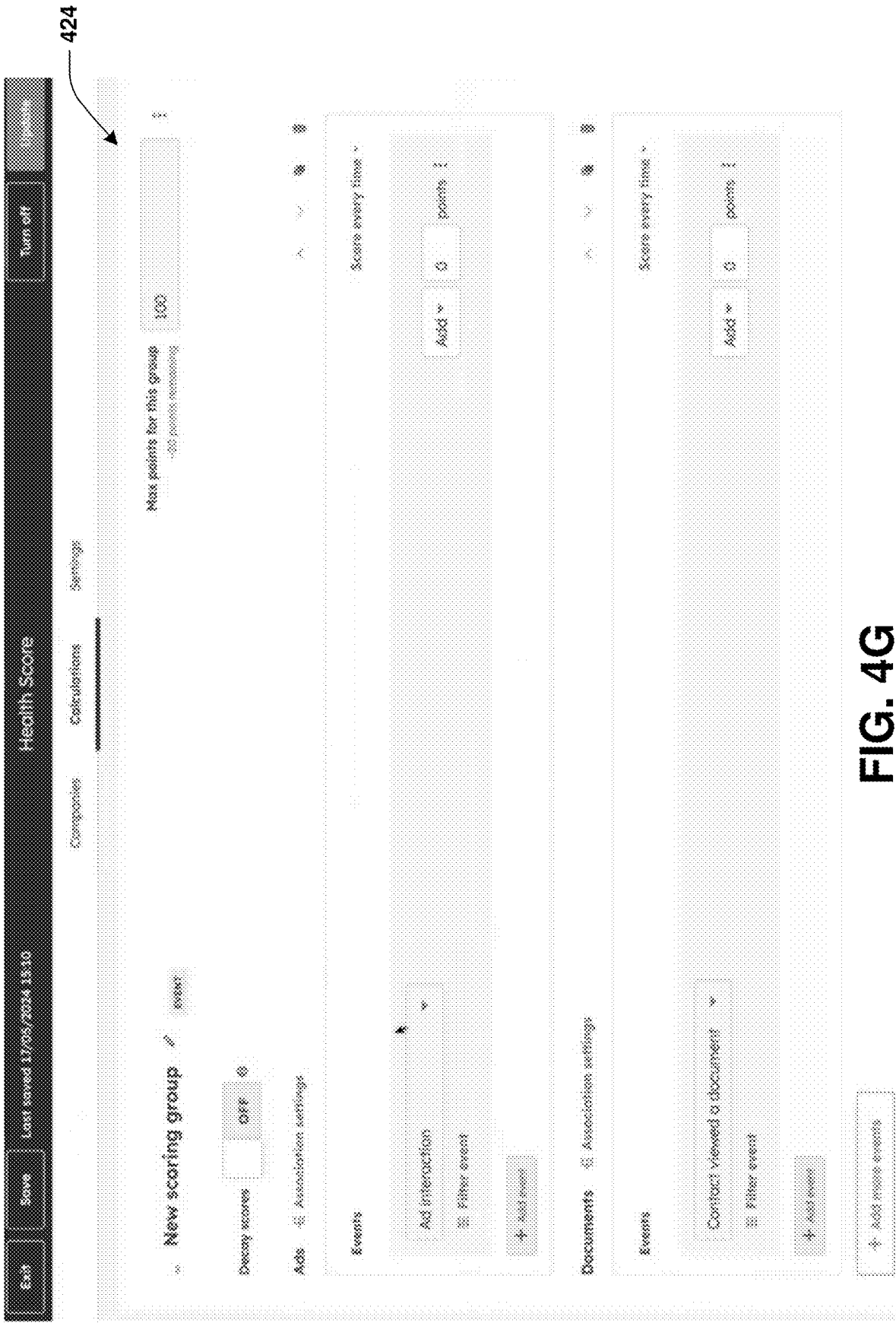
Figure 4H:
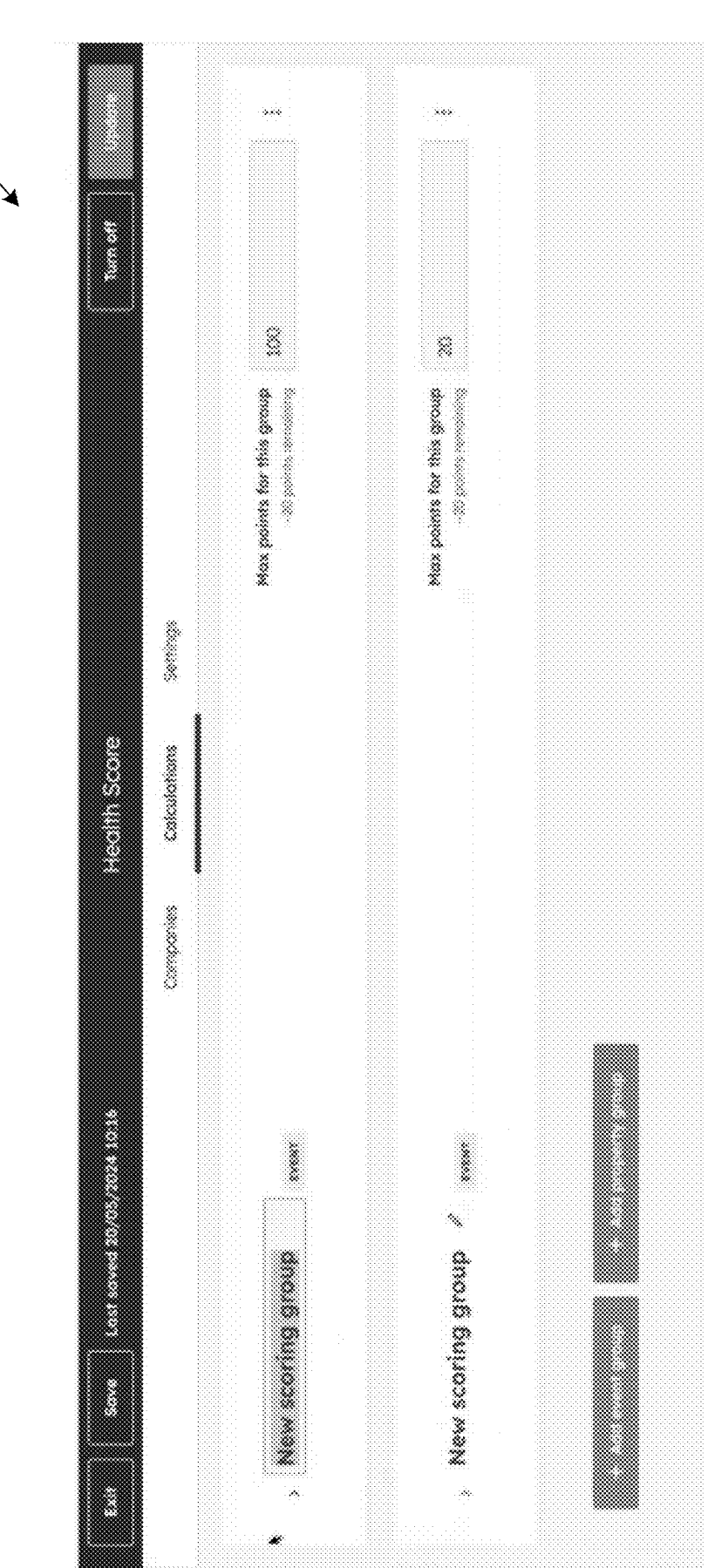
Figure 4I:
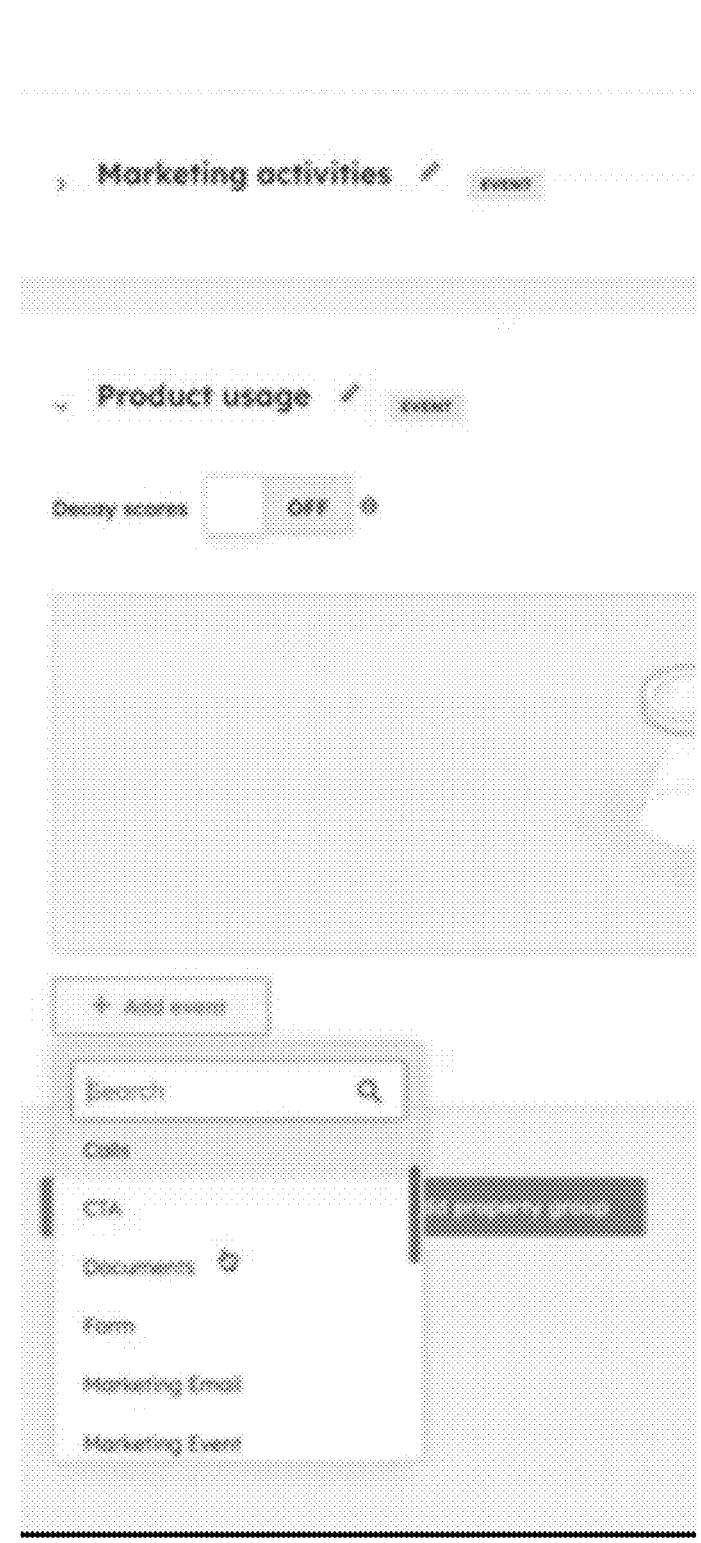
Figure 4J:
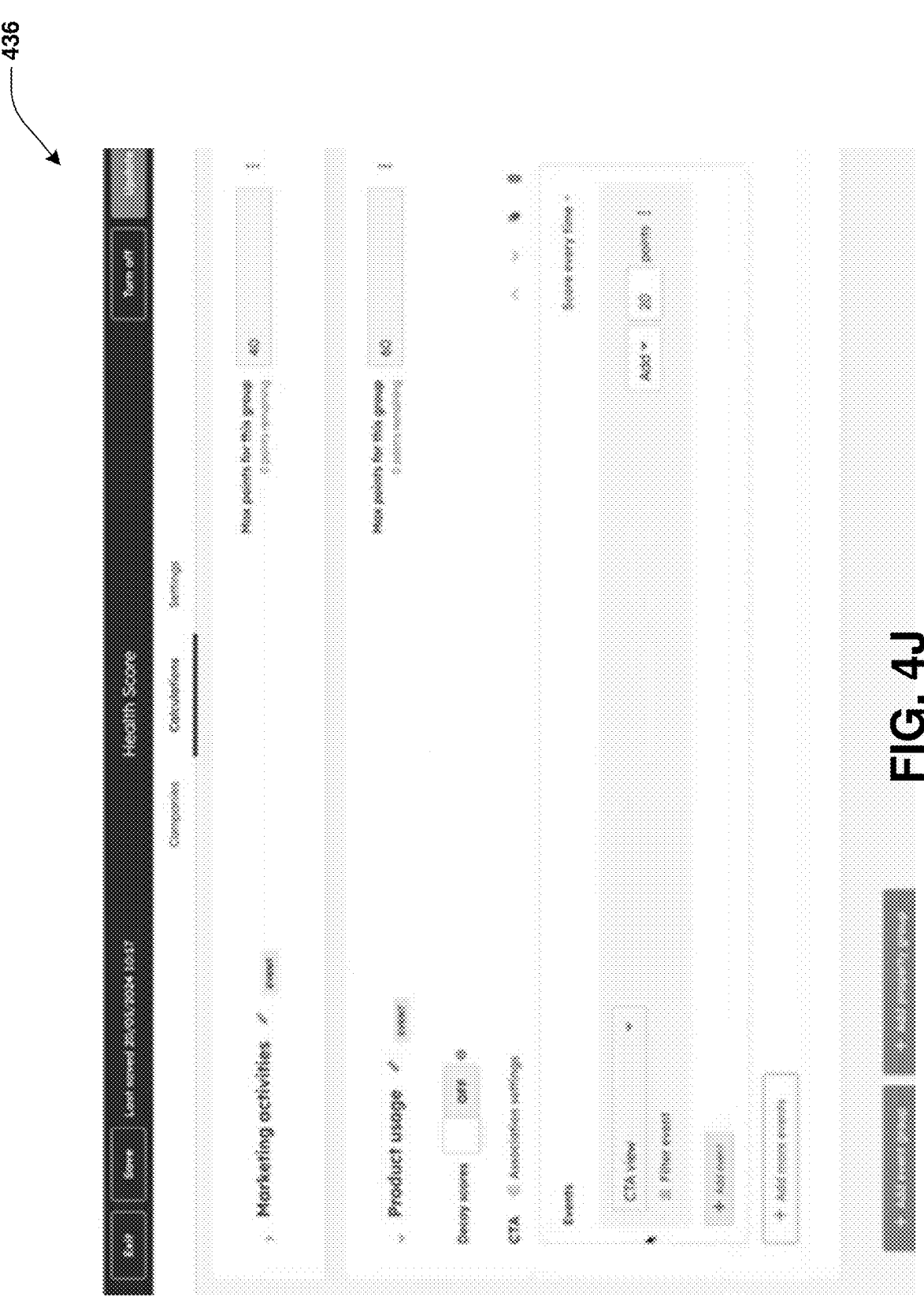
Figure 4K:
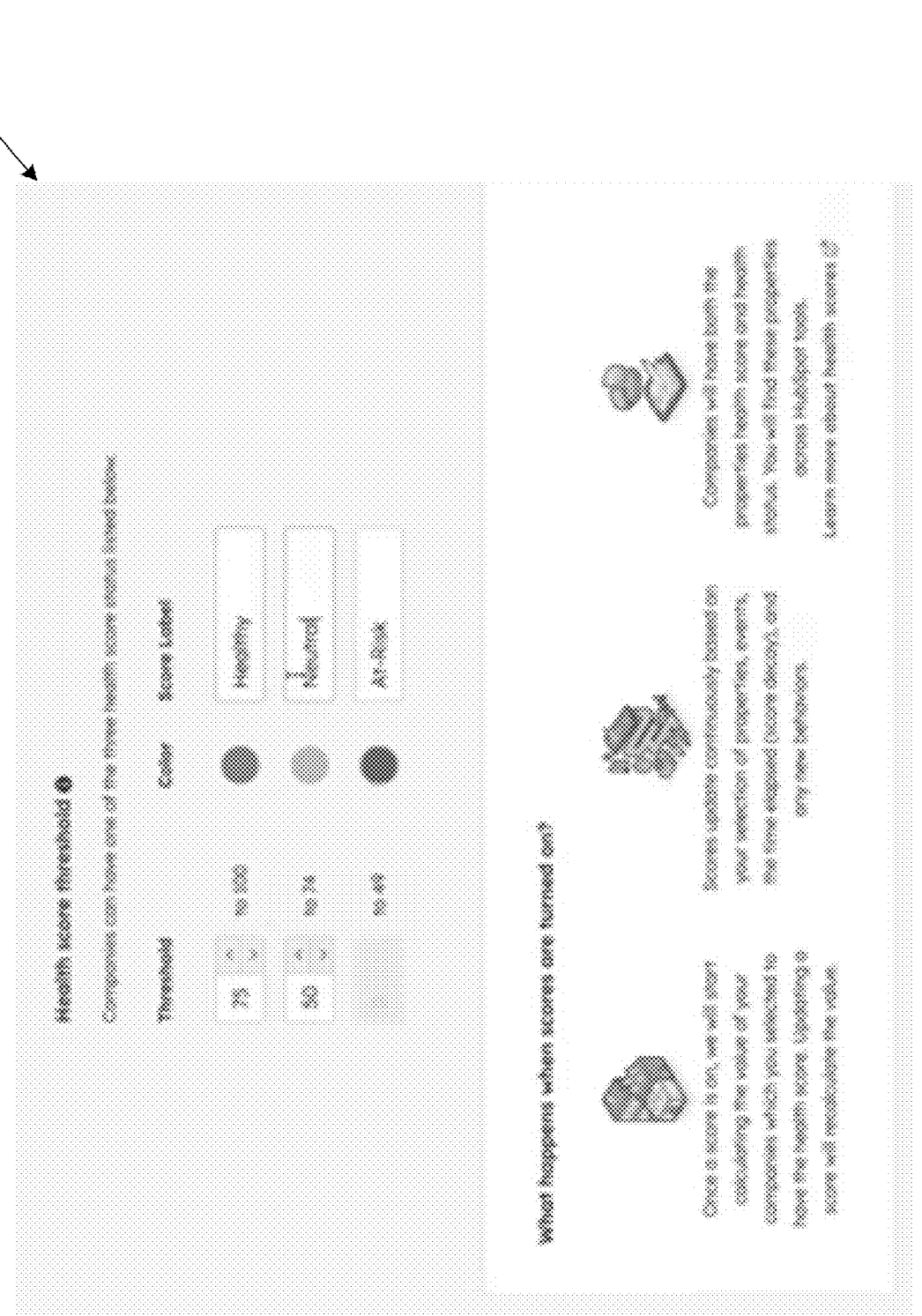
Figure 4L:
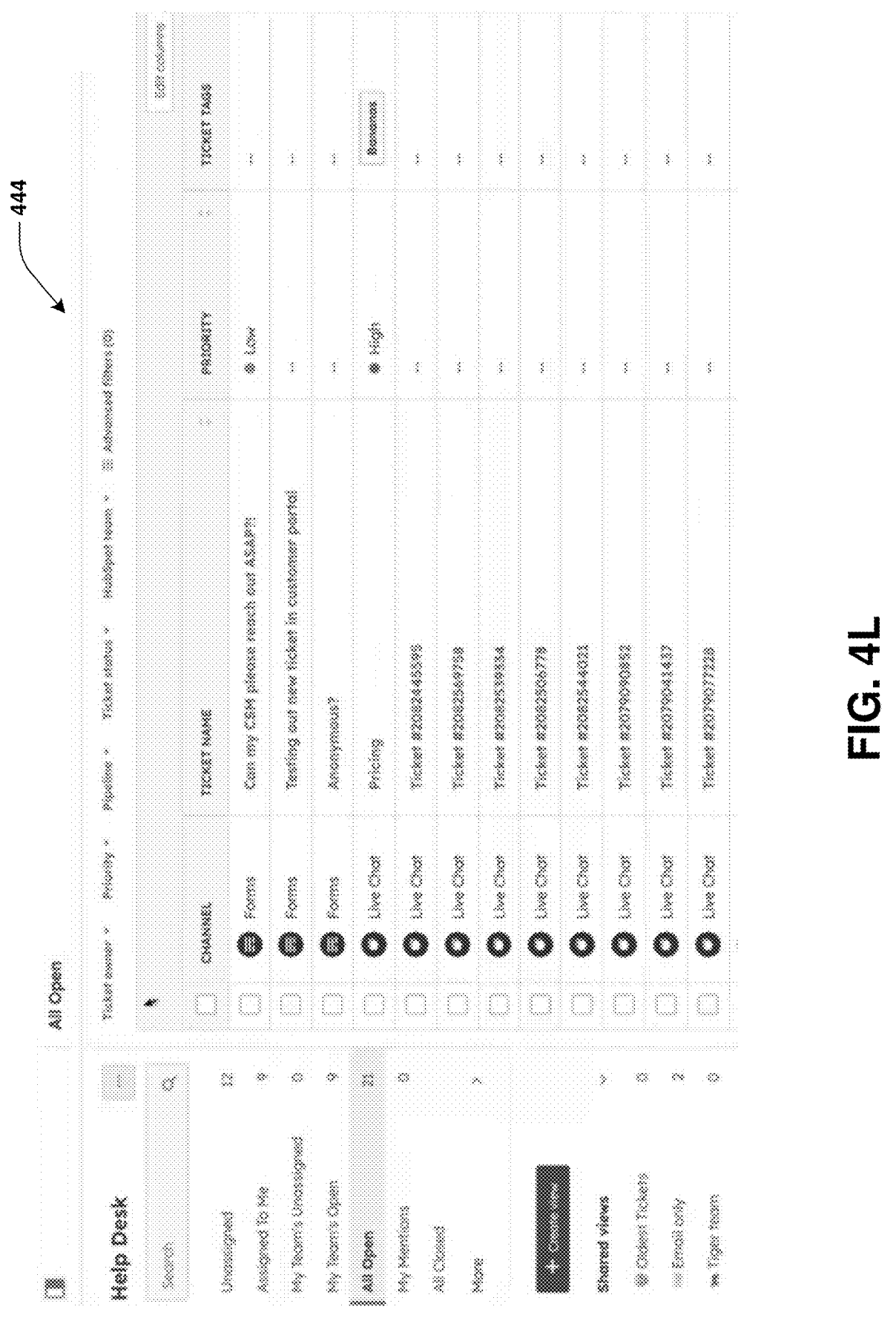
Figure 4M:
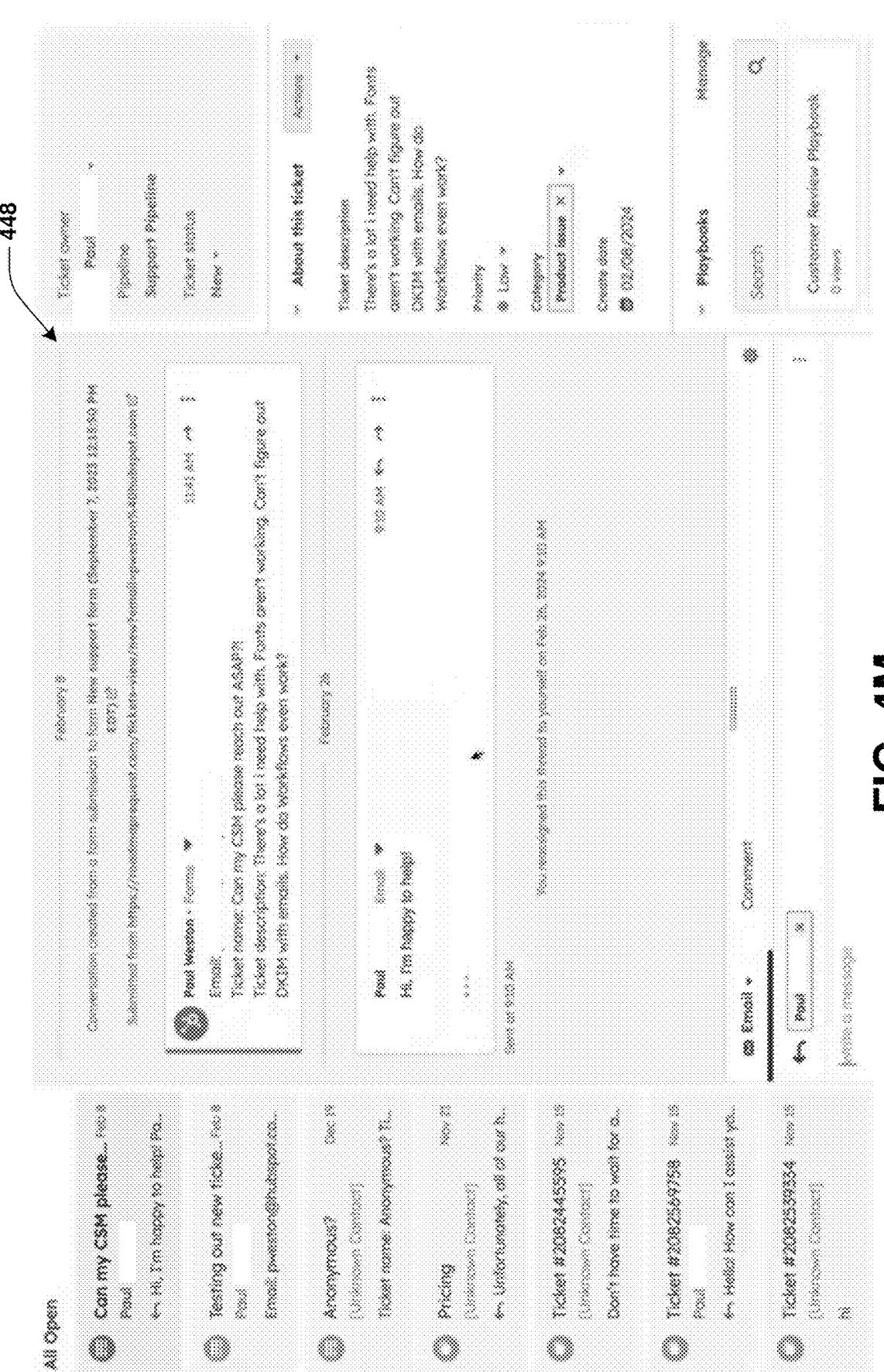
Figure 4N:
Figure 4O:
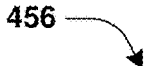
Figure 4O:

It may be appreciated that various examples of interfaces of the customer success workspace 308, the helpdesk workspace 310, and/or the workspace user interface 304 are illustrated by FIGS. 4A-4O. FIG. 4A illustrates an embodiment 400 of the portfolio interface 314 that includes companies (customers) assigned to a current user, recently assigned companies, task progress information, scheduling information such as the ability to connect to a calendar of the current user for pulling calendar information into the customer success workspace 308, task information (e.g., tasks due today, overdue tasks, tasks due tomorrow), reporting information, etc. FIG. 4B illustrates an embodiment 404 of the portfolio interface 314 that includes a list of companies (customers) assigned to the current user, along with various information such as sentiment (e.g., is a customer at risk for churning or healthy/content). FIG. 4C illustrates an embodiment 408 of the pipeline interface 316 that is populated with ticket information such as ticket pipelines, ticket owner, create date, priority, and ticket progress (e.g., onboarding not yet started, welcome email, setup call, onboarding complete, etc.). FIG. 4D illustrates an embodiment 412 of the pipeline interface 316 displaying deal pipelines populated with information such as deal close dates, staging information, to do information, close lost information (e.g., a deal did not close), close won information (e.g., a deal closed), etc. FIG. 4E illustrates an embodiment 416 of the feed interface 318 populated with activity feed information, along with the ability to connect to email/calendar data. FIG. 4F illustrates an embodiment 420 of a customer success workspace settings page, such as where health scores (predictive health scores) can be managed.

FIG. 4G illustrates an embodiment 424 of a health score interface, which may be associated with the workspace user interface 304. The health score interface may allow a user to assign points to a health score of a customer every time an event occurs such as the customer interacting with an advertisement or viewing a document. FIG. 4H illustrates an embodiment 428 of a health score interface, which may be associated with the workspace user interface 304. The health score interface may allow a user to create scoring groups, and assign maximum points for the scoring groups. For example, a health score may have a maximum value such as 100, and thus the total maximum points contributed by all of the scoring groups is equal to 100. FIG. 4I illustrates an embodiment 432 of an interface through which users can define events, such as marketing activities, product usage (e.g., a user consuming a service as such an AI image generator service), and/or other events that could be used by the workspace user interface 304 and/or the helpdesk interface 320, such as to generate predictive health scores. FIG. 4J illustrates an embodiment 436 of a health score interface, which may be associated with the workspace user interface 304. The health score interface may allow a user to assign points to a health score of a customer every time an event occurs such as a marketing activity, a product usage activity, etc. FIG. 4K illustrates an embodiment 440 of a health score interface, which may be associated with the workspace user interface 304. The health score interface may allow a user to define health score thresholds such as colors and score labels for various threshold ranges of health scores. Alerts, automated workflows, and/or other actions may be executed when a health score (predictive health score) falls within a certain threshold range.

FIG. 4L illustrates an embodiment 444 of the helpdesk interface 320, which may be populated with ticket information, such as communication channels associated with tickets (e.g., a user creating a ticket through a form, or the ticket being generated based upon a live or AI chat), ticket names, ticket priorities, ticket tags, the ability to view certain tickets such as assigned tickets assigned to a current user, unassigned tickets, closed tickets, tickets associated with a team to which the current user is a member, etc. The user can create views for the tickets. FIG. 4M illustrates an embodiment 448 of the helpdesk interface 320, which may be populated with ticket information, such as where a user can view or send emails related to tickets, view open tickets, and view ticket details. FIG. 4N illustrates an embodiment 452 of a workflow interface populated with information from objects used by the customer success workspace 308 and/or the helpdesk workspace 310. The workflow interface may be populated with workflow names, whether the workflows are turned on/off, a description of a workflow, an object type of an associated object, etc. FIG. 4O illustrates an embodiment 456 of a workflow interface through which a user may define a workflow that will utilize information in objects used by the customer success workspace 308 and/or the helpdesk workspace 310 (e.g., information within an email object may trigger a workflow defined to execute upon receiving an email from a customer).

During operation 206 of method 200, a user may be provided with access to the customer success workspace 308 and/or the helpdesk workspace 310 through the workspace user interface 304 (e.g., the workspaces may be displayed as separate interface windows at the same time, or the user may transition between different workspaces through a single interface window). During operation 208 of method 200, the helpdesk workspace 310 is provided with access to objects used by the customer success workspace 308, and the customer success workspace 308 is provided with access to objects used by the helpdesk workspace 310.

In some embodiments, a predictive health score may be generated. In some embodiments, the predictive health score may be defined by user input through the customer success workspace 308, which may specify weights, events, and/or properties used to generate the predictive health score. The predictive health score may be based upon information from various data sources (e.g., information related to whether a customer has submitted a service ticket, purchased a service, not paid a bill, sent an email with a negative or positive sentiment, ignored calls/emails, etc.), which may be stored by the customer success workspace 308 within an object in the CRM database. The helpdesk workspace 310 may be provided with access to the predictive health score through the object. In some embodiments, a predictive health score is used to support out of the box churn risk identification for customer success agents/users to prioritize. By making predictive health score data available to helpdesk users (customer service agents), low touch customer follow-up can be performed by the helpdesk agents (e.g., a helpdesk agent can contact a customer that is not generally contacted by customer success agents). The predictive health score data can be used by AI to automate the scheduling of meetings, provide information extracted from features, etc. Predictive health scores may be generated based upon customers from similar industries, company sizes, types of products and services sold, etc., and thus predictive health scores can be provided as a default out-of-the-box experience. The user may be provided with the option to fine-tune predictive health scores by customizing weights and/or adding signals (e.g., properties or external data) used to calculate the predictive health scores.

In some embodiments, ticket data may be generated through the helpdesk workspace 310. The ticket data may be stored within objects, such as ticket objects within the CRM database. The objects may be made accessible to the customer success workspace 308. In some embodiments, objects used by the customer success workspace 308 and/or the helpdesk workspace 310 may be made available to other services, such as an automation workflow service and/or an AI service (e.g., an AI agent).

Figure 3A:
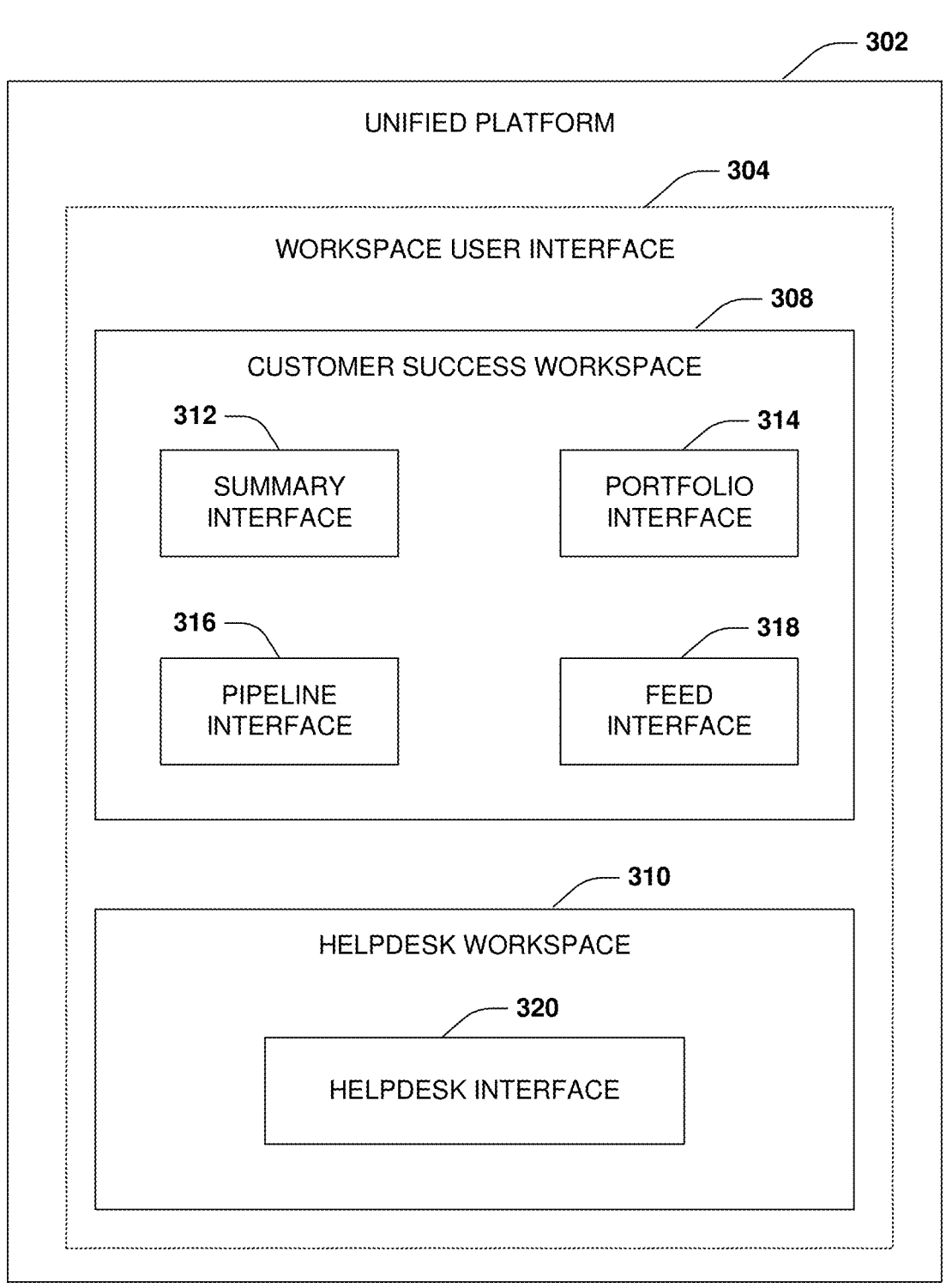
FIG. 3A is a block diagram illustrating an embodiment of a unified platform hosting multiple workspaces, in accordance with an embodiment of the present technology.
Figure 3B:
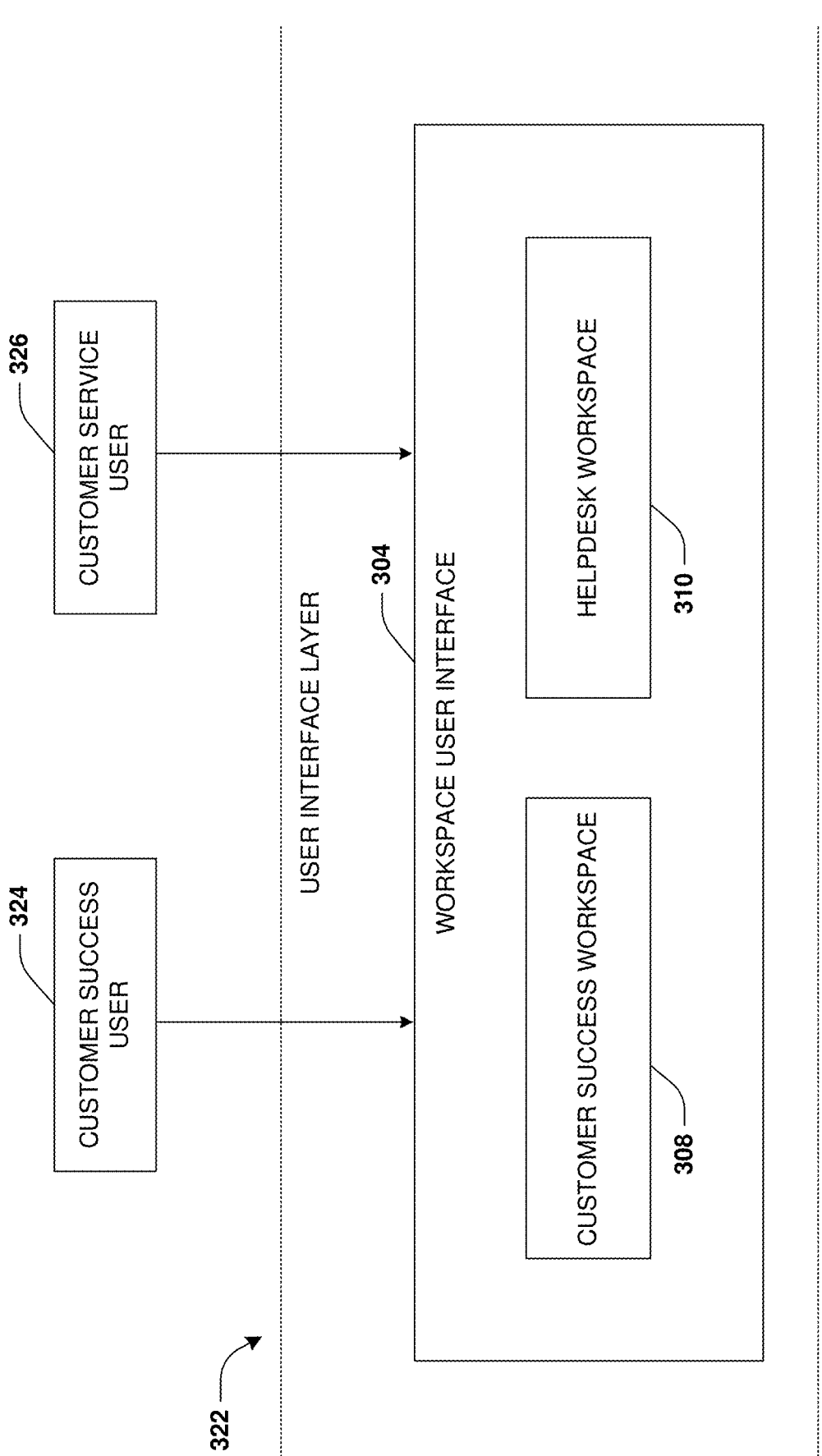
FIG. 3B is a block diagram illustrating an embodiment of a user interface layer of a unified platform hosting multiple workspaces, in accordance with an embodiment of the present technology.

FIG. 3B illustrates a user interface layer 322 of the unified platform 302. The user interface layer 322 may provide users with access to both the customer success workspace 308 and the helpdesk workspace 310. For example, a customer success user 324 may be provided with access to the customer success workspace 308. A customer service user 326 may be provided with access to the helpdesk workspace 310. In some embodiments, the customer success workspace 308 and the helpdesk workspace 310 may be provided through a single workspace environment, such as the workspace user interface 304.

Figure 3C:
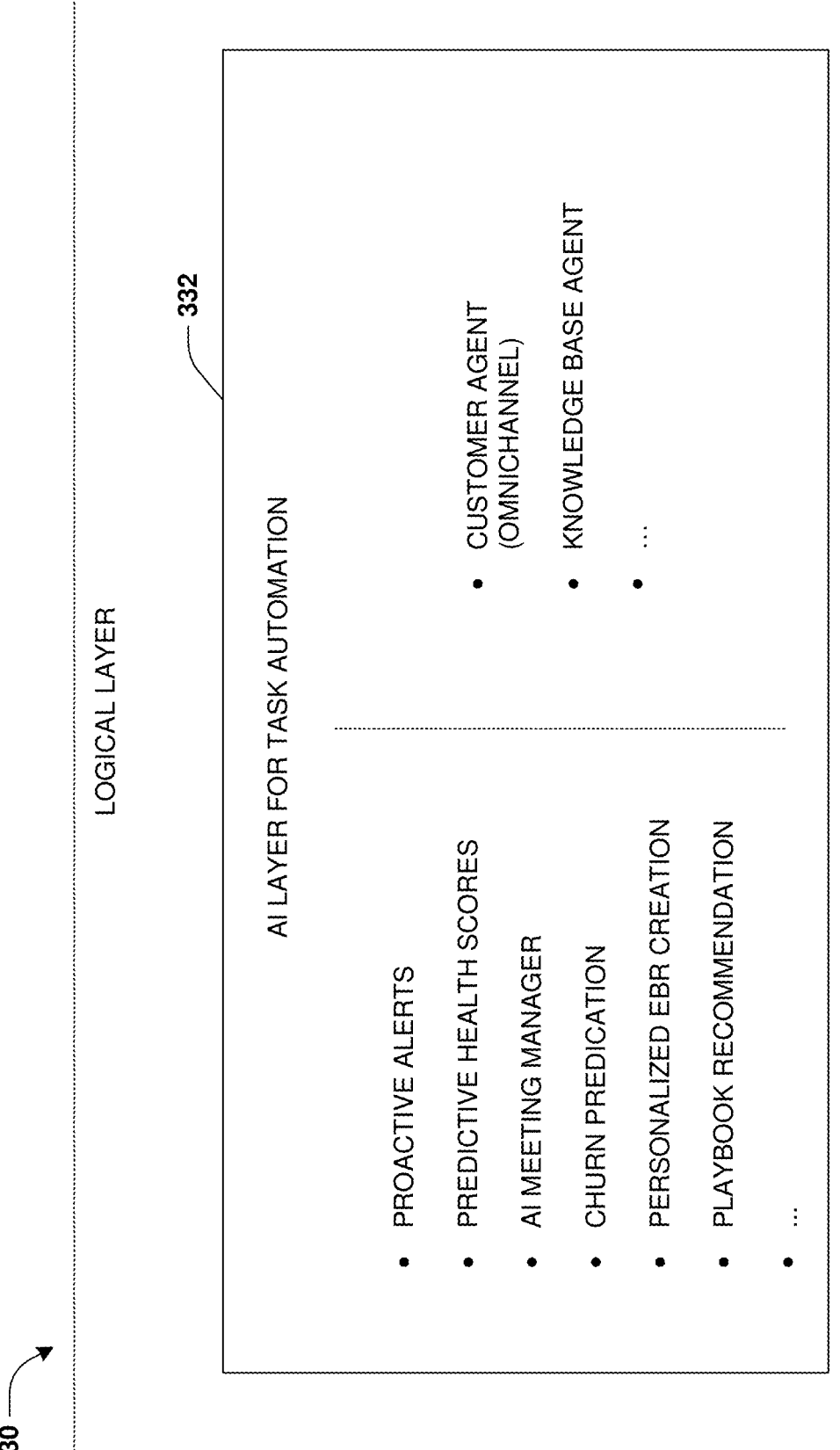
FIG. 3C is a block diagram illustrating an embodiment of a logical layer of a unified platform hosting multiple workspaces, in accordance with an embodiment of the present technology.

FIG. 3C illustrates a logical layer 330 of the unified platform 302. In some embodiments, the logical layer 330 includes an AI layer 332 for task automation. The logical layer 330 may implemented proactive alerts (e.g., an alert may be generated through the customer success workspace 308 and/or the helpdesk workspace 310 based upon information stored within objects of the CRM database, such as an alert that a predictive health score is below a threshold, or that a ticket has been pending for resolution beyond a threshold time), churn prediction (e.g., a prediction that a customer may cancel a service), predictive health scoring (e.g., a score corresponding to customer satisfaction and how likely a customer may churn), personified electronic batch records creation, an AI meeting manager (e.g., AI functionality used to schedule meetings such as to process/resolve tickets or with customers to contact as part of closing a deal or other reason), a playbook recommender (e.g., a recommendation of actions to perform to resolve an issue), an omnichannel agent such as a customer agent (e.g., an AI agent capable of communicating over various communication channels or performing actions based upon information within messages sent/received over the communication channels), and/or a knowledge base agent (e.g., an AI agent capable of providing recommendations of tasks to perform through the customer success workspace 308 and/or the helpdesk workspace 310).

In some embodiments, the logical layer 330 may apply artificial intelligence to perform tasks. In some embodiments, the logical layer 330 may implement a customer agent, a knowledge base agent, or other type of agent. In some embodiments, the logical layer 330 may implement a customer success agent that includes predictive health scoring. Between the customer agent, the customer success agent, and the helpdesk workspace 310, a user may have access to work across all default/core and customized objects. For example, a drop in a health score may be detected, and the user may be alerted with specific information of what contributed to the drop, and is provided with playbooks that the user should follow (e.g., a playbook of actions to perform, such as calling a customer, sending an email to a customer, changing a configuration parameter, providing a customer with an article, working on a service ticket, etc.). Sentiment analysis may be performed on structured and unstructured data sources as signals for account prioritization and proactive engagement such as where the user is directed to proactively reach out to higher prioritize customers (e.g., customers with a highly negative sentiment in their communication). Key stakeholder changes may be detected, and automatic follow-up emails and scheduled follow-ups may be created with current/new key stakeholders (e.g., a purchasing agent of a customer with which a deal could be closed). The user (a customer success manger) may be guided with how to process handoffs of deals from a sales team, such as by sharing customer goals and key performance indicators with the customer success manger to help perform a productive onboarding process. Quarterly business reviews may be prepared, and opportunities may be identified for customers to maximize the product or service usage in support of meeting customer goals and key performance indicators.

Figure 3D:
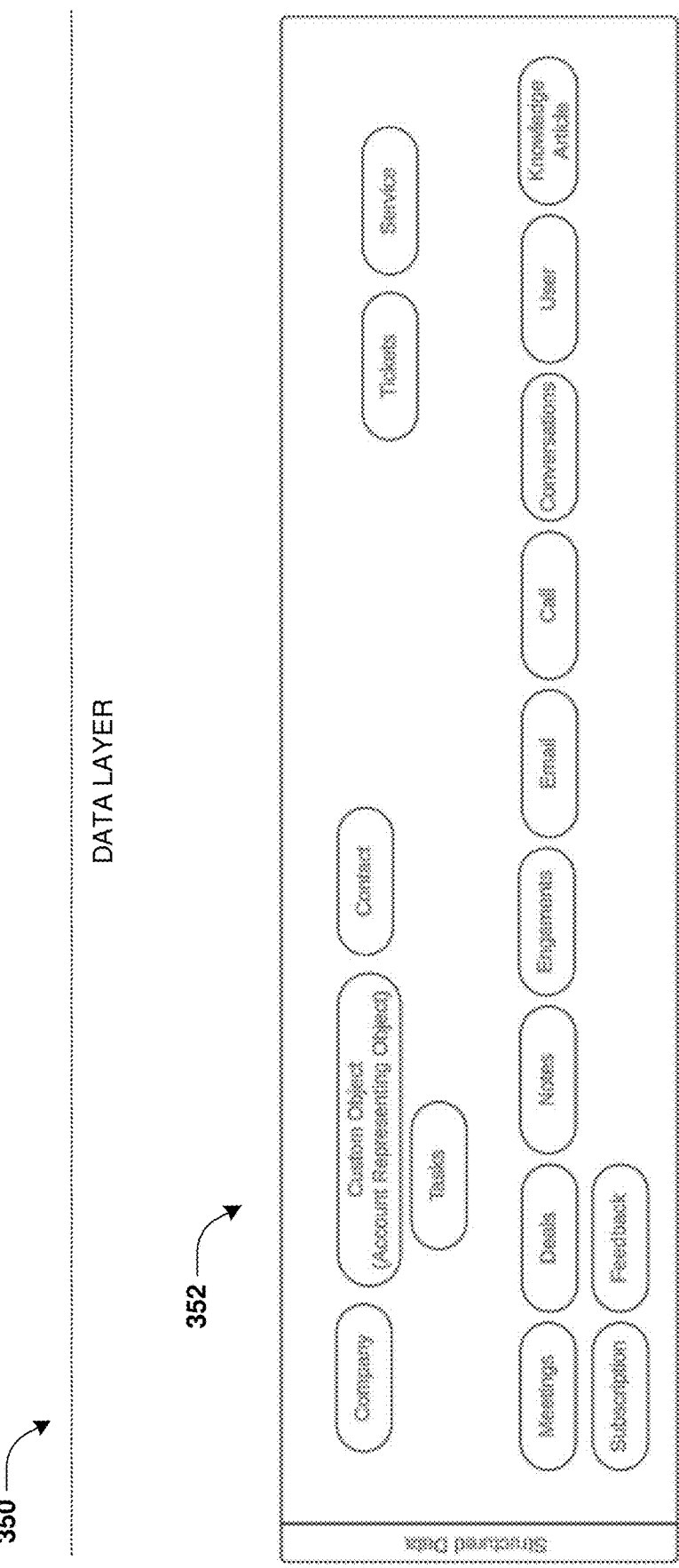
FIG. 3D is a block diagram illustrating an embodiment of a data layer of a unified platform hosting multiple workspaces, in accordance with an embodiment of the present technology.

FIG. 3D illustrates an embodiment of a data layer 350 that provides the unified platform 302 with access to structured data 352. In some embodiments, the structured data 352 may be provided to and/or shared between the customer success workspace 308 and the helpdesk workspace 310 of the user interface layer 322. The data layer 350 may provide access to objects within the CRM database, such as a company object, a task object, a contact object, custom objects (e.g., an account representing object associated with the company object, the task object, and the contact object), meeting objects, subscription objects, deal objects, feedback objects, notes objects, engagement objects, email objects, call objects, conversation objects, user object, knowledge article objects, ticket objects, service objects, and/or other objects that may be leveraged and/or shared between the customer success workspace 308 and the helpdesk workspace 310 of the user interface layer 322. The structured data 352 may be stored as objects, files, or as other data structures, and may be locally available to the data layer 350, or the data layer 350 may retrieve the structured data 352 from various data sources.

Figure 3E:
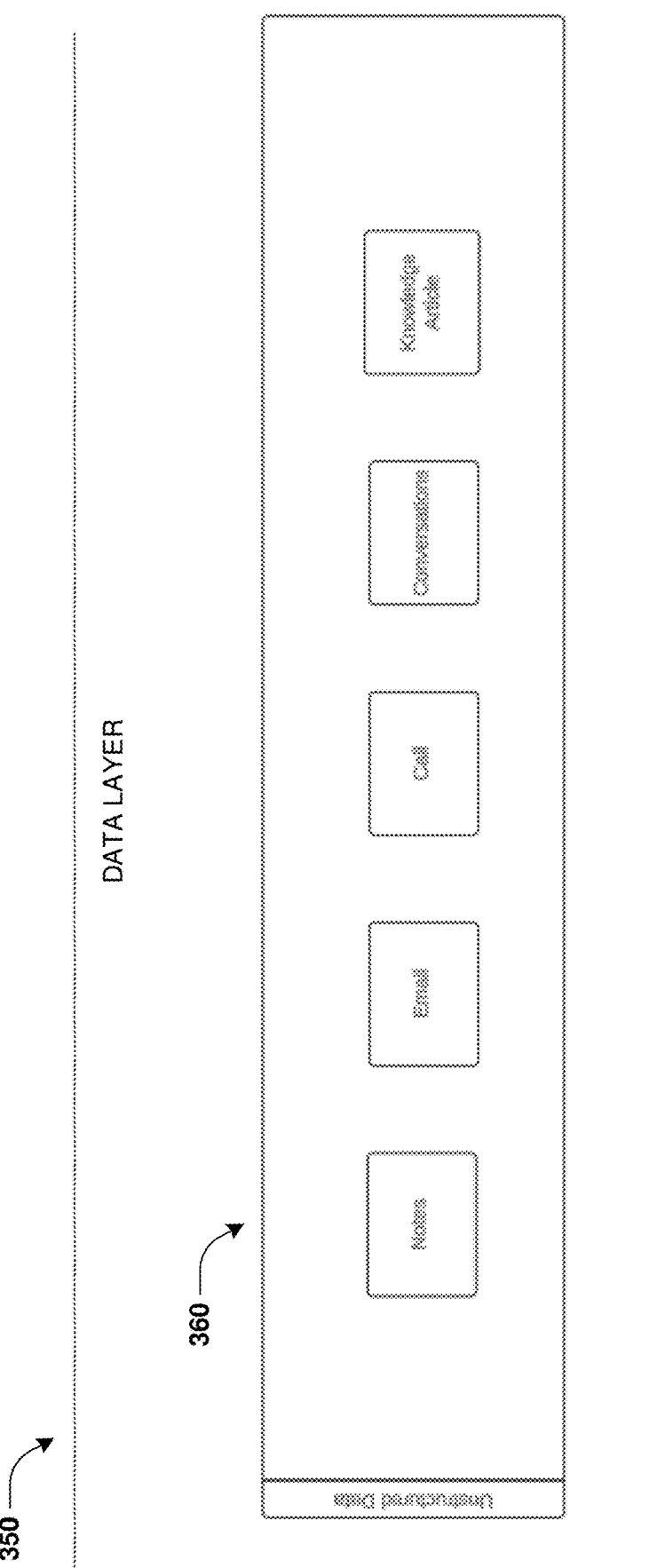
FIG. 3E is a block diagram illustrating an embodiment of a data layer of a unified platform hosting multiple workspaces, in accordance with an embodiment of the present technology.

FIG. 3E illustrates an embodiment of the data layer 350 that provides the unified platform 302 with access to unstructured data 360. The unstructured data may include notes, emails, calls (e.g., recorded calls or call transcripts), conversations (e.g., chat bot conversations, transcriptions of recorded call conversations, email conversations, conversations with messages/calls across different communication mediums, etc.), knowledge articles, etc. In some embodiments, the unstructured data 360 may be provided to and/or shared between the customer success workspace 308 and the helpdesk workspace 310 of the user interface layer 322. The unstructured data 360 may be stored as objects, files, or as other data structures, and may be locally available to the data layer 350, or the data layer 350 may retrieve the structured data 352 from various data sources.

Figure 3F:
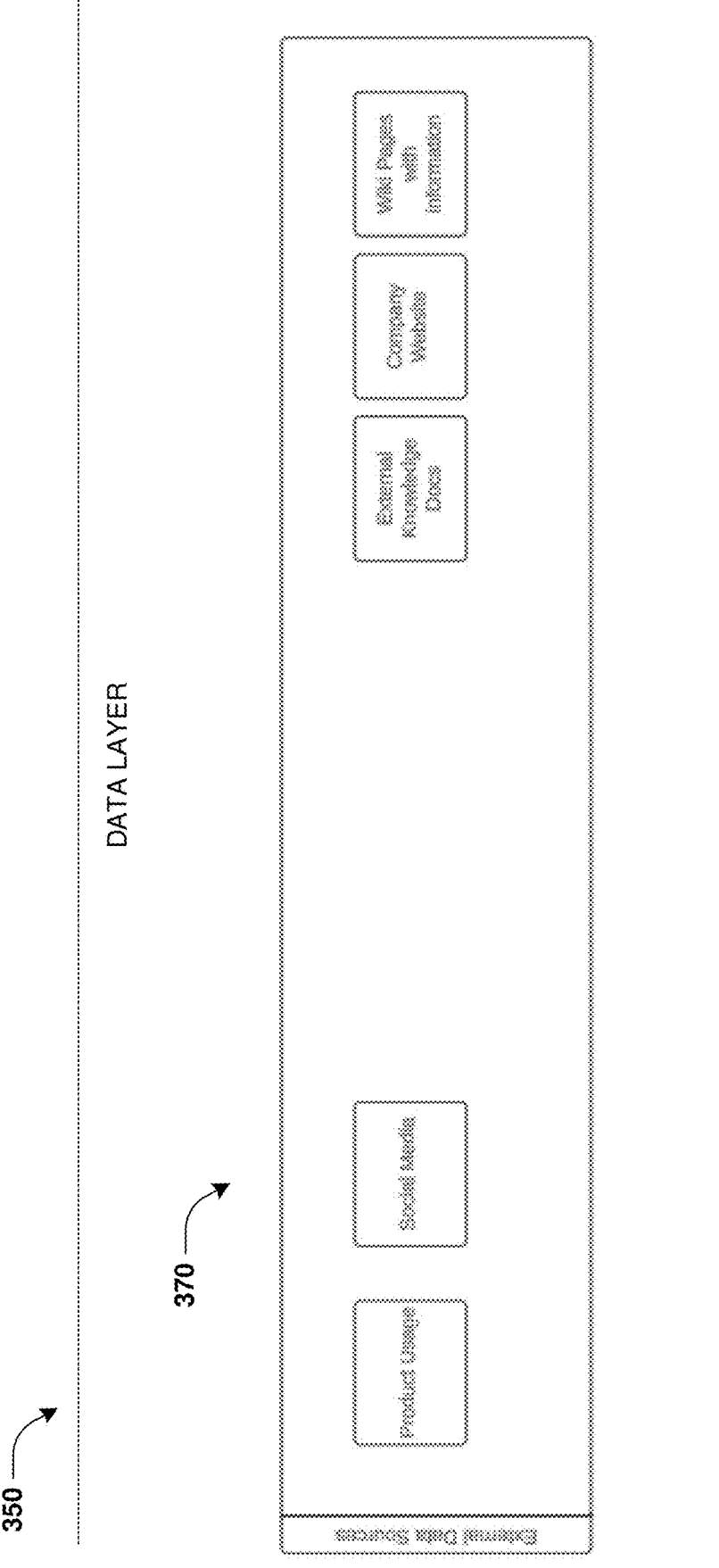
FIG. 3F is a block diagram illustrating an embodiment of a data layer of a unified platform hosting multiple workspaces, in accordance with an embodiment of the present technology.

FIG. 3F illustrates an embodiment of the data layer 350 that provides the unified platform 302 with access to extracted data 370 from various data sources, such as product usage data (e.g., a smart speaker may store usage statistics within a cloud storage repository), social media data (e.g., customers posting about products, viewing advertisements, interacting with content recommendations, etc.), external knowledge documents (e.g., product documentation), company website data (e.g., company information extracted from a customer website), webpage with information (e.g., a product review website), and/or other data extracted from data sources that may be external to the unified platform 302. In some embodiments, the extracted data 370 may be provided to and/or shared between the customer success workspace 308 and the helpdesk workspace 310 of the user interface layer 322.

In some embodiments, the data layer 350 provides the various types of data to the customer success workspace 308 and the helpdesk workspace 310, and may integrate the data into various services such as AI services and machine learning models. The data may be processed using sentiment analysis (e.g., determine the sentiment of a customer email), predictive scoring, insight generation, and/or other functionality to create a result. The result may be used to populate information within properties of objects (e.g., a likelihood of customer churn property within a customer object may be increased if the result indicates that a customer is frustrated). The result may be used to generate a predictive score that can be used by the customer success workspace 308 and/or the helpdesk workspace 310.

In some embodiments, a method is provided. The method includes hosting a customer success workspace through a unified platform, wherein the customer success workspace stores data within a first object of a customer relationship management (CRM) database; hosting a helpdesk workspace through the unified platform, wherein the helpdesk workspace stores data within a second object of the CRM database; providing a user with access to the customer success workspace and the helpdesk workspace of the unified platform through a workspace user interface; and providing the helpdesk workspace with access to the first object and the customer success workspace with access to the second object.

In some embodiments, the method includes generating a predictive health score stored by the customer success workspace through the first object; and providing the helpdesk workspace with access to the predictive health score through the first object.

In some embodiments, the method includes generating ticket data stored by the helpdesk workspace through the second object; and providing the customer success workspace with access to the ticket data through the first object.

In some embodiments, the method includes populating, the by unified platform, the customer success workspace with an interface corresponding to at least one of: a summary interface populated with task progress information; a portfolio interface populated with customers that are managed by a current user of the customer success workspace; a pipeline interface populated with ticket data; or a feed interface populated with activities related to the customers managed by the current user; and populating the interface with information from the second object accessible to both the customer success workspace and the helpdesk workspace.

In some embodiments, the method includes populating, the by unified platform, the helpdesk workspace with an interface populated with channel information, ticket names, ticket priorities, ticket tags, ticket status information, and ticket assignment information.

In some embodiments, the method includes providing an automation workflow with access to the first object and the second object for workflow execution.

In some embodiments, the method includes providing an artificial intelligence service with access to the first object and the second object.

In some embodiments, the method includes creating, through the helpdesk workspace, a ticket stored as an object within the CRM database; and providing information about the ticket through the customer success workspace using the object.

In some embodiments, the method includes in response to receiving user input through the customer success workspace, configuring weights, events, and properties used to generate a predictive health score.

In some embodiments, a computing device is provided. The computing device comprises a memory comprising machine executable code; and a processor coupled to the memory, the processor configured to execute the machine executable code to cause the processor to perform operations comprising: hosting a customer success workspace through a unified platform, wherein the customer success workspace stores data within a first object of a customer relationship management (CRM) database; hosting a helpdesk workspace through the unified platform, wherein the helpdesk workspace stores data within a second object of the CRM database; providing a user with access to the customer success workspace and the helpdesk workspace of the unified platform through a workspace user interface; and providing the helpdesk workspace with access to the first object and the customer success workspace with access to the second object.

In some embodiments, the operations include hosting, by the unified platform, a data layer providing access to CRM objects as structured data, unstructured data generated from user engagement with content, and external data source integrated into an artificial intelligence service and machine learning model.

In some embodiments, the operations include processing the unstructured data utilizing at least one of sentiment analysis, predictive scoring, or insight generation to create a result; and utilizing the result to populate a property of at least one of the first object or the second object.

In some embodiments, the operations include processing the unstructured data utilizing at least one of sentiment analysis, predictive scoring, or insight generation to create a result; and utilizing the result to generate a predictive score used by at least one of the customer success workspace or the helpdesk workspace.

In some embodiments, the operations include providing, by the data layer, the customer success workspace and the helpdesk workspace with access to at least one of email objects, conversation objects, workflow objects, event objects, deal objects, customer objects, ticket objects, reporting objects, or task objects within the CRM database.

In some embodiments, the operations include hosting, by the unified platform, a logical layer applying artificial intelligence to perform tasks.

In some embodiments, the operations include hosting, by the unified platform, a logical layer implementing at least one of a customer agent, a knowledge base agent, predictive alerts, or predictive health scoring.

In some embodiments, the operations include hosting, by the unified platform, a logical layer implementing at least one of an artificial intelligence meeting manager, a playbook recommender, or an electronic batch records creator.

In some embodiments, a non-transitory machine readable medium is provided. The non-transitory machine readable medium comprises instructions for performing a method, which when executed by a machine, causes the machine to perform operations comprising hosting a customer success workspace through a unified platform, wherein the customer success workspace stores data within a first object of a customer relationship management (CRM) database; hosting a helpdesk workspace through the unified platform, wherein the helpdesk workspace stores data within a second object of the CRM database; providing a user with access to the customer success workspace and the helpdesk workspace of the unified platform through a workspace user interface; and providing the helpdesk workspace with access to the first object and the customer success workspace with access to the second object.

In some embodiments, the operations include hosting, by the unified platform, a user interface layer that provides the customer success workspace and the customer success workspace through a single workspace environment.

In some embodiments, the operations include hosting, by the unified platform, a logical layer implementing at least one of proactive alerts, churn prediction, predictive health scoring, personified electronic batch records creation, an artificial intelligence meeting manager, a playbook recommender, an omnichannel agent, or a knowledge base agent.

Figure 5:
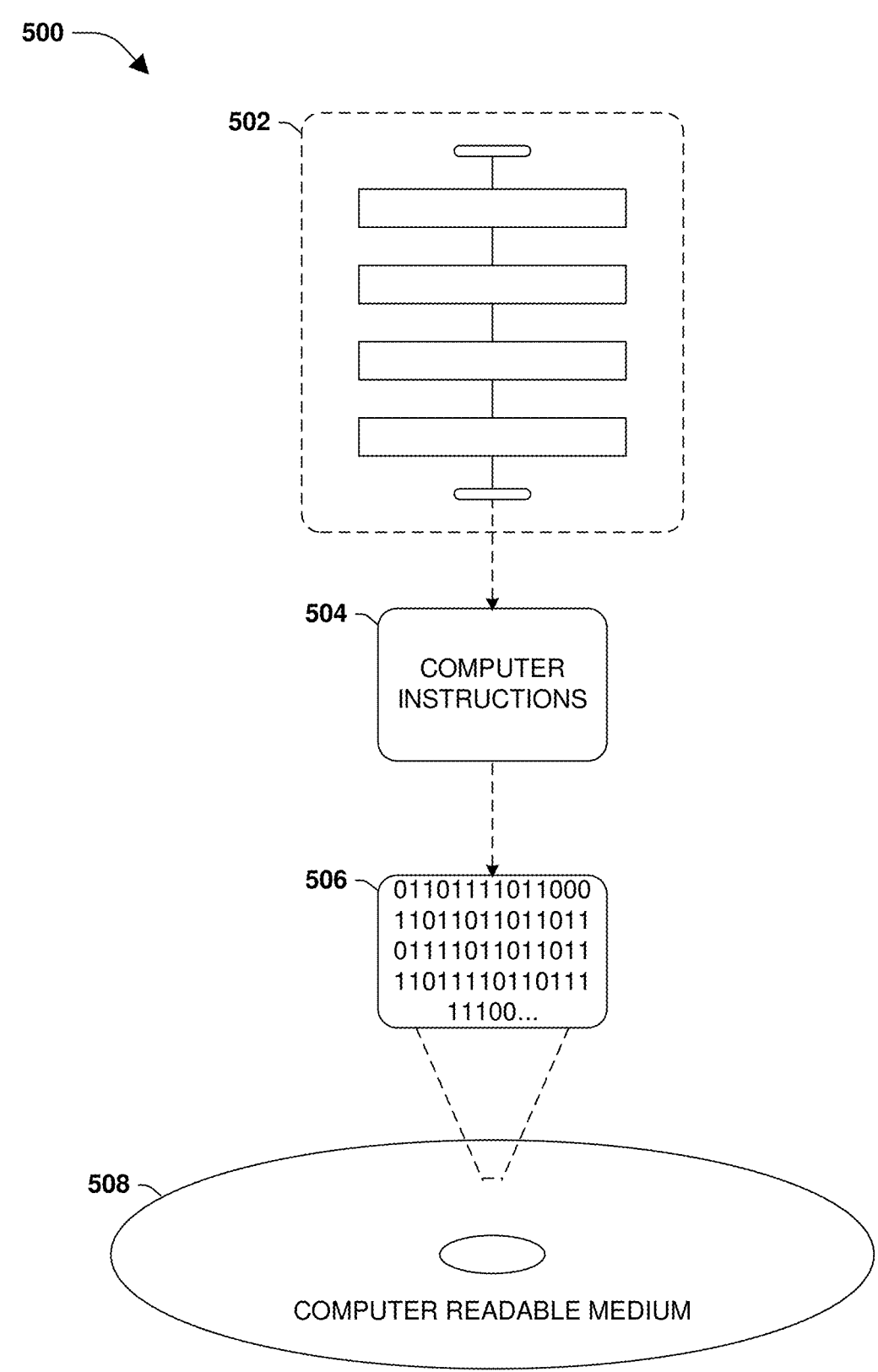
FIG. 5 is an example of a computer readable medium in which an embodiment of the present technology may be implemented.

A computer-readable medium comprises processor-executable instructions configured to implement one or more of the techniques presented herein. An example embodiment of a computer-readable medium or a computer-readable device is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, for example. In some embodiments, the processor-executable instructions 504 are configured to implement a system, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims. As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. A component may reside within a process and/or thread of execution and a component may be localized on one computer and/or distributed between two or more computers. Furthermore, the claimed subject matter may be implemented as a method, apparatus, or article of manufacture using programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Many modifications may be made to this configuration without departing from the scope or spirit of the claimed subject matter.

Figure 6:
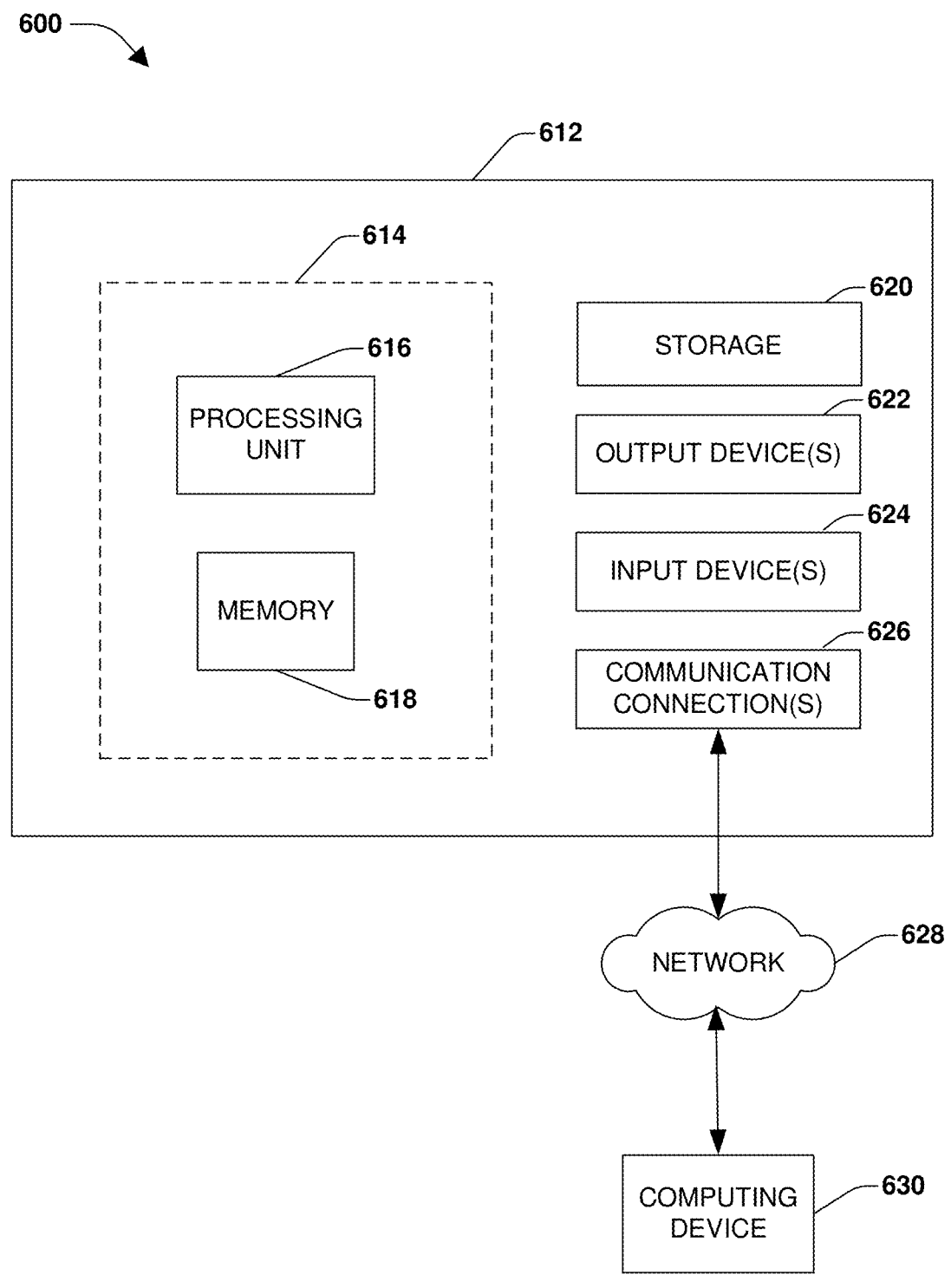
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, etc.), multiprocessor systems, consumer electronics, mini computers, mainframe computers, distributed computing environments that include any of the above systems or devices, etc. Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, etc., that perform particular tasks or implement particular abstract data types. Typically, the functionality of the computer readable instructions may be combined or distributed as desired in various environments.

FIG. 6 illustrates an example of a system 600 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614. In other embodiments, device 612 may include additional features and/or functionality. For example, device 612 may also include additional storage (e.g., removable and/or non-removable) including, but not limited to, magnetic storage, optical storage, etc. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, etc. Computer readable instructions may be loaded in memory 618 for execution by processing unit 616, for example. The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Computer storage media does not, however, include propagated signals. Rather, computer storage media excludes propagated signals. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media. The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal. Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, etc. In one embodiment, an input device or an output device from another computing device may be used as input device(s) 624 or output device(s) 622 for computing device 612. Components of computing device 612 may be connected by various interconnects, such as a bus. Components of computing device 612 may be interconnected by a network. For example, memory 618 may be comprised of multiple physical memory units located in different physical locations interconnected by a network. For example, a computing device 630 accessible via a network 628 may store computer readable instructions to implement one or more embodiments provided herein.

Figure 7:
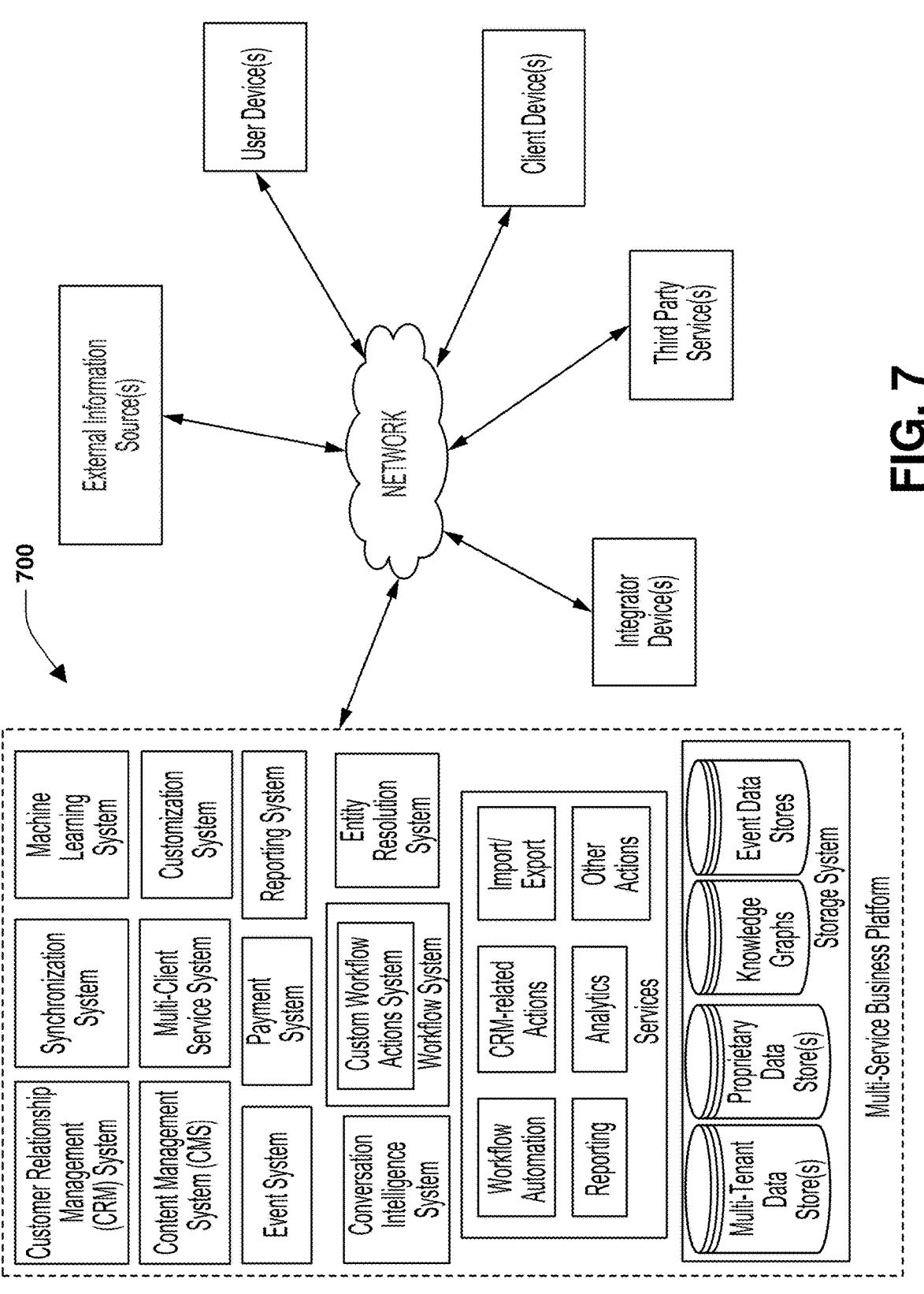
FIG. 7 an exemplary unified platform, in accordance with an embodiment of the present technology.

FIG. 7 is a block diagram illustrating an example of unified platform such as a multi-service business platform 700 the includes a customer relationship management (CRM) system, a synchronization system, a machine learning system, a content management system (CMS), a multi-client service system, a customization system, an event system, a payment system, a reporting system, a conversation intelligence system, a custom workflow actions system, a workflow system, an entity resolution system, services (e.g., workflow automation, reporting, CRM-related actions, analytics, import/export, and other actions), and a multi-service business platform (e.g., multi-tenant data stores, proprietary data stores, knowledge graphs, and event data stores), which are further described in U.S. Provisional Patent Application, titled "SYSTEM AND METHOD OF TRANSLATING A TRACKING MODULE TO A UNIQUE IDENTIFIER", filed on May 13, 2022, which is incorporated herein by reference. The multi-service business platform 700 (the unified platform) may communicate with various devices, services, and information sources over a network.

The platform (the unified platform such as the multi-service business platform 700) may serve the needs of multiple clients who in turn use the system to provide services, support, etc. for their customers or end users. The platform includes a Customer Relationship Management (CRM) System, a synchronization system, an Artificial Intelligence (AI)/Machine Learning (ML) system ("AI/ML system"), a content management system (CMS), a customization system, a multi-client servicing system, an event system, a payment system, a reporting system, a conversational intelligence system, a workflow system having a custom workflow actions system, an entity resolution system, a services module and a storage system.

The services module includes a workflow automation service, a CRM related action service, an import/export service, a reporting service, an analytics service and other services. Other services may include, for example, filtering used to search, filter, and list objects (e.g., contact objects) that may be used with other objects and/or create lists for other types of objects. In some examples, other services may include reporting, permissioning, auditing, user-defined calculations, and aggregations.

The storage system includes one or more multi-tenant data stores, one or more proprietary data stores, one or more knowledge graph data structures and one or more event data stores. Custom objects and/or core objects may include information that may be stored in the multi-tenant data stores of the storage system. The custom objects and/or core objects as well as possible relationships (e.g., associations) between objects may be stored in an ontology of the knowledge data structure.

The platform may communicate with external systems and data sources via a communication network (e.g., Internet, public network, private network, etc.). Specifically, the multi-service business platform may communicate with a user device(s) who is using the one or more systems of the platform (e.g. CRM, customization system) to reach their customers who are accessing the user side of the platform (content, ticketing system, etc.) via one or more user device(s). The platform may allow the client to track various activities of their customers (users) for purposes of sales and marketing (e.g. using custom objects).

The platform may refer to a computing system that provides customer service solutions for any number of different clients. As used herein, a client may refer to an organization (e.g., a business, a government agency, a non-profit, etc.) that engages in some form of commercial or service-related activity, whereby the platform may provide a customized or semi-customized customer service solution to service the customers of the client. In embodiments, the platform is a multi-tenant platform, such that the system serves the needs of multiple clients, who in turn use the system to provide service, support and the like to their own customers. As used herein, the term "service" should be understood to encompass, except where context indicates otherwise, any of a wide range of activities involved in providing services to customers and others, such as via various workflows of a business, including providing services for value, servicing goods, updating software, upgrading software, providing customer support, answering questions, providing instructions of use, issuing refunds or returns, and many others. As used herein, except where context indicates otherwise, a customer may refer to an entity or individual that engages with the client (e.g., a purchaser of a product or service of the client, a user of the client's software platform, etc.), and the term "customer" should be understood to encompass individuals at different stages of a relationship with a client, such as individuals/organizations who are being targeted with marketing and promotional efforts, prospects who are engaged in negotiations with sales people, customers who have purchased a product, and users of the product or service (such as individuals within a customer organization). Furthermore, as will be discussed in further detail, the term "contact" is used to describe organizational entities or individuals that do engage with, may engage with, or previously engaged with the client. For example, a "contact" may refer to a sales lead, a potential customer, a closed customer (e.g., purchaser, licensee, lessee, loan recipient, policy holder, or the like), and/or a previous customer (e.g., a purchaser that needs service or may review the organization). In this way, the platform may help track a contact through an entire contact lifecycle (e.g., from the time the contact first comes to the attention of the client as a lead (such as when the client opens a promotional email or clicks on a promotional offer) until the end of the lifecycle of the client's offering(s)). It should be noted that the term contact may refer to a customer, but also to individuals and organizations that may not qualify as "customers" or users of a client.

The platform may also communicate with one or more external information sources that may include company information or data on customers, products, sales, third party data, resource description framework (RDF) site summary (RSS) feeds or really simple syndication (RSS) feeds, telemetrics (e.g., from email, websites, app usage), etc. with respect to custom objects. The platform may also communicate with third party service(s) (e.g., third party applications, websites, data lakes and warehouses, etc.) via network.

The platform may also communicate with integrator device(s). Integrator devices may refer to user devices used by third-party integrator users that may create and may define a series of custom objects that may be integrated with other objects in the multi-service business platform and may be offered to users of the multi-service business platform. The platform may include APIs (as described in the disclosure) that a user may use to define custom objects and integrate those custom objects into the CRM system and thereby into the platform. These same APIs may be available to integrator users to do the same thing. The integrator users may define a series of custom objects, then the integrator users may define object definitions. When a client installs that integration into their instance of the platform, the client may then start creating instances of custom objects defined by the integrators.

In some embodiments, the CRM maintains records of contacts and interactions associated with a particular customer or potential customer, including relevant corporate information, named individuals in significant roles, purchasing history, etc. In some embodiments, the CRM system supports a consistent set of features and information is structured, so that individuals may be associated with corporate roles, and attributes such as progress status may be associated with objects such as product orders. Controlled change procedures may be provided to, as examples, provide auditable logs of information change activity, or to require particular authority to make such changes.

The CRM is configured to access, associate and manage objects which are associated with potential and existing contacts (or customers) which create value to the client user who is using the platform. Contact objects may be considered as people who may communicate with the client (e.g., anyone who may interact with business) such as customers or prospective customers of the business (e.g., people who may convert on a form, people who contact chat team of business, and/or people who met business team at an event). Each contact object may be defined with properties (e.g., a name of the contact, a phone number of the contact, an email address of the contact, a physical address of the contact, a title of the contact, etc.). Contacts may work at companies such that company objects may also be important to represent in data. Company objects may be defined as organizations or businesses that may communicate with a user's organization. Each company object may include properties such as a company name, an address of the company (e.g., main location, headquarters, or the like), and other suitable properties.

A deal object may be considered opportunities that may be available from interactions with contacts (e.g., contact objects) and/or companies (e.g., company objects). Deal objects may be defined as and represent transactions that may be typically between two businesses. Each deal object may include properties such as a sale made by a customer to a company via a contact. Some examples of deal objects may include the amount of a deal (e.g., deal_amount), an estimated close date for a deal (e.g., estimated_close_date), and a likelihood to close a deal (e.g., likelihood_to_close). Likelihood to close may be determined from machine learning. For example, machine learning may be used to take previously closed deals and may create a model around what types of properties (e.g., attributes) and objects may create a highly likely result to close and then may output values based on this predictive machine learning.

In some embodiments, ticket objects may be considered as customer deals, requests for support or help (e.g., service ticket that may relate to a service request that may be issued by a company to a user via a contact). Some examples of properties for ticket objects may include date ticket was opened (e.g., date_opened), priority of ticket, last date custom replied to ticket (e.g., last_date_customer_replied), last date rep replied to ticket (e.g., last_date_rep_replied), etc.

The CRM of the platform is configured to include associations between core and customized objects. For example, each association may be a directed association, such that a respective association may define a type of relationship from a first object to a second object. For example, an association between a contact object and a company object may be "works for" such that the contact object "works for" (association) the company object. When an instance of the contact object (e.g., the contact object instance identifies Bob as a contact) may be associated with an instance of the company object (e.g., the company object instance may identify "Acme Corp." as a the company) with a "works for" association, then the individual indicated by the company object instance may be defined in the customer databases as working for the company indicated in the company object instance (e.g., Bob works for Acme Corp.).

In example embodiments, two objects may be associated using one or more different types of associations and the associations may be directed in both directions (e.g., association and inverse association). An inverse association of the association may be created automatically for every association. For example, the association in one direction may be "works for" and the inverse association may be "employs" which may be created for the same association automatically. This same association may be viewed from the contact object and viewed from the company object such that the association may be defined as the contact object "works for" (association) the company object or the company object "employs" (inverse association) the contact object. The associations may be between the same types of objects and/or between different types of objects. For example, in continuing the example of the company object and the contact object, a contact object instance may indicate that the company defined by the company object instance may employ the individual defined by the contact object instance vis-à-vis the "employs" association (e.g., Acme Corp employs Bob) and that the individual works for the company vis-à-vis the "works for" association (e.g., Bob works for Acme Corp).

In some example embodiments, two objects may have multiple associations in the same direction. Continuing the example of the contact object and the company object, a contact object may be associated with a company object by a "works for" association, a "previously worked for" association, a "sells to" association, and/or other suitable types of associations. Similarly, the company object may be associated with a contact object with an "employs" association, a "previously employed" association, a "buys from" association, and/or other suitable types of associations. In this way, different types of relationships between instances of objects may be defined within the customer's databases.

In example embodiments, objects may also have the same object type directed associations. For example, a contact object may be associated to itself with one or more directed associations, such as a "is supervised by" association, a "supervises" association, or the like. For example, if Bob and Alice may work for the same company and Alice may supervise Bob, then an instance of a contact object that may define Bob may be associated with a contact object instance that may identify Alice with a "is supervised by" association (e.g., Bob "is supervised by" Alice) and/or Alice's contact object instance may be associated with Bob's contact object instance with a "supervises" association (e.g., Alice "supervises" Bob).

The contact data record may include a contact ID, a client ID, a purchase data, ticket IDs, a contact timeline, and contact data. It is noted that In some embodiments, the contact record may be used across multiple platforms, such that the contact record defines data relevant to the contact through the lifecycle of the contact (e.g., from new lead and/or buyer through customer service). In an example aspect, the client's customer service function may be integrated with the sales arm of the client's business. For example, the contact record corresponds to a warehouse manager (a contact or end user) that purchased an industrial furnace from an HVAC business (a client) may identify or otherwise reference the dates on which the warehouse manager was first contacted, all communications sent between the manager and the HVAC business, a product ID of the furnace, and any tickets that have been initiated by the contact on behalf of the warehouse, etc. Thus, in some embodiments, the integration of the client's sales and marketing data with the client's customer service infrastructure allows a client-specific service system to address issues with a more complete view of the contact's data and reduces the need for APIs to connect typically unconnected systems (e.g., invoicing system, CRM, contact database, etc.). The foregoing database object is provided for example. Not all the data types discussed are required and the object may include additional or alternative data types not herein discussed.

The contact identifier (or "contact ID") may be a unique value (e.g., string or number) that uniquely identifies the contact (user) from other contacts which the client has a probable or existing business relationship with. It is noted that In some embodiments, the client ID is specific to a relationship between a contact and a client, whereby the contact may only relate to a single client, although the contact may related to more than one client.

If a certain individual interacts with multiple clients, then the contact may have multiple contact records associated therewith (i.e., one for each client, where the contact is a customer of different clients (businesses) for the respective products or services of the businesses). The client ID indicates the client to which the contact corresponds. In embodiments, the client ID may be a reference to the client record (e.g., client database record). In this way, the client ID defines the relationship between the contact end user and the client.

In some embodiments, purchase data indicates some or all of the purchases made by the contact end user for a respective client. In some embodiments, the purchase data may represent one or more products and/or services purchased by the contact and the dates on which such products or services were purchased from the client. In some embodiments, the products and services may be presented by product IDs which are unique identifiers for each product/service that is offered by the client.

The ticket IDs indicate any tickets that have been issued with respect to the client. In embodiments, the ticket IDs include any tickets, resolved or unresolved, that have been issued with respect to the contact for a particular client. In an embodiment, the ticket IDs may only include the tickets IDs that are still open. More details about ticket IDs are discussed below with regard to the ticketing system.

In some embodiments, the contact timeline represents data relating to a timeline documenting the contact end user's interaction with the client. The contact timeline may include data from the point in time when the contact was solicited as a lead, when purchases were made by the contact, when tickets were generated on behalf of the contact, when communications were sent to the contact, etc.

In some embodiments, contact data object may include any data that is relevant to the contact end user customer with respect to a particular client of the platform. The contact data may include demographic data (e.g., age and sex), geographic data (e.g., address, city, state, country), conversation data (e.g., references to communications that were engaged in with the client), contact information (e.g., phone number, email address, user name), etc. Contact data may further include information such as a date that the contact was entered into the system, lifecycle state (what is the current relationship with the contact—current customer, lead, or service only), last purchase date, recent purchase dates, on boarding dates, in-person visit dates, last login, last event, last date a feature was used, demos presented to the contact, industry vertical of the contact, a role of the contact, behavioral data, net promoter score of the contact, and/or a contact score (e.g., net value of the contact to the client or a net promoter score).

Accordingly, contact data and the timeline data can be configured to provide a rich history of all interactions of the contact end user and the client over the lifecycle of their relationship. As a result, an individual, such as a salesperson or service professional, of the client using the platform can understand and reference that history for one or more end user to provide relevant communications to them.

In some embodiments, the client record may include the client ID and one or more product IDs. The client ID may be a unique value (e.g., string or number) that uniquely identifies the client from other clients that have accounts in the platform. The product IDs identify/reference products (e.g., goods, services, software) that are offered by the client. The product ID of a product may reference a product record (not shown) that includes data relating to the product, including warranty data, serial numbers, descriptions, product names and the like.

A ticket database record or ticket object is utilized and managed by the CRM system of the platform in accordance with an aspect of the present disclosure. In some embodiments, the ticket database record may include a ticket ID, the client ID, a contact ID, one or more ticket attributes, one or more status attributes, and other additional ticket data. In some embodiments, the ticket object stores data associated with the types of ticket attributes that may be used to identify, track, and/or manage a ticket issued to an end user contact on behalf of the client. The ticket ID is a unique value (e.g., string or number) that uniquely identifies each ticket from other tickets that may be associated with contacts of the client. In a ticket object, the client ID is a value that indicates the client with respect to which the ticket was issued. As can be appreciated, the client ID may point to the client database record and/or the contact record for a particular client. The contact ID uniquely identifies the contact that initiated the ticket for the particular client. As can be appreciated, the contact ID may point to the client database record of the contact that initiated the ticket.

The ticket attributes may include or reference any data tied to the ticket. As discussed, the ticket attributes may include default ticket attributes and/or custom ticket attributes. Examples of default ticket attributes may include a ticket priority attribute (e.g., high, low, or medium), a ticket subject attribute (e.g., what is the ticket concerning), a ticket description attribute, a pipeline ID attribute, a creation date attribute, a last update attribute, etc. The custom ticket attributes may depend on the customizations of the customer contact for a particular client.

In an example, the ticket attributes may be customized to include a ticket type attribute indicating a type of the ticket (e.g., service request, upgrade request, refund request, lost items, etc.), a contact sentiment attribute indicating whether a sentiment score of a contact (e.g., whether the contact is happy, neutral, frustrated, angry, etc.). In some embodiments, the ticket status attribute may include a sentiment or tone of the contact throughout the timeline, feedback from the contact, a contact score of the client, etc. In some embodiments, the product ID attribute indicates a product to which the ticket corresponds, a contact frequency attribute indicating a number of times a contact has been contacted, a media asset attribute indicating media assets (e.g., articles or videos) that have been sent to the contact during the ticket's lifetime, etc.

In some embodiments, the ticket attributes may further include the ticket status attribute. The ticket status attribute can indicate a status of the ticket, whereby the status may be defined with respect to the ticket pipeline for the client. For example, example statuses may include: ticket is opened but not acted upon, waiting for customer response, at a chatbot stage, at service specialist, at visit stage, at refund state, issue resolved, etc.

In some embodiments, the ticket object may include additional ticket data in accordance with the CRM system of the present platform. In embodiments, the additional ticket data may include or reference the specialist or specialists that have helped service the ticket (e.g., employee IDs), any notes entered by specialists, a number of notes entered by the specialists, a list of materials that have been sent to the contact during attempts to resolve the issue, etc. In some embodiments, the additional ticket data may include references to transcripts of conversations with the contact over different mediums or knowledge base articles referred to during the handling of a ticket. For example, the additional ticket data may include or reference conversations had with a chatbot, over email, telephone call, in a WhatsApp message, SMS text message, social media posts, and/or other communications with the client's customer service specialist. The additional ticket data may additionally or alternatively include analytics data.

In some embodiments, the additional ticket data may include or reference a ticket timeline (not shown) in accordance with the CRM system. In some embodiments, a ticket timeline may indicate all actions taken with respect to the ticket and when those actions were taken by the client. In some embodiments, the ticket timeline may be defined with respect to a client's ticket pipeline and/or workflows managed by the client. The ticket timeline may identify when the ticket was initiated, when different actions defined in the workflow occurred (e.g., chatbot conversation, sent link to FAQ, sent knowledge base article, transferred to customer service specialist, made house call, resolved issue, closed ticket, etc.).

The ticket timeline of a ticket record may be updated each time a contact user interacts with the client's platform instance for a particular ticket. In this way, many different types of information can be extracted from the ticket timeline (or the ticket record in general). For example, the following information may be extracted: How long a ticket took to come through the pipeline (e.g., how much time was needed to close the ticket); how many interactions with the system did the contact have; how much time passed until the first response was provided; how long did each stage in the pipeline take; how many responses were sent to the contact; how many communications were received from the contact; how many notes were entered into the record; and/or how many documents were shared with the contact.

The platform may include a customization system which gives client users the ability to create custom objects and have the flexibility of creating any type of custom object relevant to their business without being restricted to the core objects. This allows for clients to customize usage of the framework more closely to their business with regard to marketing, sales, and/or customer service. This also may allow for improved and faster development of new custom object types by clients and/or developers of the framework. The ability to create custom objects within the multi-service business platform may speed up development of new types of custom objects for the platform. In some examples, the customization system may be a separate system from the multi-service business platform and may communicate with the multi-service business platform (e.g., via external application programming interfaces (APIs)).

Various services of the multi-service business platform may be applied and/or used with custom objects. For example, some services that may be applied include workflow automation, wherein an example is automating based on changes to core objects and based on added custom objects or changes to custom objects and/or core objects. For example, the workflow automation may be used to add verbs (automation actions) with respect to nouns (e.g., custom objects). Another service includes a reporting service, such as creating and displaying reports on any custom objects along with core objects), CRM-related actions (e.g. to manage the CRM), analytics (e.g., get analytics for custom objects), import/export from/to third party services and/or databases, and/or other actions or services (e.g. filtering used to search, filter, list contact objects used with custom objects, create lists for custom objects). In example embodiments, other services may include, but are not limited to, reporting, permissioning, auditing, user-defined calculations, and/or aggregations.

Custom objects may be defined as purposely non-prescriptive objects (e.g., flexible/customizable in contrast from fixed core objects). A client may create custom objects relevant to their business and the user's business needs. The custom objects may provide an alternative where objects of interest to businesses may not fit smoothly within core objects (e.g., not necessarily fit as contacts, companies, deals, and/or tickets). The user may create custom objects that may be particularly useful to one or more services (e.g., workflows, reporting) of the multi-service business platform as described in the disclosure.

Each custom object or custom object definition may include an object type, properties (e.g., some properties may be set on an instance), and possible associations. In example embodiments, custom objects and/or types of custom objects may include products, goods such as devices/machines (e.g., cars, drones, boats, mobile phones, etc. such that these devices/machines custom objects may be used to track details about ownership, service, cost of devices/machines), business services, shipments (e.g., may be used to store data about fulfillment of orders that may be intended to be sent out), applications (e.g., may be used to store data that tracks progress of an application), projects (e.g., may be used to store data about work or deliverables), locations/stores (e.g., may be used to store granular data about companies and their many physical locations such as store locations and/or company headquarters location), customer locations (e.g., may be locations of customers that buy products and/or services from user's business), events (e.g., may be used to store and track physical or online events a company holds), listings (e.g., may be used to store data about real estate listings for a real estate company), referrals (e.g., may be used to link two things together to notate a referral or referrer), etc. Some businesses may have unique relationships from operating in an agency type model that the businesses may want to identify, monitor, and/or track using custom objects.

Custom objects may provide users with the ability to model their business. For example, custom objects may allow users to model their own version of contacts, companies, deals, and/or tickets or any other type of object for their businesses that may allow the users to customize what they want for objects and/or object types. The custom objects may be used with the multi-service business platform such that the upstart of the platform may provide various functionality for usage of these custom objects. When a user may build a custom object, the user may utilize all services (e.g., features) of the platform such that the user (e.g., user's business) may use these services throughout the platform towards relevant custom objects that may match user's business needs.

In some examples, users may create custom objects with respect to usefulness with services of the multi-service business platform. For example, an auto manufacturer user may create car or vehicle custom objects that may fit into the auto manufacturer's business workflows (e.g., workflow automation) that may be used on the platform. In another example, a user may choose to add custom objects that may be particularly useful with reporting service for user's business needs.

In general, this ability to create custom objects provides increased and improved customizability across the multi-service business platform. This provides several advantages to the platform as described in the disclosure. For example, some advantages may include customization for users with respect to their business industry or field, specific customization towards each user's business itself such that one user in a business industry (e.g., car industry) may have different custom object needs with respect to another user in the same business industry, increased speed of development of various new types of objects by users and by developers of the multi-service business platform, etc.

Using a yoga business as an example (e.g., where the user may be a yoga business owner), the user may create custom objects towards their yoga business (e.g., where the yoga business may include multiple studios that may be staffed with multiple instructors that may teach different classes that may be taught to students in accordance with the instructors' respective schedules). In this example, a user (e.g., a user affiliated with the yoga studio or a third-party consultant)

may create (e.g., via a GUI) a set of custom objects that relate to the yoga business, including defining the properties of each custom object. For example, the custom objects created may be studio objects, class objects, instructor objects, student objects, and schedule objects. Each studio custom object may include properties such as address of studio, rent of studio, and date when studio opened (e.g., date_opened). Each class custom object may include properties such as name of class, price of class, and schedule of class. Each instructor custom object may include properties such as date when instructor was hired (e.g., date_hired), latest certification date of instructor (e.g., latest_certification_date), certification expiration date of instructor (e.g., certification_expiration_date), and number of classes taught by instructor (e.g., number_of_classes_taught). Each student custom object may include properties such as date joined by student (e.g., date_joined), number of classes attended by student (e.g., number_of_classes_attended), date last attended a class by student (e.g., date_last_attended_a_class), total lifetime value of student (e.g., total_lifetime_value), credit of student, address of student, and phone number of student.

In some embodiments, the client may define a set of associations between objects (e.g., custom objects and/or core objects). This yoga example may include several examples of associations. For example, one association may be "class_taught_by" which may be between the custom object instructor and/or a contact object (e.g., where contact may be instructor) and the class custom objects that the instructor teaches. Another example association may be "taught_at_location" which may be an association between the class custom object and the studio custom objects based on where a particular class may be held (e.g., may be determined from address or location information properties of studio custom objects). In another example, the "taught_at_location" association may be an association between the instructor custom object and the studio custom objects based on at which yoga studios a particular instructor teaches. There may be other associations created between instructor custom objects and core objects (e.g., contact objects) as well as student custom objects and core objects (e.g., contact objects). This may allow for actions to be taken based on these associations such as emails to be sent to instructors and students based on the associations of instructor custom objects and student custom objects with contact objects.

In example embodiments, AI/ML system of the platform may be used with custom objects to determine a likelihood to attend based on custom objects and properties that may be created. For example, the multi-service business platform may provide prompts for a user to define inputs into a machine learning model, e.g., the user may submit via prompts several properties (e.g., how often does student attend, how many classes is student signed up for, subscription plan, etc.) that may impact whether a student may be likely or unlikely to attend a class and the machine learning model may be used to perform calculations based on these inputs. In other example embodiments, the machine learning model may determine insights (e.g., properties relating to attendance may be determined) as data may be received from instances of the occurrence of actions relating to instances of the custom objects. For example, instances of associations between the object instances (e.g., between custom object instances and/or core object instances) may be used to determine these properties (e.g., based on properties of the association instances).

In the yoga example, an integrator may have a company that builds CRM integration for yoga studios. This company may not be a yoga studio itself but may provide the CRM integration. For example, the integrator may define a set of custom objects (including properties) that may be used by yoga studios or other fitness class-based businesses. The custom objects may include a studio custom object, an instructor custom object, a student custom object, a class custom object, and a schedule custom object. In this example, any client of the platform that operates a yoga studio (or other fitness, class-based business) may use the custom objects defined by the integrator (e.g., for a fee to the integrator) when on-boarding their business to the platform. For example, the yoga studio users (e.g., from yoga studio businesses) may install integration (e.g., CRM integration from the integrator user) to be used on the platform. After integration, the yoga studio users may be able to take advantage of the custom objects (e.g., custom definitions of the custom objects) created by the integrator user such as the "yoga class" custom object, the "yoga instructor" custom object, and the "yoga student" custom object. The yoga studio users may also have access to the services of the platform such as reporting (e.g., user reports), workflow automation (e.g., user workflows), etc. that may be used with these custom objects. It may be as if each yoga studio user may rely on the integration from the integrator user such that the integration may be packaged with the custom objects and definitions for users of the platform.

A system of the multi-service business platform may include a registration system (that may include a registration definition service) connected to a storage system and to a customization system (that may include a registration definition service) via a set of APIs. The registration system (and registration definition service in some examples) may be used to create and use registration objects. The customization system may include the registration definition service for creating and/or generating registration objects. Further, similar to the organization of customized objects, an ontology may include registration objects and/or definitions and an instances knowledge graph that may include registration object instances. The storage system of the multi-service business platform may include a knowledge graph that facilitates associating core objects (e.g., campaign core objects) and associations with registration objects and customized objects via the ontology. The knowledge graph may further facilitate associating core object instances with association instances, custom object instances, and registration instances via the instances knowledge graph.

In embodiments, a multi-service business platform may be organized around an object-oriented database, such as a customer relationship management (CRM) database. Such a CRM database may include a range of data objects (e.g., types of objects) that each contain several data fields and corresponding field values that may be configured for a purpose, such as operating an advertising campaign, tracking correspondence, etc. One or more of these data objects may be instantiated as a variety of object instances that effectively replicate a structure of the data object with instance-oriented values. An advertising campaign object type structured with a "campaign_name" field may be instantiated as a first instance of a "campaign" type object with a value of "first" attributed to the "campaign_name" field and a second instance with a value of "second" attributed to the "campaign_name" field.

In embodiments, structures of objects and values assigned to fields of such structure in a CRM may be configured for core functionality of a multi-service business platform.

However, the content of these objects may be utilized in various projects, applications, and contexts, such as a calendar, CRM activity monitoring, CRM performance, export to/from 3rd party platforms, etc. Further, not all such uses, applications, and external systems may be directly compatible with the structures and content of objects in the CRM database. As an example, a campaign type object may include a "campaign start date" field with a mmddyyyy structured content. A calendar application (e.g., using a calendar system service) may require a minimum set of information about a campaign to ensure that it may be displayed properly in a visualization of a calendar that may display campaign activities and other information. Such a calendar application may require a "start date" attribute in the form of "yyyymmdd" to visualize activities. Therefore, it may be beneficial for some type of easily-performed adaptation to occur when a calendar application is requested/instructed/automated to display the campaign type object (and related activities). The registration pattern systems and processes described herein may facilitate this adaptability through new and interesting uses of elements stored in a CRM database. In general, new types of CRM database elements, referred to herein as one or more of a "registration definition element" or a "registration association element", may provide a standardized approach for enabling a range of database content utilization, maintenance, and access capabilities. When these new types of registration data structures (herein registration elements) are stored in a database, such as in a database of a multi-service business platform, such a database may be configured to be self-adapting for new and interesting uses, such as CRM-powered applications, third-party applications, interfacing the CRM with other portals, other systems, CRM object maintenance, etc.

In example embodiments, a registration definition or a registration association may optionally be stored within (or in association with) a customer relationship management (CRM) data set. Stored registration definitions and/or registration associations may be referred to herein as registration elements. While registration elements may be embodied similarly to one or more objects in the CRM data set, use of the term "element" herein when applied to the term "registration" (e.g., a registration element) may connote a data item/structure stored in or in association with a CRM that may embody content, structures, attributes and the like that may not be fully compatible with other objects of the CRM. In example embodiments, registration elements may allow, among other things, other (optionally pre-existing) objects (e.g., customized objects and/or core objects) to be adapted for new uses and processing without forcing use and/or processing constraints that may require altering the pre-existing objects. A benefit of using registration patterns may be that these new and adapted uses may occur without requiring new code to be written (or existing code to be modified) for each such use. Use of registration patterns may also eliminate needing to create use-specific shadow objects in the CRM. For example, allowing a pre-existing CRM object (e.g., webinar object, seminar object, campaign object, etc.) to be processed for display by a calendar application may occur. In example embodiments, as described in the disclosure, core objects (e.g., which may be predefined) may include contact objects, company objects, deals objects, and ticket objects. New objects that may not be predefined objects may be referred to as customized objects. In some examples, the webinar object may be a unique object (e.g., portal specific object) that may be similar to a custom object.

In embodiments, an aspect of registration pattern systems and processes functionality may be using registration elements, optionally stored in the CRM, to configure a CRM powered application. This may enable the CRM to have its own configuration and adjustment mechanism, which may make processes easier for customers who want to closely integrate with the CRM and which may be simple for integrators. In example embodiments, one benefit may be that all access may be made through a single application programming interface (API) or another programmatic interface. In some examples, a second system for managing interactions with the CRM may not be required for various applications, services, and third-parties to interact with the CRM. Providing access to the CRM through a single API or other programmatic interface may eliminate such second systems using a separate database to hold configuration information for these types of CRM interfacing processes.

In an example, an integrator uses a specific data structure for defining an online university course object, and the integrator prefers that these types of courses show up in a calendar application (e.g., rendered on the CRM-powered calendar application such as to announce when the courses were being taught). The integrator may create a registration definition (e.g., registration schema for some examples). The integrator may optionally store this registration definition as a registration element in the CRM. Use of this registration definition, such as by the single API in the disclosure, may enable the calendar application to interpret the integrator's specific data structure to facilitate rendering course information in a calendar. The integrator course object may be rendered as a fully-fledged, fully integrated object in the calendar. Using registration definitions as a form of registration patterning may be used with other types of CRM-powered applications, such as a campaign application. With use of a campaign application compatible registration definition (e.g., a registration definition that facilitates mapping content/fields of the specific course object to campaign object content/fields), a course object of the integrator may appear to a campaign application as if it were integrated.

The registration pattern system and process may avoid the need for a two-system approach. While the examples herein may be based on online types of events (e.g., university courses, blog posts and the like) support for offline events (e.g., events that may not have an online component but may be physical events), for example, may be captured and supported by the registration pattern systems and processes described herein. In example embodiments, a registration definition element instance may be tied to a target consuming application-specific registration pattern that may be applied against several types of CRM objects (e.g., seminars, webinars, blog posts, emails, campaign elements, etc.).

In example embodiments, a registration association may be a registration pattern variant (optionally stored as a registration element within the CRM) that may allow for, among other things, establishing/maintaining continuity of content and structure of related objects in the CRM based on monitored CRM events, such as changes to one or more objects in the CRM (e.g., a change in an email distribution date). Use of registration associations when monitoring CRM events may facilitate factor-based CRM reporting across a CRM-based multi-service business platform and the like, for example. In example embodiments, being able to tie a registration association across the platform framework may facilitate reporting on various factors that may impact more than one CRM object. In example embodiments, data and information in a CRM data structure (e.g., a distributed database and the like) may be associated with one or more objects. In example embodiments, given a list of customers, each individual customer may be represented by their own CRM object. Similarly for a list of blog posts, each blog post may be represented by its own CRM object. From this perspective of managing elements in a CRM data set, registration patterns (e.g., definitions, associations, etc.) may be similarly configured or structured. For example, a calendar registration definition (e.g., referred to herein as a calendar registration definition element instance) may be stored in the CRM; however, this calendar registration definition may be a different type of object compared to an object type for use by a campaign application.

In example embodiments, registration patterns may allow for providing support for new types of data to a calendar, such as webinar data. When a CRM object for a webinar is ready, an administrator may create a calendar registration definition for the webinar object that may, for example, facilitate use of information in the webinar object by a CRM-powered calendar application. In example embodiments, this webinar object-to-calendar application registration definition may contain a field that identifies that it is for the webinar object type. In example embodiments, a start date may be a field on the webinar object (e.g., color coded start date such as yellow by default when rendered in a calendar application). Another webinar object field may capture the title. A webinar may be a recurring item such that there may be another field regarding how often the webinar occurs. In example embodiments, a webinar object (or other CRM object) may have up to ten (10) or twenty (20) or more different data fields to which a corresponding registration definition (e.g., a webinar-to-calendar registration definition) may be applied for integrating the webinar object with a CRM-powered application, such as the exemplary calendar application. In example embodiments, for each distinct type of object to be rendered on a calendar, there may be a separate registration definition. For example, there may be one registration definition for blog posts, one registration definition for website pages, one registration definition for tasks, one registration definition for campaigns, etc. In example embodiments, this may be accomplished in a database table. In example embodiments, there may be separate registration definitions for each type of data (e.g., CRM object, such as a webinar object) to be rendered in a calendar. A database table may include a calendar application row that identifies what types of data may be provided to the calendar. It may also identify minimum required information to be provided to a calendar application so that an object may be displayed on the calendar. This information may be used to query the CRM data set for webinar objects to be rendered in the calendar.

One advantage to having all of this data and information in a single CRM and using a CRM object-like element to store a registration pattern data structure may be that there is no need to give outside vendors, integrators, or customers access to two different systems (e.g., the CRM and the separate database noted in the disclosure). Further, this may all be performed through a common set of APIs (and in some example embodiments a single API) used to access the CRM. In an example, rather than having to access the CRM to populate a bunch of data into a data set, and then logging into a web page (e.g., that includes a control panel) to arrange the data in the data set for configuring a calendar application, or rather than requiring access to two different APIs (e.g., one API for the CRM and one API for the calendar), use of registration patterns may facilitate accessing the CRM and configuring the accessed CRM data for use by a calendar without needing resources external to the CRM. Once granted access to the CRM through, for example, a customer portal, an integrator may create new CRM objects and corresponding registration definitions to keep processes running smoothly.

A registration system (that may include a registration definition service) connected to a storage system and to a customization system (that may include a registration definition service) via a set of APIs. The registration system (and registration definition service in some examples) may be used to create and use registration patterns. The customization system may include the registration definition service for creating and/or generating registration elements. Further, similar to the organization of customized objects, an ontology may include registration associations and/or registration definitions and an instances knowledge graph that may include registration definition and/or association element instances. The storage system of the multi-service business platform may include a knowledge graph that facilitates associating core objects (e.g., campaign core objects) and associations with registration definitions and customized objects via the ontology. The knowledge graph may further facilitate associating core object instances with registration association element instances, custom object instances, and registration element instances via the instances knowledge graph.

In example embodiments, the systems and processes of registration definitions described herein may include features that relate generally to a registration pattern with respect to a customer relationship management (CRM) system (also referred to as CRM). In example embodiments, the CRM may include customer objects, content objects (e.g., blog post CRM objects), registration definitions (e.g., calendar registration definitions), etc. When a "new" (e.g., new to a calendar application) type of object in the CRM (or new to the CRM) may be added to an application (e.g., calendar application), registration definition information may be updated or created for this "new" type of object (e.g., based on registration definition types such as a webinar definition type). When data of a CRM object that has not previously been used by a CRM-powered application (e.g., calendar application) is used, corresponding registration data may be updated. In this example, a registration definition element instance (e.g., within a calendar application registration definition element) that may be linked to the CRM object (e.g., based on the CRM object type) may be updated to reflect how this previously not relied upon data is to be handled by the calendar application.

In embodiments, registration definitions may map attributes of a source object (e.g., Email sent date) to generic fields required by an application (e.g., start date for an event in the calendar application). Further, registration definitions may include a set of definitions on how to process items. Yet further, in addition to mapping data, registration definitions may also contain configuration information for instructing applications about use of these registration definitions, such as one or more conditions that may need to be present in a corresponding definition and/or object (e.g., a master registration definition activate/deactivate parameter value) for the registration definition to be applied. Further, use of specific features of a registration definition may be conditionally applied based on similar feature-specific context. In this way, an entire registration definition may be disabled or only portions of it may be disabled while others may be enabled. In embodiments, registration mappings and definitions may be utilized for different types of registration patterns. For example, a marketing calendar may support a campaign object type as depicted in a user interface (UI) filter that may allow a customer to display the campaign object or not by adjusting a field in the UI. The UI may display a code that the campaign object may be currently enabled for the calendar application use. Adjusting the field in the UI may send a request to the platform for disabling it from being rendered in the marketing calendar so that the campaign object may not appear anymore. Such a UI may be useful because this process of enabling/disabling does not apply only for enabling or disabling an object type but may also be used for changing a property in order to show the proper name or the like. In some examples, to bring campaigns back on the marketing calendar, the system may be used to do the inverse and change the UI field to set it to "enabled". In embodiments, relying on the UI for registration patterns, which are described in the systems and processes herein, may allow for configuring a CRM object type for a given example in a relatively dynamic way. In embodiments, the UI and the like may rely upon APIs to effectively make the changes described in the registration definitions (e.g., enable/disable rendering of a campaign object in a marketing calendar).

In embodiments, this dynamic configuration mechanism may be used for dynamic association of assets with campaigns through use of a campaign registration association. In embodiments, different registration patterns may be used for the campaign association at least because a campaign may not require all the fields that a calendar requires. In embodiments, similar processes may be applied here to disable use of an asset in campaigns so that the asset may not get associated with campaigns. In examples, a user may merely use the UI to disable this registration. In embodiments, some other information from an asset may be needed for fulfilling the campaign association.

In embodiments, use of a registration definition and/or association may be activated or deactivated through use of one or more properties of an object, such as a scope property. In example embodiments, when visualizing a marketing calendar, for example that may not have a "MARKETING EMAILS" scope property defined, all the marketing emails may not be accessible to the calendar (e.g., not returned by use of a registration pattern). In example embodiments, use of some features for activating and deactivating use of registration patterns may depend on the user or the portal, which may be using/looking at the current calendar. In example embodiments, another approach for enabling and disabling use of registration patterns may include a gating strategy. In example embodiments, a concept of gating, for example, for release of a new feature, may allow for controlled release of the feature across one or more of the portals. Gating may enable gradually releasing of the feature for different portals, such as in order to have control over bugs or some problems that the new feature may introduce. In embodiments, gating may be enabled by a registration being configured with a gate name property. If a registration pattern includes a gate name property (e.g., "BETA"), and a portal (e.g., consuming application and the like) may not be enabled (gated) for using this BETA feature, it may not access portion(s) of objects defined in this "gated" registration. If the application/portal is enabled for, "BETA" features, the corresponding registration pattern may be used to facilitate access to object content gated by this feature.

Another mechanism by which registration aspects may be activated/deactivated and/or enabled/disabled may include use of optional properties in a registration data structure. In example embodiments, a consuming application, such as a calendar application may identify object properties as being optional. A property that is optional may be processed by the registration pattern, but if it is not available in the source object being processed, the property may be ignored when rendering the object in a calendar, for example. Although optional properties are not mandatory per the target consuming application, when they are present and when there is a value for them in the source object, the optional properties may enable specific features for an application (e.g., for a marketing calendar application and the like).

Records may be created in the customer relationship management (CRM) database to register other records (e.g., email, contact, company) with CRM powered applications. This may be compared to other approaches including, without limitation, an external set of mappings or target consumer-specific CRM-processing code. The techniques described herein for registration patterns may power the CRM by using its storage and access capabilities and functions as a plug-in mechanism. This may further benefit the CRM because the registration elements may be created substantially similar to the way that a custom object may be created, which in turn may be slightly different from a non-custom object (e.g., core object). In example embodiments, differences between creating a custom object and a non-custom object may include who may be allowed to do it (e.g., user-based determination), and for example, what set of permissions a user may have, otherwise it may be substantively a similar technical process. In substantially the same way that a customer or an integrator or a vendor may create a custom object, the systems and processes of registration patterns described herein may facilitate in creating a registration element which in turn may enable at least one of a custom object or even a standard object to interact with an application. A characteristic of the registration pattern may be that it may be used for a range of CRM objects, standard objects, and/or customized objects to provide CRM object content to a specific application feature. In example embodiments, a registration structure itself may not be a CRM object such that the registration structure may be stored in a home database. However, in example embodiments, the registration structure may be a CRM object itself. In example embodiments, there may be distinct registration elements for the standard objects and registration elements for the customized objects. In example embodiments, these objects may be stored in the CRM. In example embodiments, these objects may be portal specific and may be replicated across one or more of the portals.

In embodiments, a registration pattern may include a registration definition element that may be stored in a database, such as a CRM database. A registration definition element (also referred to herein as a registration definition) may allow pre-existing objects of the CRM (e.g., customized objects, core objects, object types, etc.) to be adapted for new uses and consumed by processes (e.g., onboarding a CRM asset to a project/application) without any of the following: (i) forcing use and/or processing constraints to require altering the pre-existing objects; (ii) requiring new code to be written and/or existing code to be modified for such use; and (iii) needing to maintain use-specific shadow objects in the CRM (e.g., that may contain at least a portion of the object being shadowed in a use-specific format). A registration definition may be configured to ensure that content from a CRM asset may meet consumer application-specific (e.g., a CRM-powered application, such as a calendar) requirements for content, format. Registration patterns may facilitate reduced computational resources, reduced data storage resources, and reduced network activity when onboarding new assets or when changing behaviors of assets already onboarded to (e.g., used by) a project/application. In an example, registration definitions as described and depicted in the disclosure may allow a pre-existing CRM object (e.g., webinar object, seminar object, etc.) to be processed for display by a calendar application, even when the pre-existing CRM object may include structures, formats, content, or the like that may not be fully compliant with calendar application input or use data requirements. Each type of project/application that consumes CRM data may be associated with a registration definition that may be specific to the project/application. This association may be one-to-one, with each project having a one-to-one association to a specific registration definition element in the CRM. This association may be one-to-many, optionally based on, for example, a type of project. With a one-to-many relationship, several instances of a project type "calendar" all share a single registration definition element.

In embodiments, a registration definition element that may be associated with a target project/application may include registration definition element instances (e.g., discrete portions of the registration definition element) for several types of CRM objects (e.g., seminar objects, webinar objects, blog posts, emails, campaign elements, etc.). A registration definition element instance may be seen as a configuration read by a project when handling a specific object type. In embodiments, a registration element instance may identify a set of criteria for CRM-sourced content to be consumed by, for example, a CRM-powered application. While this set of criteria may be consistent within the consuming application for at least a subset of all object types in the CRM, different object types in the CRM may store the consuming application's required information differently (e.g., may use different field names, may store the content in different formats, etc.). Therefore, while the required content may be consistent, a pattern by which information from the different types of objects may be registered may be different, resulting in, for example, source object dependent registration patterns.

In embodiments, a registration pattern may include a registration association element that may be stored in the database. A registration association element (may also be referred to herein as a registration association or in certain contexts an association) may be a variant of a registration pattern that allows establishing and/or maintaining continuity of content and/or structure of related pre-existing objects. This registration pattern variant may facilitate CRM database continuity through identifying objects and one or more fields therein to be monitored for change. In embodiments, a registration association element may be employed with a process for monitoring a CRM event stream (e.g., a log of events and/or active event stream) to facilitate detecting changes to objects in the CRM. A CRM event stream may include a CRM event (e.g., a change to a value in an object in the CRM) that matches at least a portion of content of a registration association may signify a change in the CRM that triggers a monitoring application to cause further CRM events to occur to ensure continuity in the CRM. An object type of "blog" may include a "source" field label that may be used by CRM-powered applications (e.g., ad campaign administration). A registration association element may be configured with this object type and this field label. Responsive to a CRM event monitoring application detecting a CRM event (e.g., in an event stream) that matches this registration association element, the monitoring application cause instances of the "blog" type object to be updated based on a change in the monitored field "source". Use of registration associations when monitoring CRM events may facilitate factor-based CRM reporting (e.g., CRM analytics) across a CRM based multi-service business platform.

In embodiments, the methods and systems of registration pattern creation, configuration, use, and adaptation described herein may be further enabled through features of a host CRM, such as CRM-specific application programming interfaces (APIs) and the like. One or more CRM-specific APIs may facilitate uniform execution of read and/or write operations on objects in the CRM independently of a type of the objects. In example embodiments, use of such APIs with the methods and systems of registration patterns described herein may facilitate dynamically enabling use of several CRM object types for a specific use case (e.g., a CRM project, CRM-powered application, etc., some of which are described herein) using unmodified use case software/code. Further such us of the APIs may avoid redeployment and/or modification of software/code, CRM-specific data structures, etc. Benefits of such CRM-specific API functionality may include, among other things: (i) improved performance when using the CRM as compared to services that require such modification/adaptation; (ii) efficient CRM-independence of use case/user/service; (iii) efficient reuse of existing code thereby reducing the amount of use case-specific code to be maintained; and (iv) uniformity and consistency of CRM object structures, interface methods, and codebase that results in easier platform maintenance, debugging, etc.

Registration patterns (definitions and/or associations) may be established based on a range of factors and aspects of the CRM as well as consuming applications/processes. In example embodiments, when a new object type is defined in the CRM, such as a transaction-type object, one or more transaction type object registration definitions may be configured in the CRM. In example embodiments, a transaction type object registration definition may be created in the CRM for each consuming application so that each consuming application may seamlessly use/process the new object type by referring to its transaction type object registration definition. Further in this example, one or more registration associations may be defined and stored in the CRM to facilitate monitoring CRM event activity and maintaining continuity within the CRM for events that may impact the transaction-type object. In another example, when a new consuming application (e.g., a compliance application) is to initiate access to the CRM, one or more compliance application-specific registration definitions (e.g., one for each type of object present in the CRM contemporaneous with the compliance application initiating access) may be created and stored in the CRM.

In example embodiments, registration patterns may adhere at least in part to requirements of other objects in the CRM, such as use of syntax, taxonomy, structural elements like field definitions, etc. In this regard, registration patterns may be defined, instantiated, and maintained in the CRM through one or more pre-existing interfaces, portals, applications, wizards, etc. through which objects, object types and the like may be defined, instantiated, and maintained in the CRM. Use of preexisting interfaces, tools, etc. may reduce complexity of a multi-service business platform, may reduce training time, may increase the likelihood that registration patterns may be adopted by users of the multi-service business platform, etc.

Registration patterns may be configured with a range of functionality, including without limitation, mapping source object field values to consuming application fields, reformatting source object field values to conform with consuming application formatting needs, establishing and/or signaling use of default values for consuming application data that may not be provided by a source object, indicating whether an object type may be used (activated) or may not be used (deactivated) by the consuming application, etc. Further, records (e.g., registration definition elements) may be created in the CRM to register other records (e.g., email objects, contact objects, etc.) with, for example CRM-powered applications. In this way, and optionally when combined with CRM-specific APIs, a registration pattern-enabled CRM may self-adapt for a wide variety of uses without, among other things, external sets of mappings of source object content to consumer (e.g., application) content or CRM-specific access code created content for and/or associated with each individual use case/application. In example embodiments, a registration pattern-enabled CRM may facilitate mapping attributes of source objects to specific fields required by any application that accesses (e.g., reads or writes) the CRM. Therefore, not only may the CRM be constructed and operated optimally for meeting requirements of a hosting multi-service business platform, but the CRM may be made accessible to external services by merely creating registration patterns for the external service.

By storing the registration patterns as object/elements in the CRM, the CRM may become its own configuration and adjustment mechanism. This enables independence of the CRM so that there may be no other system, no other interfaces, and no need for any system, application, third-party, or the like knowing about the details of objects in the CRM. Each registration pattern that is created for each object (e.g., object type) may hold the details about how to use the information in the object in the CRM to satisfy the system/application/third-party information requirements.

In example embodiments, a registration pattern map may attribute properties of the source object (e.g., Email Sent Date) to generic fields required by the application to which the source object data may be applied/used (e.g., start date for an event in the calendar). This pattern may be used with different applications/systems (e.g., calendar system and/or campaign system). In example embodiments, creating registration patterns and some customized objects may be accomplished through the same process and the same portal, such as the same form filling API used for customized objects. In example embodiments, it may be the same API, even though the logic performed by the API (e.g., in the background) may change. However, a standard object may be stored with a different data server than a custom object or registration pattern, due at least in part different freight limiting and other aspects that may not be needed for customized objects. In example embodiments, when trying to register a custom object, the system may execute logic for customized objects. When trying to create standard objects, the system may execute logic required for the standard objects. However, the interface (e.g., representation of the registration element to the user) may be the same. In example embodiments, the system may store the same kind of information for both of these (e.g., registration elements and customized objects).

In embodiments, a registration pattern (e.g., registration definition element, registration association element, etc.) may be configured through a process that may include several actions. One such action may include identifying a target consumer application/user/project of information stored in objects in the CRM. Another such action may include identifying content types that may be required for use by the target consumer application/user, such as dates, links, etc. An example target consumer of CRM object information may include CRM-powered applications, such as a calendar application/service, a performance monitoring (e.g., analytics) application/service, an ingestion application/service, a CRM access application/service (e.g., CRM-access API and the like), a data conversion service, a third-party application, etc. When one or more content types may be identified for the target consumer application/service, corresponding source fields for one or more (optionally all) types of CRM objects may be determined. As an example, a start_date field of a calendar application may require a particular source date content to ensure that the calendar application may populate aspects of the source objects from the CRM in the proper date. Information in a campaign-type object in the CRM may include several date fields (e.g., a date field that defines a trial period, a date field that defines when the campaign object was created, another date field for when a targeted advertising action of the campaign is to start, etc.). In example embodiments, a date field of the campaign-type object may be determined to correspond to the start_date field of the calendar application through use of automated and/or at least partially with manual activity. Date fields of other object types in the CRM may be determined to correspond to a start_date field of a calendar application. This process may be repeated for each target consumer application/user in combination with each object type defined in the CRM.

In embodiments, a process to create a registration pattern, such as a registration definition may include identifying content types (e.g., dates, links, etc.) that may be required for a target consumer application/portal/user, such as a marketing calendar application, etc. The process may include, for each CRM object type, determining which source field may correspond to each of the identified content types. From this information, a CRM compatible object/element, such as a target consumer-specific registration definition that facilitates the correspondence may be arranged in a form that makes plain which source object and field corresponds to which target consumer content field. In embodiments, a process by which the registration definition created as described above, or otherwise created, copied, accessed, provided, or the like may be used and may include accessing the target consumer-specific registration definition. Based on object type properties of the retrieved registration definition, the system may receive/retrieve object(s) of the identified type from the CRM to be processed. In example embodiments, a record, optionally stored in or in association with the CRM (e.g., in an object processing tracking history), may identify object(s) of the CRM that may have already been processed. For each object of the identified object type accessed, the registration definition content (e.g., the map of object properties to target-user properties) may be used to map source object field values into target consumer-required fields. The resulting data may be used by the target consumer/application to perform its function, such as populate a calendar for rendering in a user interface.

For a given target-consumer/source CRM object-type combination, a CRM compatible element (optionally an object of the CRM) (herein referred to as a registration definition element) may be created to facilitate use of the corresponding date information in the source CRM object-type. Information structured into a registration definition element may include source object type and corresponding field and target consumer application fields for several source object types. A registration definition element may be created in a CRM database using tools, interfaces, and other existing object creation and maintenance functions that may be used to create CRM objects for the CRM database. A registration definition element may be created for each target-consumer application/user. Each such registration definition element may include field correspondence statements for several different types of CRM objects. These field correspondence statements may be grouped within the registration definition element as a source-object type-specific registration element instance. As an example, a target-consumer application-specific registration definition element may include correspondences for date fields for an EMAIL object, a RECURRING EMAIL object, a CAMPAIGN object, etc. In this example, other field correspondences for an EMAIL object (for example) may be grouped in an EMAIL registration element instance within the target-consumer registration definition element.

In embodiments, a target-consumer application/user may be configured to access and apply a registration definition element when attempting to access content of a source object in the CRM. The object type of the source object in the CRM being accessed by the target-consumer application may be used to identify a portion in the registration definition element that may facilitate mapping the relevant fields of the source object. The field mappings in the registration definition element may be used to map field values from source fields of the source object to corresponding fields of the target-consumer application/user. The mapped source field content may be used by the target-consumer application/user to perform a function, such as populate a calendar, transmit object data to a third party, perform analytics on the CRM, etc. In example embodiments, field mapping may be performed in batch mode with results of field mapping being stored in an intermediate CRM element that may be directly accessed by the target-consumer application. In other example embodiments, field mapping may be performed contemporaneously with execution of the target-consumer application. An API may be configured as a registration definition element handling service, such as to retrieve data from the CRM, process the data per the registration definition element, and deliver the processed data to the target-consumer application.

In embodiments, a calendar application, such as a marketing calendar for use in managing a multi-service business platform may be CRM powered in that it may include a set of tasks for updating the calendar based on content of the CRM. An example calendar application may integrate different types of assets to be added to the calendar application. Examples include email campaigns that may be going out, sharing social media posts, entire campaigns, collections of assets, blog posts, etc. The methods and systems of registration patterns and the like may facilitate bringing content in the CRM (e.g., in and associated with objects) to the calendar easily and quickly. Such a process may be referred to as a registration-activated calendar update that may be an extremely powerful CRM-application integration tool. Initially, a calendar application may request available object-specific registration definitions (e.g., distinct registration definitions for blog posts, landing pages, social media posts, etc.). In example embodiments, use of registration definitions (e.g., CRM registration definition) with the calendar application allows for the calendar application to integrate content of objects in the CRM associated with each of these registration definitions into the calendar (e.g., a blog post registration definition may enable integration of the properties of the blog post with the calendar.)

In this example of a calendar service, the calendar looks up its registration elements (e.g., looking for data such as name and/or what is being shown in the calendar). A registration definition may be useful when any application accesses a CRM database at least as a filtering mechanism that may be structured to facilitate restricting access to the CRM so that the requesting application is not shown (e.g., provided access to) content that may not be in the calendar. Further, a registration pattern definition may be useful for ensuring that content of properties of a source object may be determined for a minimum set of content required by the calendar application, such as the start date, which may be critical for rendering content on calendars. In example embodiments, these are the kinds of definitions may be part of a calendar registration definition.

As the calendar application loads, it may request from the CRM the registration elements identified as calendar registration definitions. For example, there may be a registration definition for blog posts, a registration definition for a landing page, a registration definition for social media posts, and so on. A start date of the blog post on the calendar may be a corresponding date field of the blog post objects. In addition to facilitating mapping object properties to calendar content fields, calendar rendering aspects, such as a preferred background color to be used when highlighting the blog post in the calendar may be a default highlight color field on the CRM object. As described herein in a range of example embodiments, a registration pattern may essentially be a set or collection of configurations and mappings from a pre-existing CRM object to what the calendar expects. A CRM access capability of the system may then know how to query for the CRM objects, and how to transform properties into a standard (e.g., compatible) representation for the calendar.

In example embodiments, a CRM access capability may be configured as an API end point that may, for example, fetch a list of blog posts CRM objects, and convert/deliver content of certain properties to the calendar based on the applicable registration definition. In example embodiments, CRM content fetched may include several JSON data structures representing blog posts objects in the CRM. Further the system may include an API to feed data from the registration-based CRM access API to the calendar. In summary, a process for creating a calendar event with the registration methods and systems described herein may include taking the list of objects from the CRM, and applying the configuration and rules in the registration definition to produce a standard calendar event. In example embodiments, applying a registration definition for populating a calendar may cause an impact on data structures of or associated with a calendar application that may populate the calendar. In example embodiments, a CRM object may include identified fields and/or field values that may be processed with a corresponding registration definition to generate and/or impact data structures, such as fields and/or values of a target CRM object (e.g., a calendar instance object), or configure and/or generate a CRM object that may be used by (e.g., accessed within the CRM) a calendar application for performing calendar functions, such as populating a calendar and the like. In example embodiments, identified fields and/or field values of a target CRM object may be processed by a registration definition(s). A result of the processing may be provided to a calendar application, such as in a stream of calendar population values from which a calendar may be populated.

Further, in this calendar example, the list of registration patterns for the calendar may include a landing page. This registration element may be created in order to make sure that the landing page objects are properly rendered in the calendar. In this example, there are many fields that embody the kind of information that a registration definition possesses for the calendar use, such as: the object ID, the name of the object, etc. The registration definition may answer questions for the calendar, such as what is the property that is keeping an ID for landing pages?; what is the property keeping track of the published date for the landing page objects?; and what is the property keeping track of the name of those objects? In example embodiments, this registration may facilitate fetching, from the CRM, the properties that may be needed in order to properly render landing page objects in the calendar.

In embodiments, the methods and systems of registration patterns may provide flexibility for CRM operation because if key properties required by the calendar change, it may be possible that all the landing pages may not be rendered by the calendar anymore. The CRM may be updated to cause a change in how to store the start date in landing page objects. To accommodate such changes for all objects, only the registrations may need to change. In example embodiments, a seed registration may have a dynamic configuration that may be updated (e.g., by developers and the like) in order to ensure that some changes in the CRM may be reflected in the calendar or in general, in the example use case that uses the registration pattern. In embodiments, registration definitions may be standardized across portals so that no matter what portal is accessing the CRM, the view may be consistent for the corresponding object types. However, custom registration definitions (e.g., created for customer objects) may provide customers with registration definition-level control over use of customer objects. In example embodiments, a customer may define and configure a home webinar object in the CRM. These custom webinar objects may be shown in the calendar by use of a custom webinar object-specific registration element instance being configured, optionally by the customer, using the methods and systems of registration definition creation herein. In example embodiments, the methods and systems of registration patterns may be adapted to allow specific portals (e.g., customers and the like) to create registrations for their home customized objects. In example embodiments, integration of object content into a calendar and/or into a structure to be reported, may be controlled on a user-specific basis through use of customized objects and custom registration definitions for those objects.

Fields within the registration definition may provide various configurations and mappings that may be executed by the calendar system (e.g., start date field, preferred background color field, etc. in the blog post registration element). In the calendar use case, a minimal set of corresponding fields in the CRM object may be required, which in this case may include the start date, property, and the title property, and optionally the object ID property. If a CRM object type has at least these properties, the CRM object type may be registered for (integrated into/with) the calendar. As an example, if a first object type does not have a title property, then it may not be possible to show the first object type in the calendar. As noted herein, not all target consuming applications/portals/users may require the same source object properties. For example, campaign applications may not require all of the property fields that a calendar application may require. In an example of integrating a marketing email object with a calendar, different properties may be required for the marketing email to be properly shown in calendar. In example embodiments, other properties may not be mandatory. However, some non-mandatory properties may enable some calendar features, such as object preview. Therefore, if a preview property is configured in a marketing email object, the calendar UI may provide user access to the preview key as well.

In example embodiments, comparable properties on different object types may be given the same identifier (e.g., object ID), although that may not be required. A first object may define the ID property with one name, but another object may define the ID property with a different name. The methods and systems of registration patterns may allow two different properties in two different objects to have the same name, while ensuring that each is mapped properly when each object is processed by its corresponding registration definition (e.g., for use by an application such as the calendar application).

In embodiments, query registration definitions may be transformed into standard representations for a calendar application. Example embodiments may include using a calendar system to look up registration definitions (e.g., look for data properties such as name and/or what is shown in the calendar including start date). In example embodiments, registration definition required fields may include primary ID, definition name, definition type, properties such as start date, etc. for use with the calendar system. In embodiments, an API may be configured for use as an interface between an application (e.g., calendar) and the CRM. An example may include an API used to fetch registration definitions (e.g., blog posts CRM objects which may be JSON representing blog posts objects in the CRM). This example may include an API that may feed data from the CRM to be transformed and formatted for an application (e.g., calendar application). This example may include a list of registration definitions from a CRM that may include configurations and rules that may be applied as part of obtaining a standard calendar event (e.g., feed of data pre-transformation and post-transformation for each registration definition). In embodiments, there may be a level of common functionality to registration patterns that may be applied across objects, applications, and CRM elements in general. In example embodiments, an application may feed off data from the CRM. A registration pattern may be keyed to one of several types of objects. In embodiments, a registration pattern may have a set of data that may apply to any use of the registration pattern. Also, a registration pattern for a calendar application may define a set of "must have" fields such as start date as described herein. This example of a data item in the set of data that, while it may apply to any use of the registration pattern, may be accompanied by application-specific transformation and configuration data.

In embodiments, a calendar application use of registration patterns is described in the disclosure. Prior to use of a registration pattern by a marketing calendar application to render events on the calendar of different object/asset types, the application may fetch the relevant data from several objects in the CRM. In this example, the CRM may be a multi-service business platform CRM database that may include different types of CRM objects for several platform users. The calendar application may seek to render select assets for the users in one calendar view. Therefore, the calendar application may retrieve CRM object content from a range of asset types and user-specific objects and render the respective calendar events accordingly. For some examples, in addition to needing to discern specific portions of different types of assets for a single user, having to deal with several users may require a substantive amount of code development and maintenance that may cause a negative impact on the platform codebase, on the platform metrics, and on the overall platform performance. Further, in some examples, a lack of homogeneity may make onboarding new assets to the calendar tedious and error prone as more and more complexity may be added to the calendar application codebase. This greater complexity may contribute to overall platform performance degradation.

Use of the methods and systems of registration patterns may resolve and/or eliminate these complications, performance cost, and complexity. The example calendar application (and generally most such applications that access a CRM) may use fetching logic of the CRM. That fetching logic complexity may be reduced so that a single fetching logic (e.g., program code) may be used to fetch content from all different types of CRM objects or assets for all different user objects stored in the CRM. Typical operational activity of the platform, such as onboarding a new asset to the calendar (e.g., rendering a newly created campaign in the calendar and the like) has been turned from a tedious error-prone process that may result in impacting rendering of other assets into a simple registration definition creation process using CRM-object creation tools. This improvement may be exemplified by each registration element instance in a registration definition element being responsible for onboarding of a specific asset type. The registration element instance may contain at least a mapping of properties on the CRM object to fields on a common calendar event object. Prior to use of registration patterns, the mappings between specific assets and calendar events (e.g., between CRM object fields and calendar object fields) were statically coded for each asset. This required having several entities responsible for onboarding each individual asset type to be rendered in the calendar. With registration patterns, a single entity may be configured to receive a registration element instance with a corresponding CRM object and deliver a conforming calendar event data set that may be rendered by the calendar application.

Further, in this registration pattern example for use by a calendar application, a calendar application may request registration definition element(s) configured to facilitate onboarding of calendar events based on select object (types/assets) in the CRM, such as blog posts, landing pages, social media posts, etc. A CRM-interface portion of the calendar application, or optionally a CRM-interface service of the CRM such as a CRM-specific API and the like, may use the information that identifies each registration element instance in each registration definition element to identify assets in the CRM to be accessed. In example embodiments, a calendar application may target a specific CRM asset when requesting the registration definition element(s), such as when a user may adjust a view of the calendar to include an asset not currently rendered in the calendar. Content of the targeted assets may be retrieved and values from fields identified in a corresponding registration element instance may be selected and configured for delivery to the calendar application. Configuring these selected values may include generating a data set that attributes each selected value to a specific field/attribute of the calendar application. A value of the CAMPAIGN asset field "hs_campaign_start_date" for a selected CRM asset may be attributed to the calendar required field "startDateProperty". The calendar then may use this value to render the CAMPAIGN asset on the proper date in the calendar.

Further, in the example, the MARKETING_EMAIL registration definition element instance may be enabled for use by the calendar or disabled for use. The value in the registration definition element instance entry labeled "isEnabled" may be used for such a purpose. When the entry labelled "isEnabled" given a value of "true" as depicted in FIG. REG02, then the calendar application may render CRM objects of the type "MARKETING_EMAIL". If the same entry value was not "true" (e.g., "false"), then the calendar application may not render CRM objects of the type "MAR-KETING_EMAIL". In embodiments, registration defini-tions may facilitate distinguishing between two different variants of an object type. The specific variant of object type "MARKETING_EMAIL" to which this registration defini-tion applies may be an "email" variant as determined by the "crmObjectDisplayName" field. Rendering of other variants of "MARKETING_EMAIL" by the calendar application may be separately controlled.

Further, the calendar field "gateName" may be configured for each registration definition element instance. Use of this field may further determine conditions under which the registration definition element instance may be utilized. When this field is "null", the registration definition element instance may be used without further gating. However, when this field is not "null", conditions associated with the "gat-eName" specified may be considered when determining if and how this registration definition element instance is to be used. In example embodiments, example core objects (e.g., object types) that a calendar application (or other applica-tion) may process through the methods and systems of registration patterns described herein may include, without limitation: publishing_task/task, marketing_email/email, marketing_email/recurring.

A user interface is provided through which registration definitions for a calendar application may be selected for onboarding a corresponding CRM asset/object. The high-lighted drop-down list may be used to select one or more asset types to be rendered in the calendar. Selection (e.g., checking a corresponding checkbox in the drop-down list) may cause a CRM fetching service to access a correspond-ing registration instance within a registration definition element for the calendar application. All of the available event types may be selected. For the remainder of this example, the event type is referenced. In example embodi-ments, the CRM fetching service may access corresponding registration instances for event type. In example embodi-ments, the fetching service (or the like) may proceed to retrieve data from each LAG object in the CRM, apply the registration instance mappings for a LAG object type, and deliver the resulting content to the calendar application. The result may include one or more lead generation rendered on the calendar. The processes described in this example may leave the source object(s) (e.g., all LAG-type objects) in the CRM database unchanged, while ensuring that each may be properly rendered in the calendar.

In embodiments, registration patterns may include a vari-ant referred to herein as registration associations. Registra-tion associations may facilitate, among other things, main-taining consistency across objects within a multi-service business platform database, such as a customer relationship management (CRM) database. Registration associations may facilitate adding new associations among objects and/or updating existing associations based on actions on or within the CRM. In example embodiments, existing associations may be cleared/removed or updated for maintaining consis-tency. In embodiments, registration associations may define one to one associations (among assets of the platform, such as objects of the platform) and one to many associations. In embodiments, registration association type patterns may allow associating an object with a different type of object, such as to a campaign. The example of one to one or one to many association may include associating one blog post to one campaign in a one to one registration association relationship. In an example of changing a one-to-one rela-tionship association, if a blog post, e.g., "the best blog post ever" is associated to a first campaign, an association status for this blog post may show that it is currently part of (e.g., associated with) this campaign. If that blog post association is changed, such as by attempting to associate it to a second campaign, through application of the methods and systems of registration association described herein, it may be removed from the first campaign because, in this example, one blog post may only be part of one campaign.

In embodiments, a many to many asset association may include association of a workflow. In this example, a user (or system process or other automated process and the like) may add a first workflow to a first campaign. If one were to add the first workflow to a second campaign, the system may accept this second association of the first workflow without removing it from the first campaign because, in this example, one workflow may be part of multiple campaigns. In embodiments, a control for whether or not an asset may be used in a one-to-many association may optionally be indicated by an association definition index value recorded in the registration association data structure. In an example of a registration data structure that uses a JSON syntax, this value may be retrieved from an "association ID" property of the registration association data structure.

In embodiments, a value of an "association ID" may be used by the system to retrieve a related data structure (optionally referred to as a definition of the registration association) that may provide greater/other details of a registration instance. This related data structure may include information that determines if the asset type to which this registration instance applies (e.g., is identified in a "toOb-jectType" property of the instance) may be used in a one-to-many relationship.

In addition to handling asset association relationship modes (one-to-one and one-to-many), the association vari-ants of registration patterns herein may be used by a CRM activity monitoring service of the platform that may be utilized to process updates to objects for consistency across the platform (e.g., updating of associations such as a blog post belongs to a particular campaign, or the particular campaign has a blog post as described in the disclosure). In example embodiments, a worker system may monitor for changes in the CRM (e.g., changes to registration defini-tions, campaigns, etc. that may require changes to associa-tions). The registration association information from several object type-specific registration association element instances may be used (e.g., by the worker system) in determining specific changes (e.g., type of object, proper-ties, and/or associations of the object) that may be required for consistency. The worker system may query a source of data that may include changes to one or more objects (e.g., a CRM ingestion/activity stream and/or log) for activity associated with an object type defined in one of several registration association element instances being used by the worker system to determine if certain properties have changes (e.g., value present in property may have changed). If CRM change activity matches the information in the registration association being used by the worker system, one or more objects (e.g., campaign objects) may need to be changed based on that property change (e.g., property change may be moving of blog post from one campaign to another campaign).

In embodiments, managing campaigns in a CRM may rely on registration definitions to facilitate processing what may be complex multi-object updates (e.g., process updates to objects to ensure associations and related aspects of a campaign stay consistent). An "association" action may be based on a "registration association" as described herein that may be substantively equivalent to a database "join" operation. For example, to achieve consistency so that there is no doubt when accessing the CRM that "this blog post" belongs to this campaign, and this campaign has "this blog post" in it, registration associations that relate "this blog post" with this campaign may be used.

A worker system (e.g., a platform service and the like) may use registration elements as the worker system listens to a stream of change events in the CRM. Worker system may also be referred to as worker service. For each event, the worker system may monitor changes to one or more object values defined by a registration association for the object type identified in the event to determine among other things how the CRM may have changed, such as how a campaign associated with the object type identified in the event may have changed. If the campaign has changed, the worker system or service may attempt to update all the associations of the campaign and keep the CRM consistent. A registration element used by that worker service may identify a type of object and what fields of the object may be monitored for changes in the event stream. Based on changes in that field, the worker system may determine which associations should be updated, which ones should be cleared out, which new ones should be created, etc. In embodiments, the worker service or system may perform these association consistency updates independent of the object being a custom object or a standard core object. In example embodiments, how a registration element is structured (e.g., the property that it checks for and the like) may change for each different application/use.

In embodiments, one may use the registration associations for doing associations of assets with the campaign. In example embodiments, a registration may include a set of definitions for processing items. For example, an example registration may facilitate a worker service in determining if, in the CRM, any object of the type "automation platform flow" changes, and if a property (e.g., campaign GUID property "hs_campaign_guids") specifically changes, then the value which may be present in the change event for that property may be associated with the object that has been changed. For example, an object of type "automation platform flow" that has changed may be considered. The value of a property may have changed (e.g., campaign GUID score changed). In example embodiments, the worker service may automatically do the association of the "automation platform flow" (which has changed) with the corresponding campaign. This example of registration patterns relates to managing of associations between objects in the CRM. A type of registration association data structure for use by a worker service may include only a few sets of fields such as fields relating to object type being monitored and the field being monitored.

The worker service may use this registration element to find a type of object in the CRM (e.g., "automation platform flow") with a specific property (e.g., "hs_campaign_guids"). When the worker service finds the object of the type "automation platform flow" in the CRM, the worker service may attempt to find whether the "hs_campaign_guids" property has changed based on what is found in the CRM and what is provided in the CRM change event stream. If this property has changed, then a campaign identified by this "hs_campaign_guids" campaign value may have this "automation platform flow" associated with it. In example embodiments, the worker system, which does this monitoring for any changes in the CRM, may monitor everything that is changing in the CRM using filters that may be based on the registrations, and then may do the work of associating assets in the CRM based on what has been configured in the registration association.

In embodiments, there may be several applications that move assets in and out of campaigns. It may require monitoring and possible adjustment of the code of these applications such as making changes to keep the associations straight and up-to-date. The CRM may emit a constant stream of events. Every time anything changes such as a definition, an object, or an object instance, there may be an event in that stream. The worker service that uses registration associations may be monitoring the stream for all of these changes. For example, if a user took a blog post and moved it from a first campaign to a second campaign, that change may generate an event in the stream. The worker service may monitor (e.g., listen) for such an event and determine that the blog post had its campaign field updated to reflect the second campaign. The worker service may check the second campaign object (that may be defined in the updated campaign field in the blog post change event) and may make sure that the second campaign object reflects the new campaign assignment. In example embodiments, such a worker service or system may be a CRM internal tool to keep the associations between objects in the CRM up-to-date. Rather than changing the database in some examples, this worker system or service may be adjusting the association (e.g., changing the graph data). In example embodiments, applications may be changing the database and may also be updating at least portions of the CRM. This registration association-based worker service/system may monitor the portion of the CRM that may be changed to determine what else in the CRM may be impacted by the change, thereby centrally implementing the change across the CRM for objects and/or object types identified in the registration association employed by the worker service. This central implementation of CRM changes through use of registration associations may eliminate the need for requiring the change be made by every individual application that may make use of the CRM.

In example embodiments, registration patterns may include variations that may facilitate updating portions of the CRM based on monitored CRM events, such as activities of sources of changes to other portions of the CRM. In example embodiments, such a registration pattern variant may be a registration association that may be configured to facilitate identifying an object type and at least one field of that object type to be monitored. When a CRM activity monitoring service, that utilizes registration associations, detects an event of the CRM that identifies an object type noted in the utilized registration association, the content of the event (e.g., what the event is causing to be accomplished in the CRM to the object type) may be checked to determine if it impacts the field of the object type defined in the registration association. When the content of the event matches both the object type and the specific field identified in the registration association object, an association CRM activity may be activated.

An activity monitoring service may monitor CRM activity based on the registration association element. The activity monitoring service may look in the monitored activity for event content that may signify that an object type "LANDING_PAGE" is being targeted for some action (e.g., reading a value in the object, writing/updating a value of one or more fields in the object, etc. When the monitored event identifies the object type "LANDING_PAGE", the event may be further evaluated/monitored to determine if a specific field or fields of the object type are being acted upon by the event.

The registration association for the object type LAND-ING_PAGE indicates that actions taken in the event against object field "hs_campaign_name" are to be followed up for maintaining consistency in the CRM database. When the event reflects that the object field "hs_campaign_name" is being/has been assigned a value (which is optionally the same as the current value or may be a different value than a current value), action may be taken within the CRM to ensure consistency as required based on the change. In example, a registration association element may identify a "blog post" field of a "campaign" object for monitoring by a CRM event activity monitoring service. When a CRM event matches this registration association element, a new value in the "blog post" field that may be defined in the event may be used to update portions of the CRM database for maintaining consistency. Some applications that have access to the CRM may be making changes that require updating the CRM. The activity monitoring service may use registration associations to determine if the change being made requires other changes in the CRM for consistency. Such an approach may reduce the burden on such applications of ensuring that CRM database consistency is maintained. In example of use of registration association elements, information in the registration association may facilitate identifying what the CRM consistency application may need to do when a specific field in a specific object type is acted upon. In embodiments, a CRM activity event may detect where a value of an attribute in a CAMPAIGN object is changed in the CRM. There may be other CRMs that may be impacted by such a change. In embodiments, a CRM consistency service may use the change of object information identified in the association registration to query the CRM for other (e.g., related) objects that rely on the now changed object field content. As the CRM consistency service finds other impacted objects, it may change them so that the now changed object content may be propagated to the other related objects.

Benefits of registration patterns is that third-parties may not be forced to adhere to a unique standard (e.g., one that may be different than the third-party's standard) when third parties create their own (e.g., custom) objects and use them within the multi-service business platform CRM. This may relate to third-party CRM use/access examples. The methods and systems of registration patterns described herein may provide benefits to third-party CRM use and access. In an example, a customer may define a custom class CRM object that they have been using for a period of time (e.g., one or two years or more). In this example, when the customer finds a vendor (e.g., with a system/service that they want to use with their custom class CRM objects), there is no need for either the customer or the vendor to change their systems—both may keep their objects as they were and the vendor may keep their system in place. If the vendor or the customer uses the example registration pattern methods and systems, interfacing between the customer custom class CRM and the vendor may be done through automatically transforming data without requiring any new code to run. In example embodiments, registration patterns, such as registration definitions may allow for custom object use and creation by third parties. The registration patterns (and supporting CRM access APIs and the like) may be configured with external endpoints through which third parties may access the CRM for their own tools in order to, among other things, visualize custom registration patterns, create new elements or objects, update customized objects in the CRM, etc. Also, in example embodiments, a customer may operate an external CRM system and may want to use the systems and processes of registration patterns to map these external CRM objects to objects and/or services of the multi-service business platform CRM. This may be accomplished by defining a set of registration patterns that may facilitate mapping the external CRM object properties to internal CRM object properties and use this set of registration patterns during exchange of data between the systems. In example embodiments, exchange of data between a CRM and external systems may include transforming data based on applied registration patterns (e.g., registration definitions). Transforming may include converting objects (or portions thereof) in the external system to be compatible with objects (or corresponding portions thereof) in the CRM. Registration patterns may also facilitate transforming data for compatibility when transferring CRM objects to the external system.

A range of CRM-centric capabilities may be enabled. In one example, a metering service may be configured to use registration associations to facilitate monetizing a CRM. Such a metering service may be configured to detect when CRM activity events, such as events by third parties, match a monetizing criteria (e.g., accessing certain fields of certain objects). Based on a CRM access arrangement with the example third party, the metering service may track and count such accesses to form a basis for payment by the third party, etc. In another example, registration associations may be utilized by a CRM analytics service for, among other things, tracking activity within the CRM, such as for maintaining a log of access by specific users, services, etc. Tracking may facilitate analytics pertaining to who is registering/accessing the CRM, what access portal did they use, what source device did they register from, what portion of the CRM are they accessing (e.g., users signing up for events offered through the multi-service business platform), etc. Further, such an analytics system may facilitate adapting allocation to and usage of computing, network, and storage resources for the CRM based on a result of such analysis. If a distal portion of the CRM appears to be accessed frequently by local resources, changes in where the distal portion is stored may occur (e.g., move a highly accessed portion to a storage system that is physically closer to a point of use).

In embodiments, at least one advantage of the method and systems of registration patterns may include using CRM interactions to allow the CRM records to be used in multiple applications. As an example, without this system and/or process, customers and integrators may need to learn/configure multiple systems in order to gain potentially comparable results. By using the CRM to power this process and/or system, there may be one consistent system, such as the multi-service business platform. Further, using registration patterns in the CRM to configure the CRM-powered application may avoid a need for a second API to interact with multiple applications. Advantages may include avoiding requiring a two-system approach. Another approach may include flexibility in using registration definitions with third party systems. Clients may keep using their objects with current systems (internal or external with respect to the platform). Also, data may be transformed when transferred into the platform. Yet further advantages may include requiring a reduced set of tasks for achieving a clean bridge between the CRM and the calendar application. Separation of data related to registration definitions from user to user may provide for unique customizability for users regarding each registration definition and its use. In example embodiments, customers or users may create registration definitions into the CRM via a customer/user portal which may be readily integrated with the platform (e.g., systems, services, features, etc. of the platform). When new applications are developed, existing objects (e.g., core objects and/or customized objects) may be integrated with the new applications via registration definitions with no need to modify the existing objects or develop custom code to accommodate specific object types allowing for the ability to speed up internal development and/or development by integrators.

The methods and systems described herein and depicted in the accompanying figures may present a range of advantages over other approaches. One such advantage may include using objects stored in the CRM (e.g., registration elements and the like) to allow the records in the CRM to be used in multiple applications. Another advantage is that customers/users, integrators, and others may no longer need to learn/configure multiple systems (e.g., their own CRM) to have access to content of the CRM. Thus, a registration pattern-enabled CRM may be embodied as one consistent system that may: (i) use objects in the CRM to configure CRM-powered applications; (ii) avoid need for multiple APIs for interacting with multiple applications; and (iii) avoid constraints of a multi-system approach. Users of a multi-service business platform may keep using customized objects stored in the CRM while gaining advantages of CRM-powered (and third-party powered) applications. Third-party systems may use existing interfaces to access the CRM. Clients of the multi-service business platform may utilize existing content creation tools (e.g., tools by which they generate content for the CRM) to generate registration patterns. New applications, projects, services, etc. may be developed, and third-party applications may be integrated into the platform, without requiring substantive development of code, converters, or the like as part of the integration.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments. Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object. Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
hosting a customer success workspace through a unified platform, wherein the customer success workspace stores data within a first object of a customer relationship management (CRM) database;
hosting a helpdesk workspace through the unified platform, wherein the helpdesk workspace stores data within a second object of the CRM database;
providing a user with access to the customer success workspace and the helpdesk workspace of the unified platform through a workspace user interface; and
providing the helpdesk workspace with access to the first object and the customer success workspace with access to the second object.

2. The method of claim 1, comprising:
generating a predictive health score stored by the customer success workspace through the first object; and
providing the helpdesk workspace with access to the predictive health score through the first object.

3. The method of claim 1, comprising:
generating ticket data stored by the helpdesk workspace through the second object; and
providing the customer success workspace with access to the ticket data through the first object.

4. The method of claim 1, comprising:
populating, the by unified platform, the customer success workspace with an interface corresponding to at least one of:
a summary interface populated with task progress information;
a portfolio interface populated with customers that are managed by a current user of the customer success workspace;
a pipeline interface populated with ticket data; or
a feed interface populated with activities related to the customers managed by the current user; and
populating the interface with information from the second object accessible to both the customer success workspace and the helpdesk workspace.

5. The method of claim 1, comprising:
populating, the by unified platform, the helpdesk workspace with an interface populated with channel information, ticket names, ticket priorities, ticket tags, ticket status information, and ticket assignment information.

6. The method of claim 1, comprising:

providing an automation workflow with access to the first object and the second object for workflow execution.

7. The method of claim 1, comprising:

providing an artificial intelligence service with access to the first object and the second object.

8. The method of claim 1, comprising:

creating, through the helpdesk workspace, a ticket stored as an object within the CRM database; and providing information about the ticket through the customer success workspace using the object.

9. The method of claim 1, comprising:

in response to receiving user input through the customer success workspace, configuring weights, events, and properties used to generate a predictive health score.

10. A computing device comprising:

a memory comprising machine executable code; and a processor coupled to the memory, the processor configured to execute the machine executable code to cause the processor to perform operations comprising:

hosting a customer success workspace through a unified platform, wherein the customer success workspace stores data within a first object of a customer relationship management (CRM) database;

hosting a helpdesk workspace through the unified platform, wherein the helpdesk workspace stores data within a second object of the CRM database;

providing a user with access to the customer success workspace and the helpdesk workspace of the unified platform through a workspace user interface; and providing the helpdesk workspace with access to the first object and the customer success workspace with access to the second object.

11. The computing device of claim 10, wherein the operations comprise:

hosting, by the unified platform, a data layer providing access to CRM objects as structured data, unstructured data generated from user engagement with content, and external data source integrated into an artificial intelligence service and machine learning model.

12. The computing device of claim 11, wherein the operations comprise:

processing the unstructured data utilizing at least one of sentiment analysis, predictive scoring, or insight generation to create a result; and utilizing the result to populate a property of at least one of the first object or the second object.

13. The computing device of claim 11, wherein the operations comprise:

processing the unstructured data utilizing at least one of sentiment analysis, predictive scoring, or insight generation to create a result; and utilizing the result to generate a predictive score used by at least one of the customer success workspace or the helpdesk workspace.

14. The computing device of claim 11, wherein the operations comprise:

providing, by the data layer, the customer success workspace and the helpdesk workspace with access to at least one of email objects, conversation objects, workflow objects, event objects, deal objects, customer objects, ticket objects, reporting objects, or task objects within the CRM database.

15. The computing device of claim 11, wherein the operations comprise:

hosting, by the unified platform, a logical layer applying artificial intelligence to perform tasks.

16. The computing device of claim 11, wherein the operations comprise:

hosting, by the unified platform, a logical layer implementing at least one of a customer agent, a knowledge base agent, predictive alerts, or predictive health scoring.

17. The computing device of claim 11, wherein the operations comprise:

hosting, by the unified platform, a logical layer implementing at least one of an artificial intelligence meeting manager, a playbook recommender, or an electronic batch records creator.

18. A non-transitory machine readable medium comprising instructions for performing a method, which when executed by a machine, causes the machine to perform operations comprising:

hosting a customer success workspace through a unified platform, wherein the customer success workspace stores data within a first object of a customer relationship management (CRM) database;

hosting a helpdesk workspace through the unified platform, wherein the helpdesk workspace stores data within a second object of the CRM database;

providing a user with access to the customer success workspace and the helpdesk workspace of the unified platform through a workspace user interface; and providing the helpdesk workspace with access to the first object and the customer success workspace with access to the second object.

19. The non-transitory machine readable medium of claim 18, wherein the operations comprise:

hosting, by the unified platform, a user interface layer that provides the customer success workspace and the customer success workspace through a single workspace environment.

20. The non-transitory machine readable medium of claim 18, wherein the operations comprise:

hosting, by the unified platform, a logical layer implementing at least one of proactive alerts, churn prediction, predictive health scoring, personified electronic batch records creation, an artificial intelligence meeting manager, a playbook recommender, an omnichannel agent, or a knowledge base agent.

* * * * *